June 21, 1966    L. E. PACKARD ET AL    3,257,561
RADIOACTIVITY LEVEL DETECTING APPARATUS FOR SAMPLES
CARRIED BY PORTABLE TRAYS WITH TRANSFER AND
INDEXING MEANS FOR THE TRAYS
Filed April 15, 1963    17 Sheets-Sheet 5
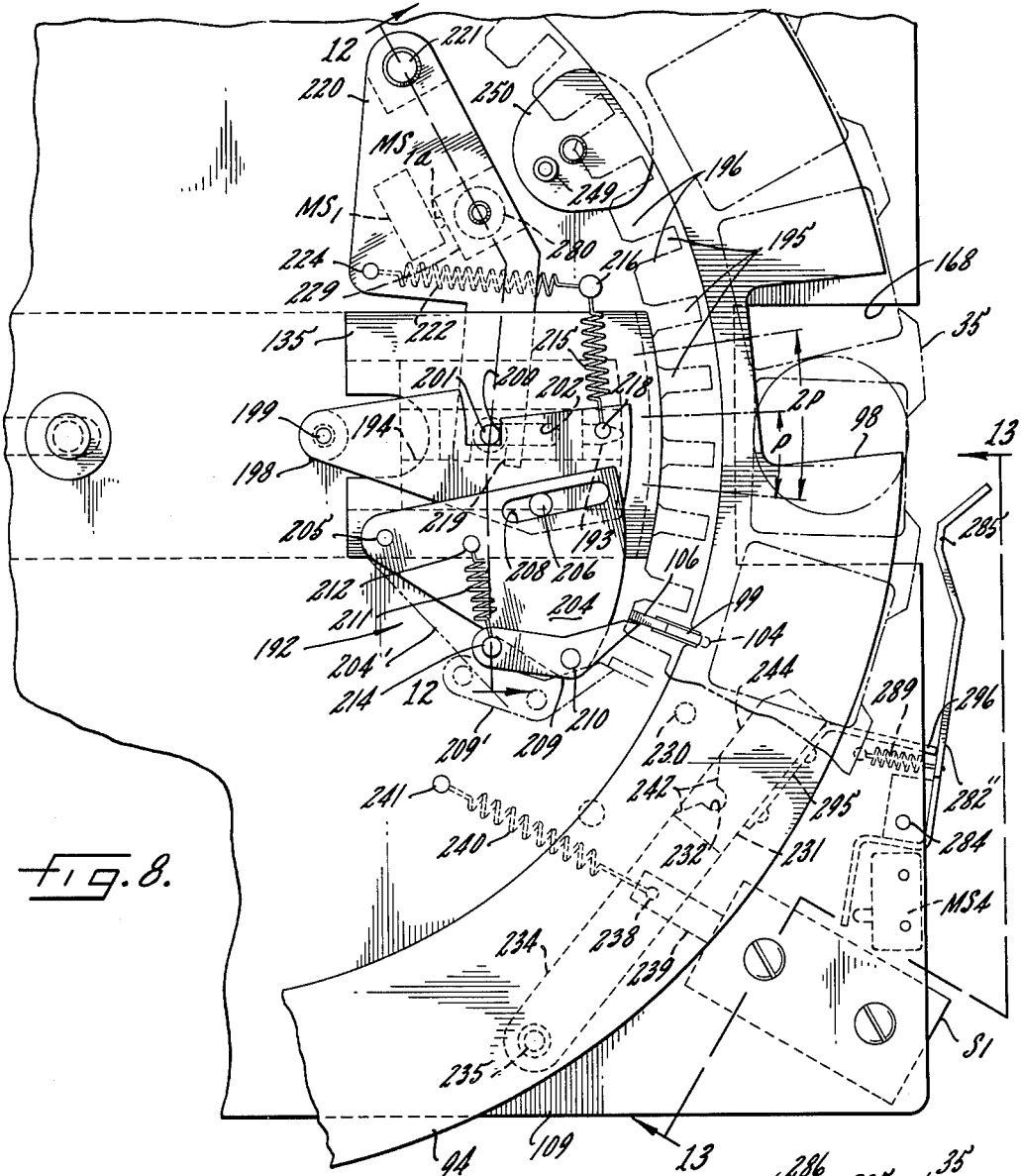
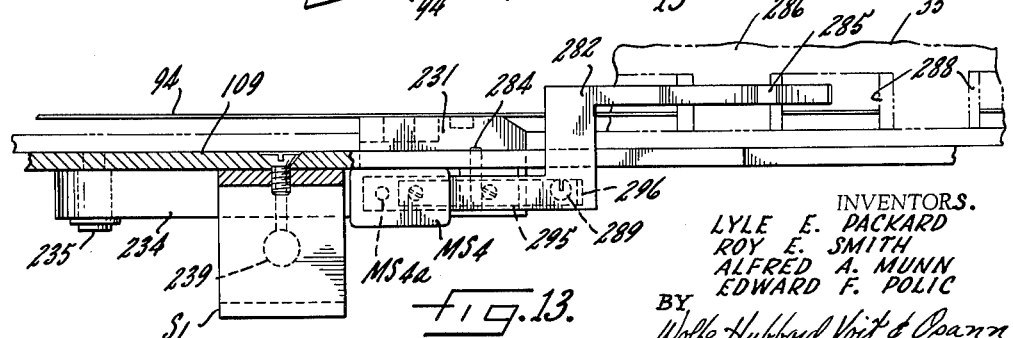
INVENTORS.
LYLE E. PACKARD
ROY E. SMITH
ALFRED A. MUNN
EDWARD F. POLIC
BY
Wolfe, Hubbard, Voit & Osann
ATT'YS.

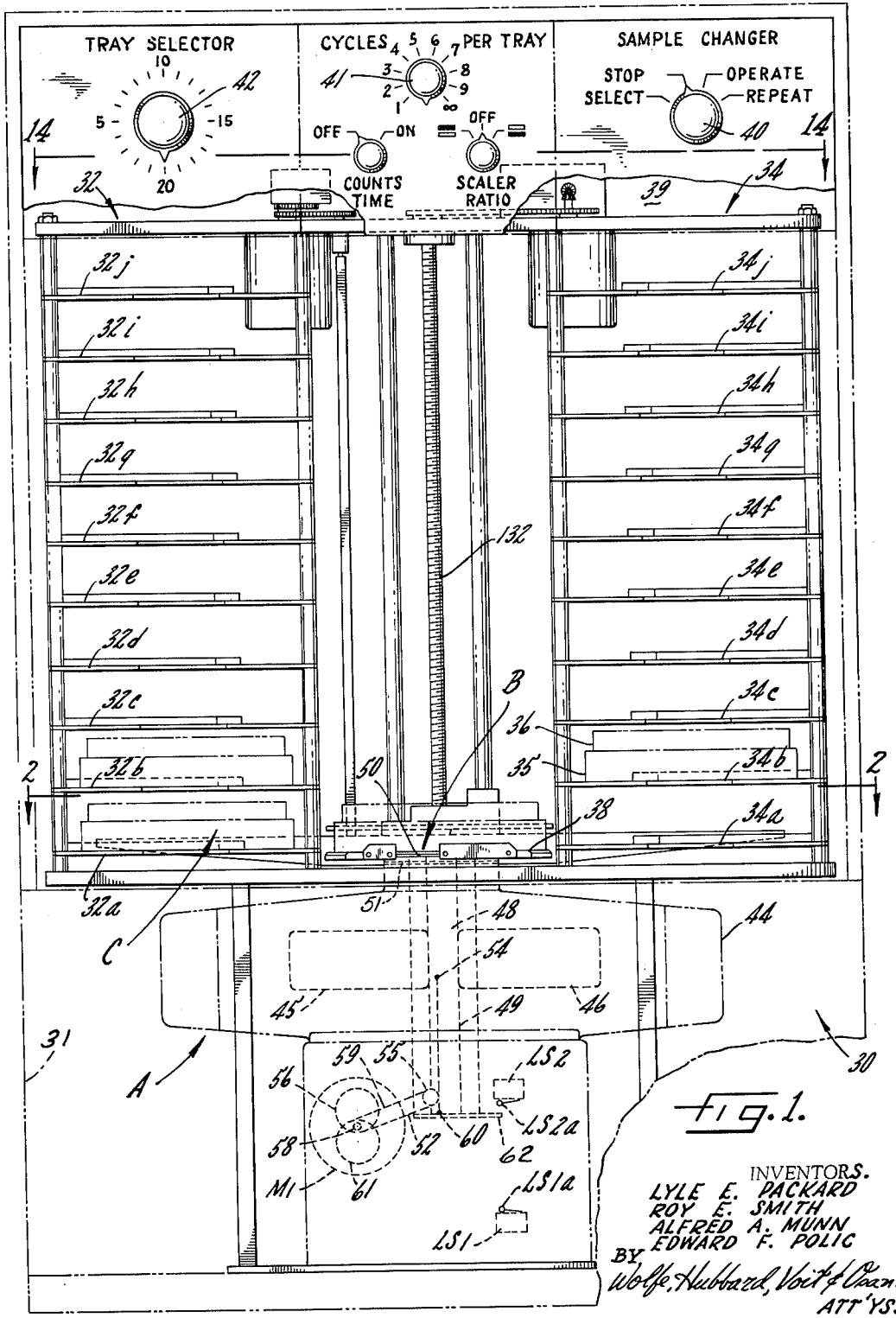

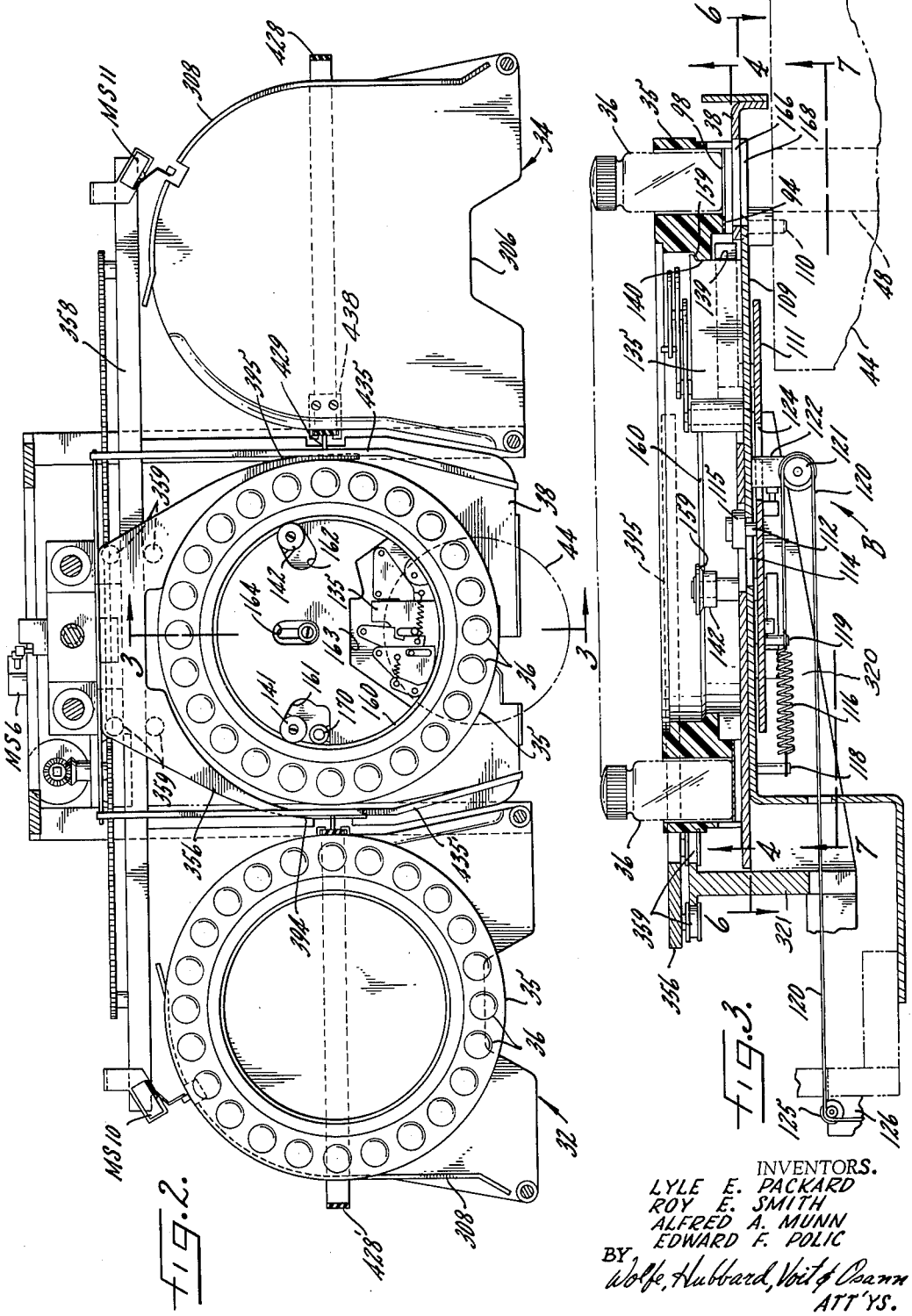

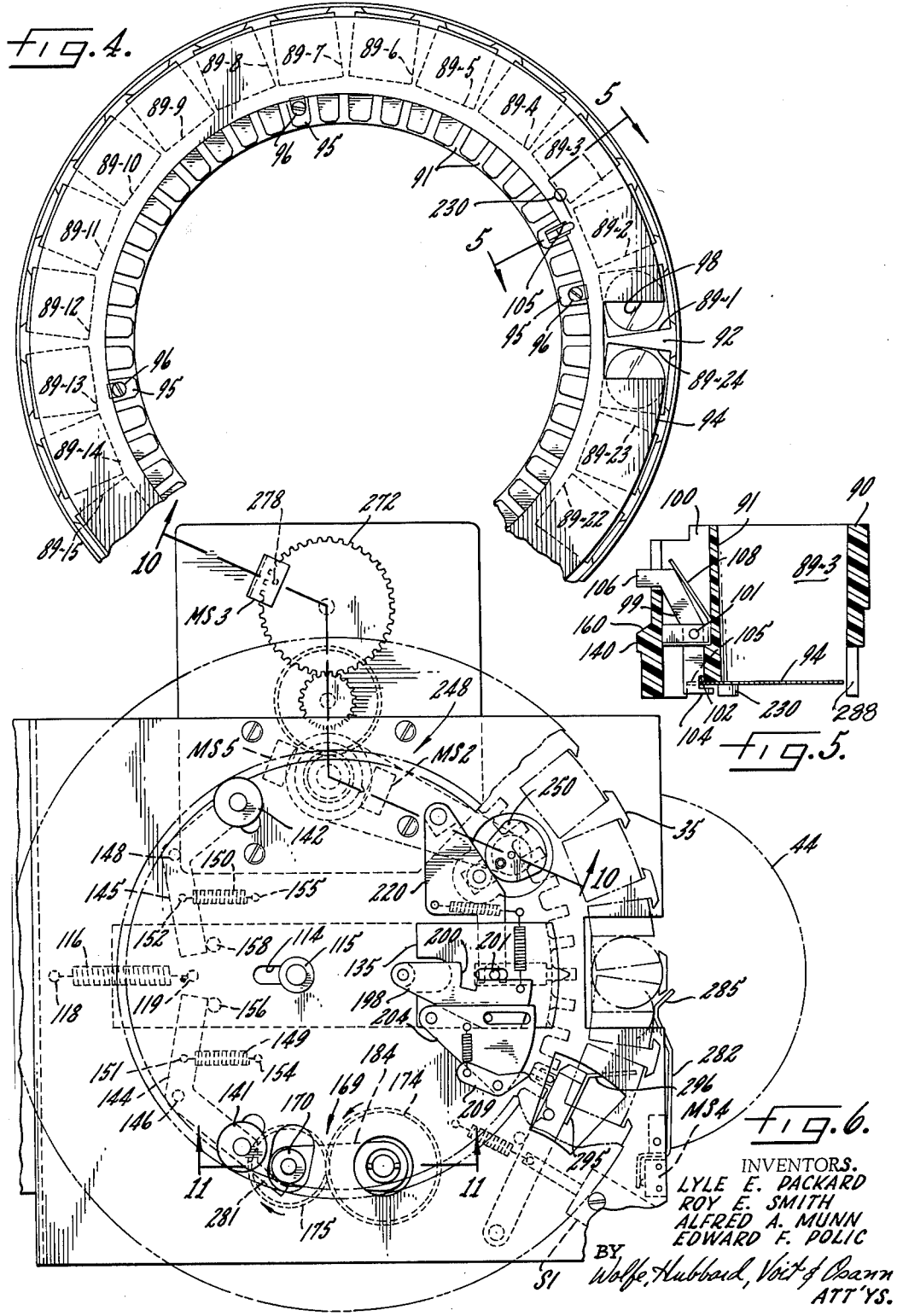

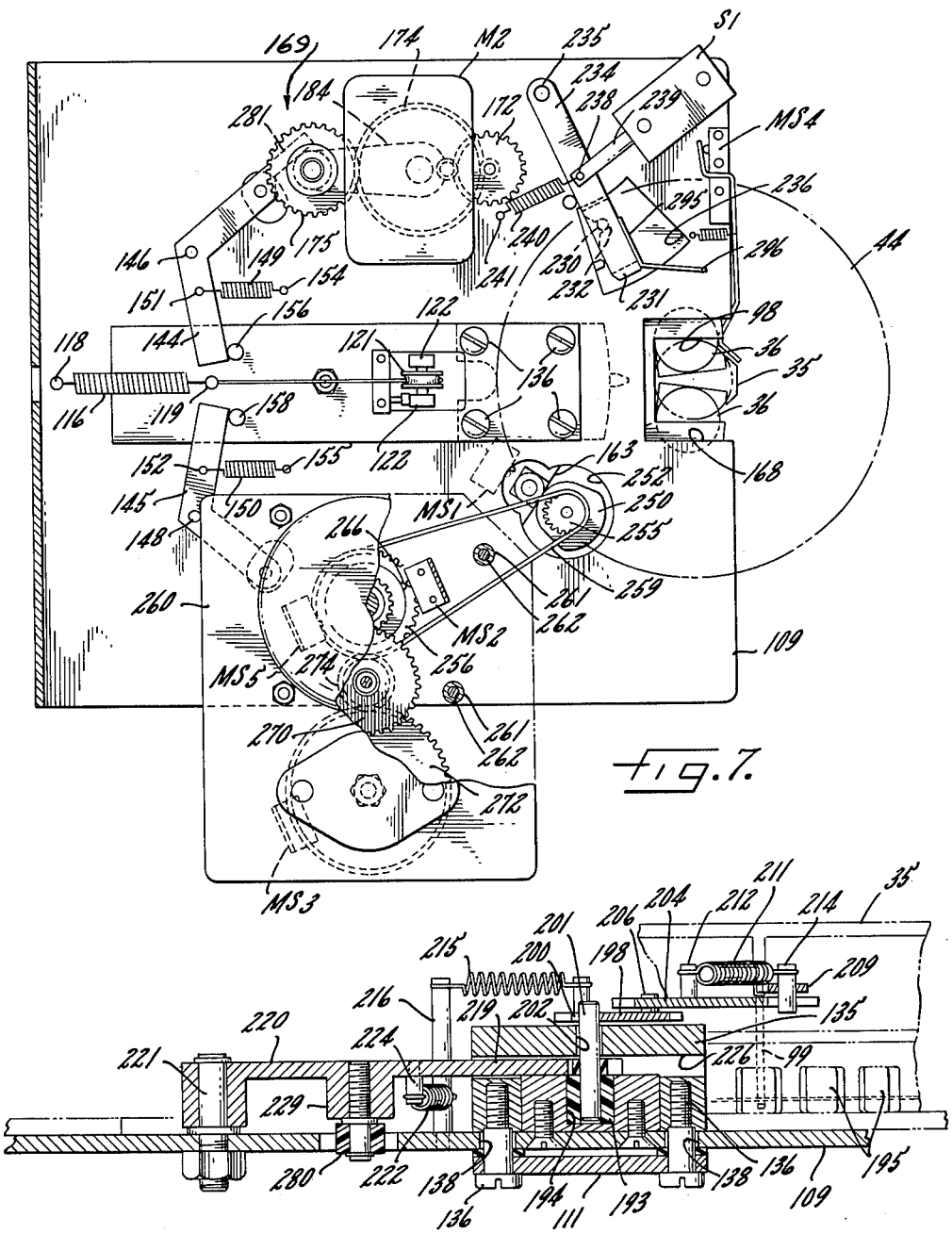

INVENTORS.
LYLE E. PACKARD
ROY E. SMITH
ALFRED A. MUNN
EDWARD F. POLIC
BY
ATT'YS.

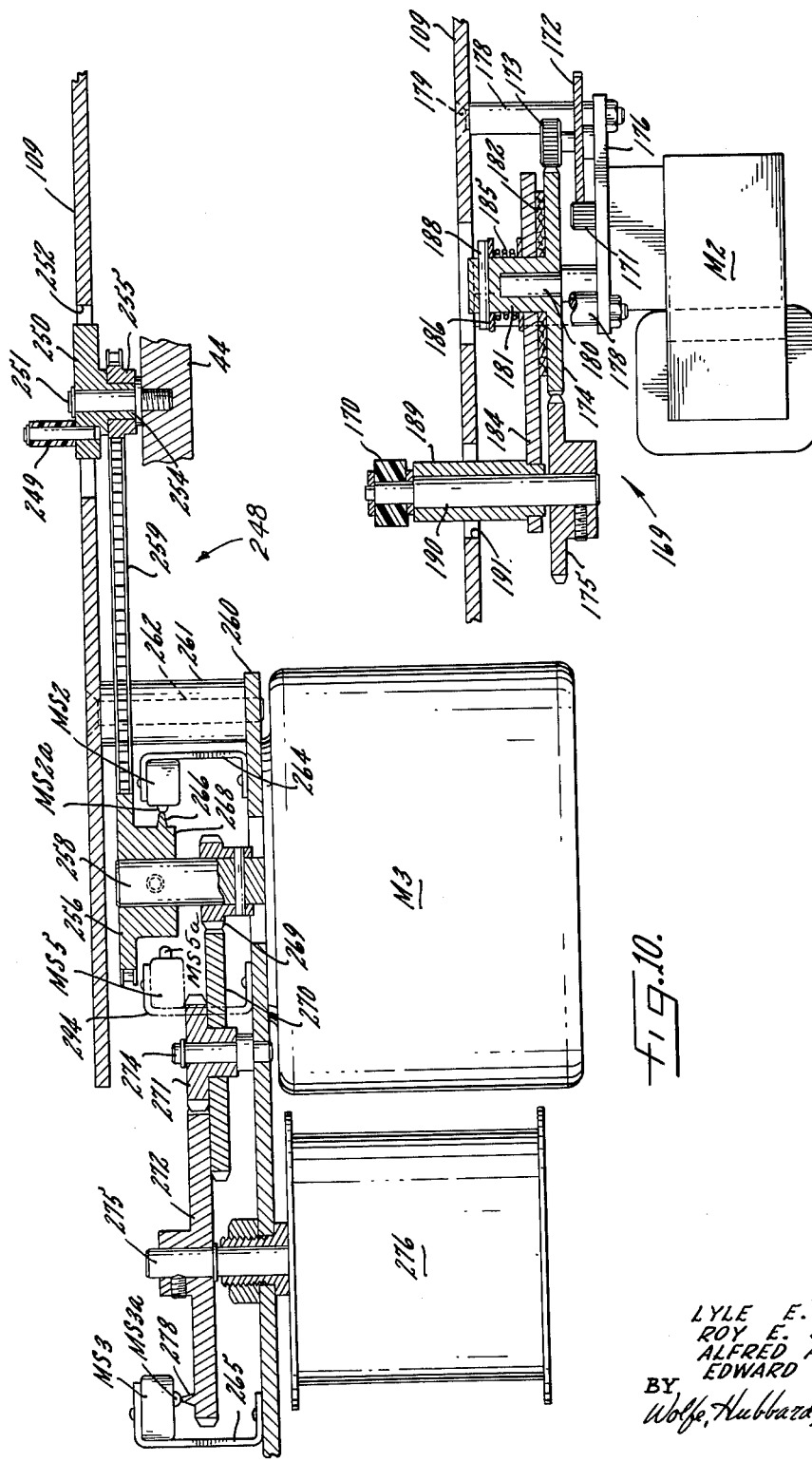

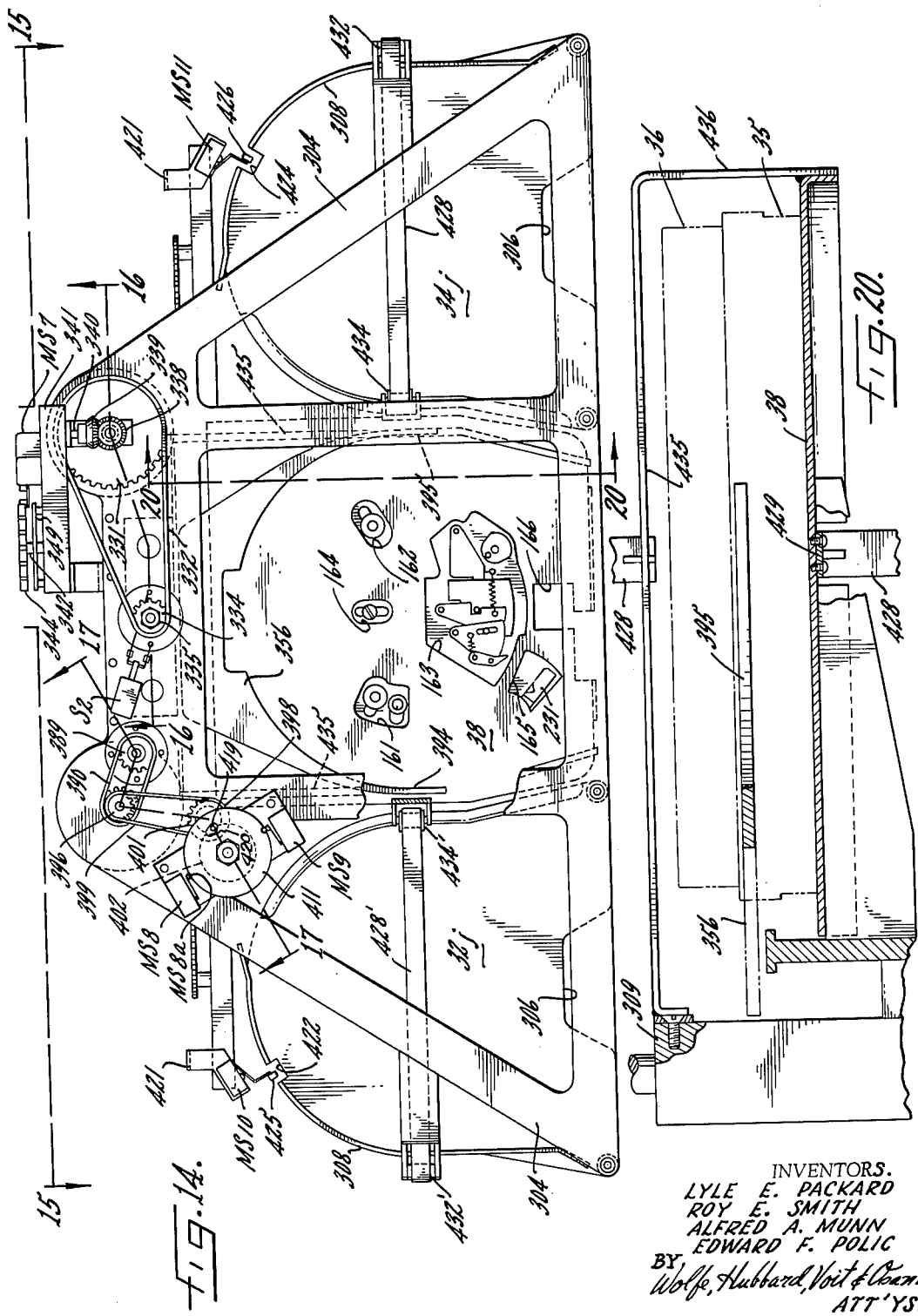

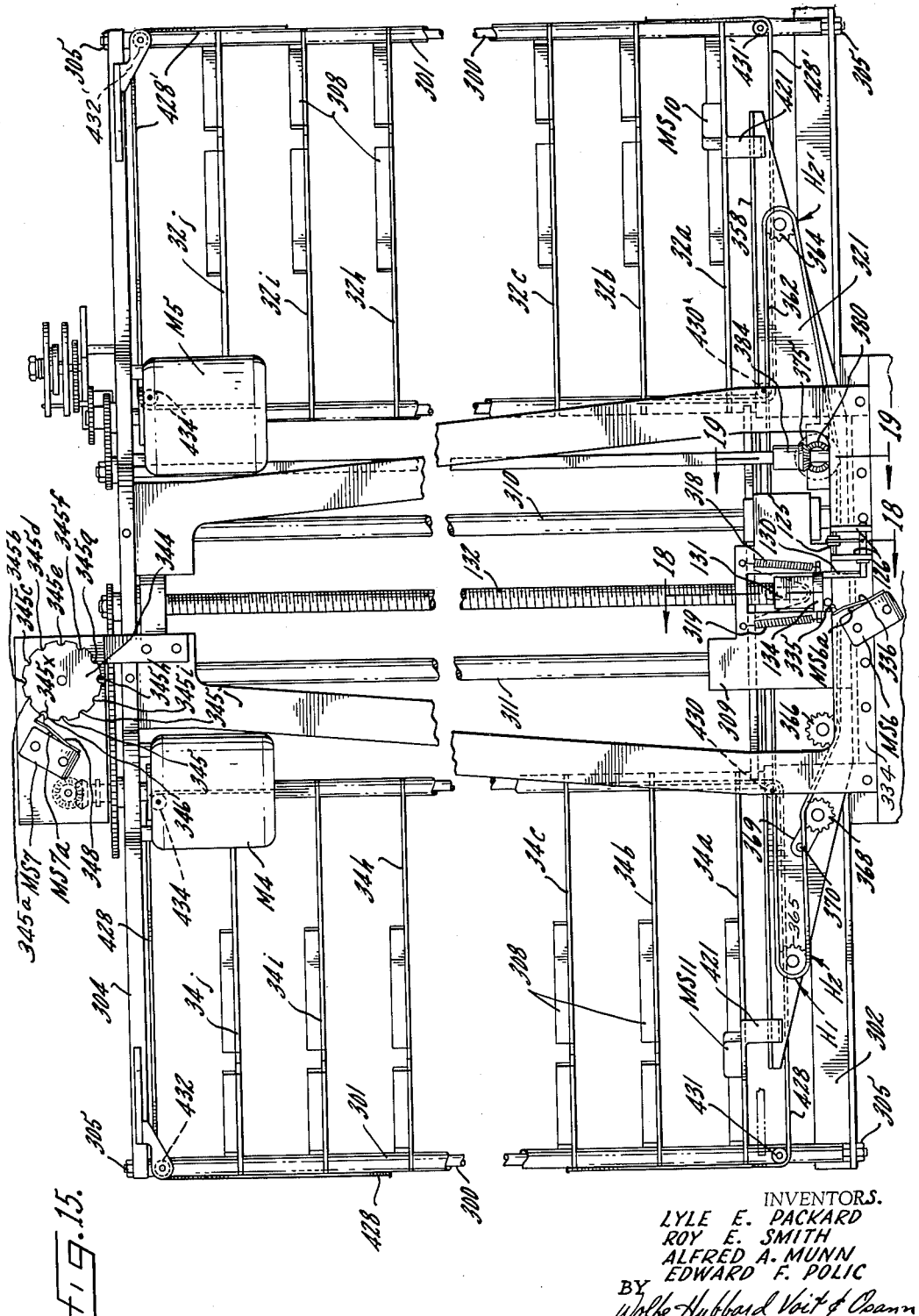

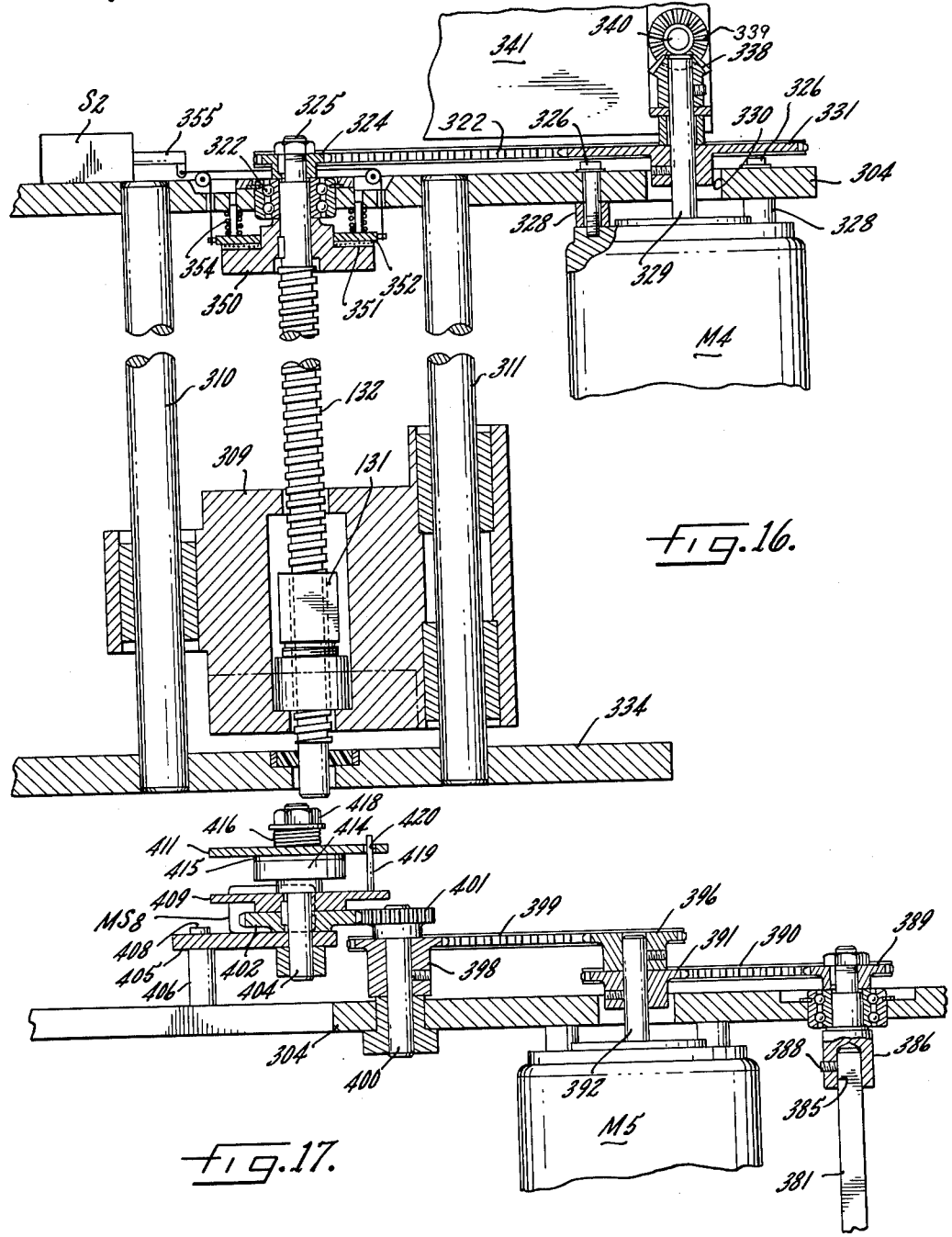

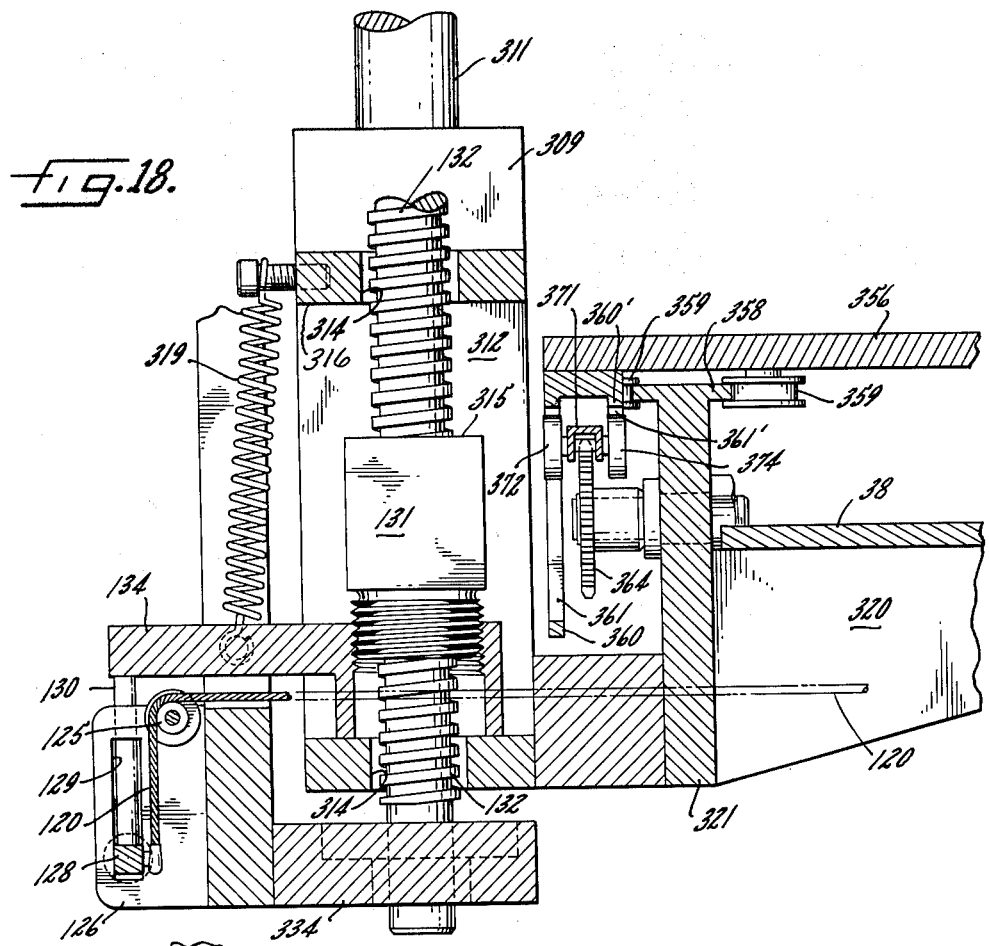
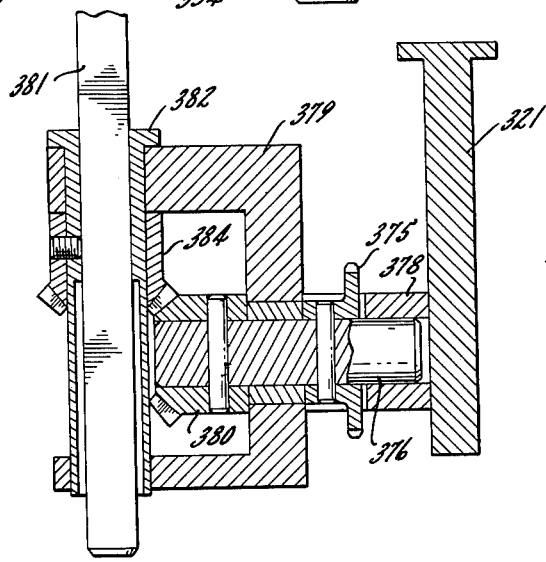
INVENTORS.
LYLE E. PACKARD
ROY E. SMITH
ALFRED A. MUNN
EDWARD F. POLIC
BY
ATT'YS.

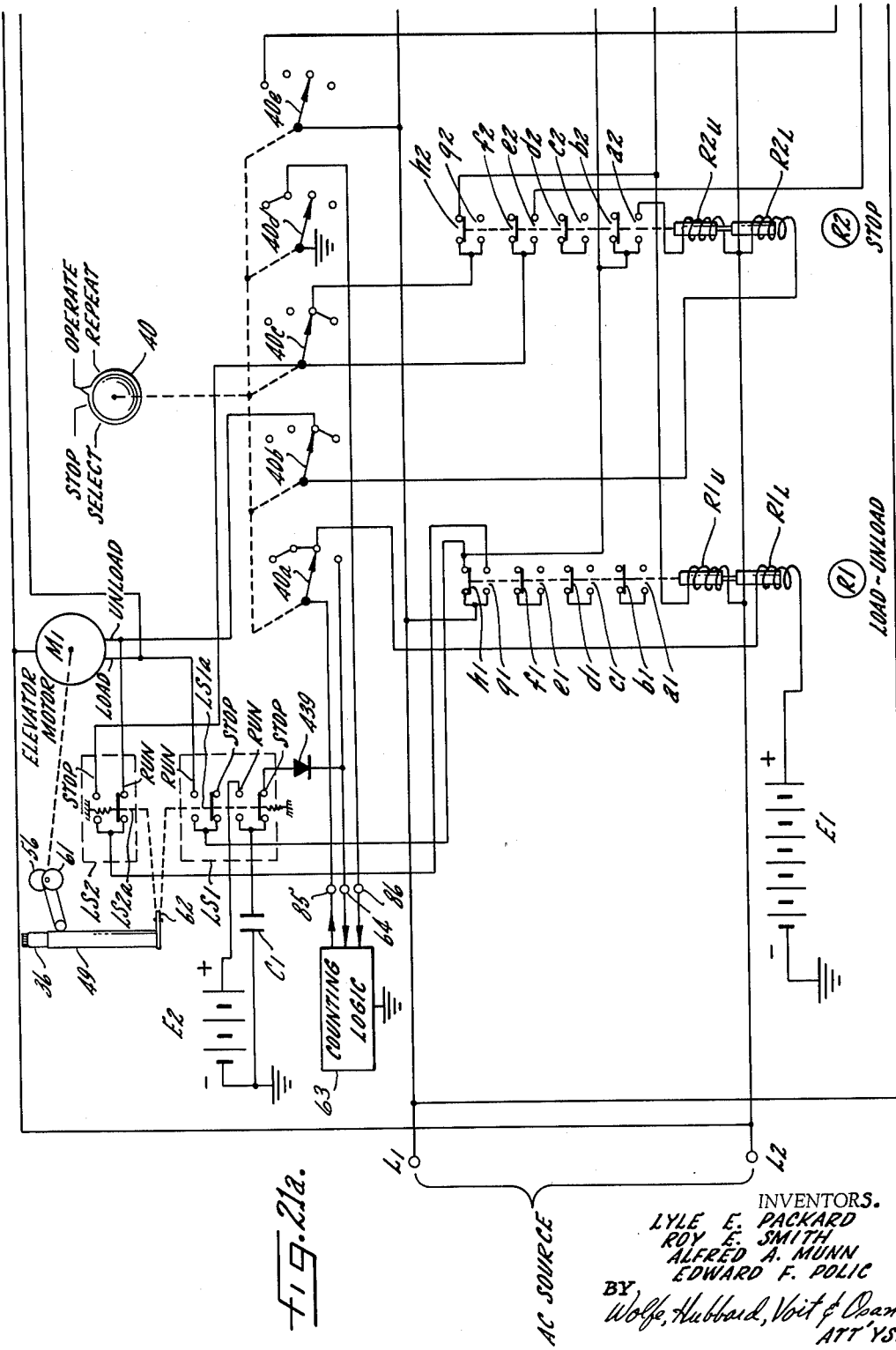

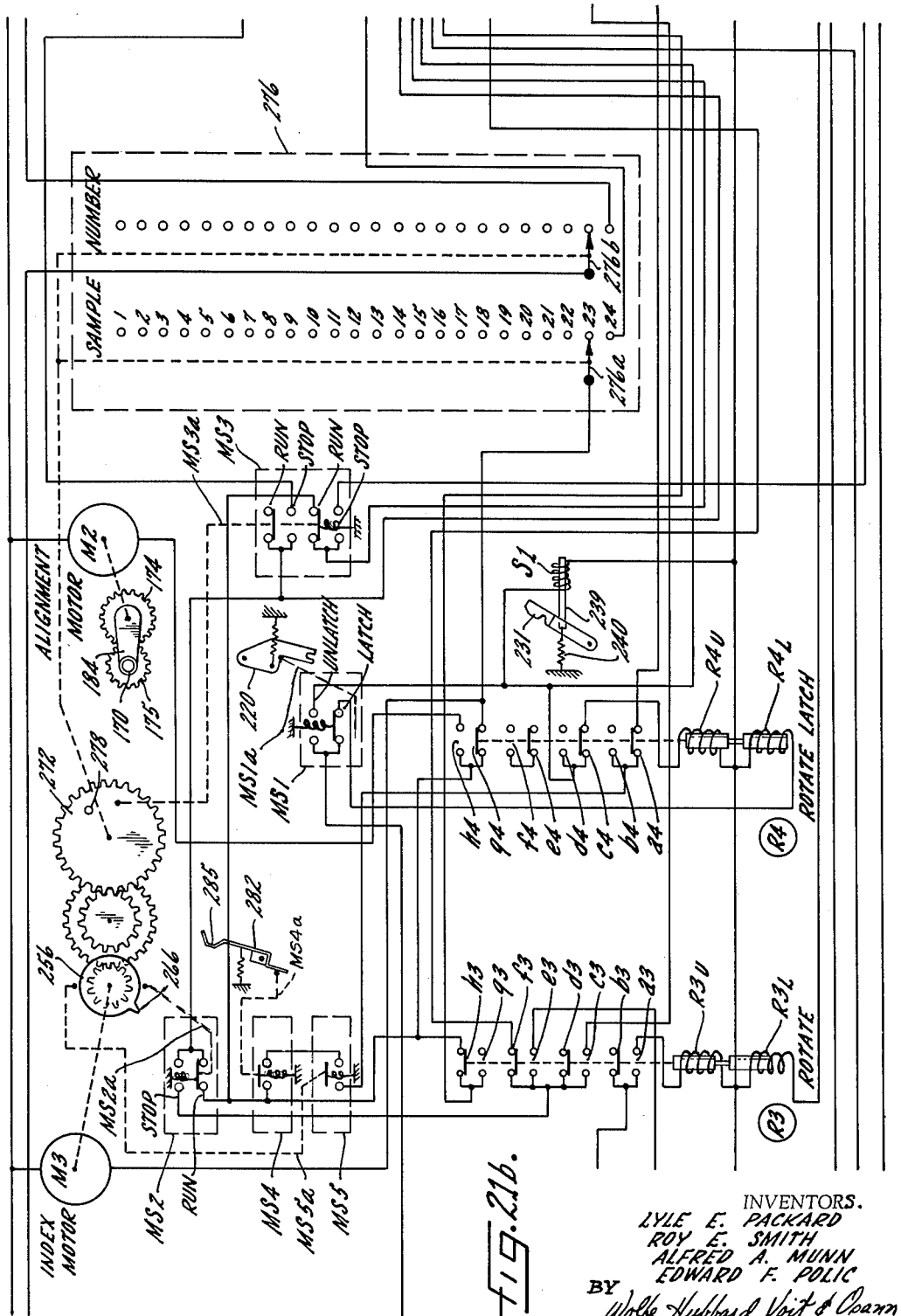

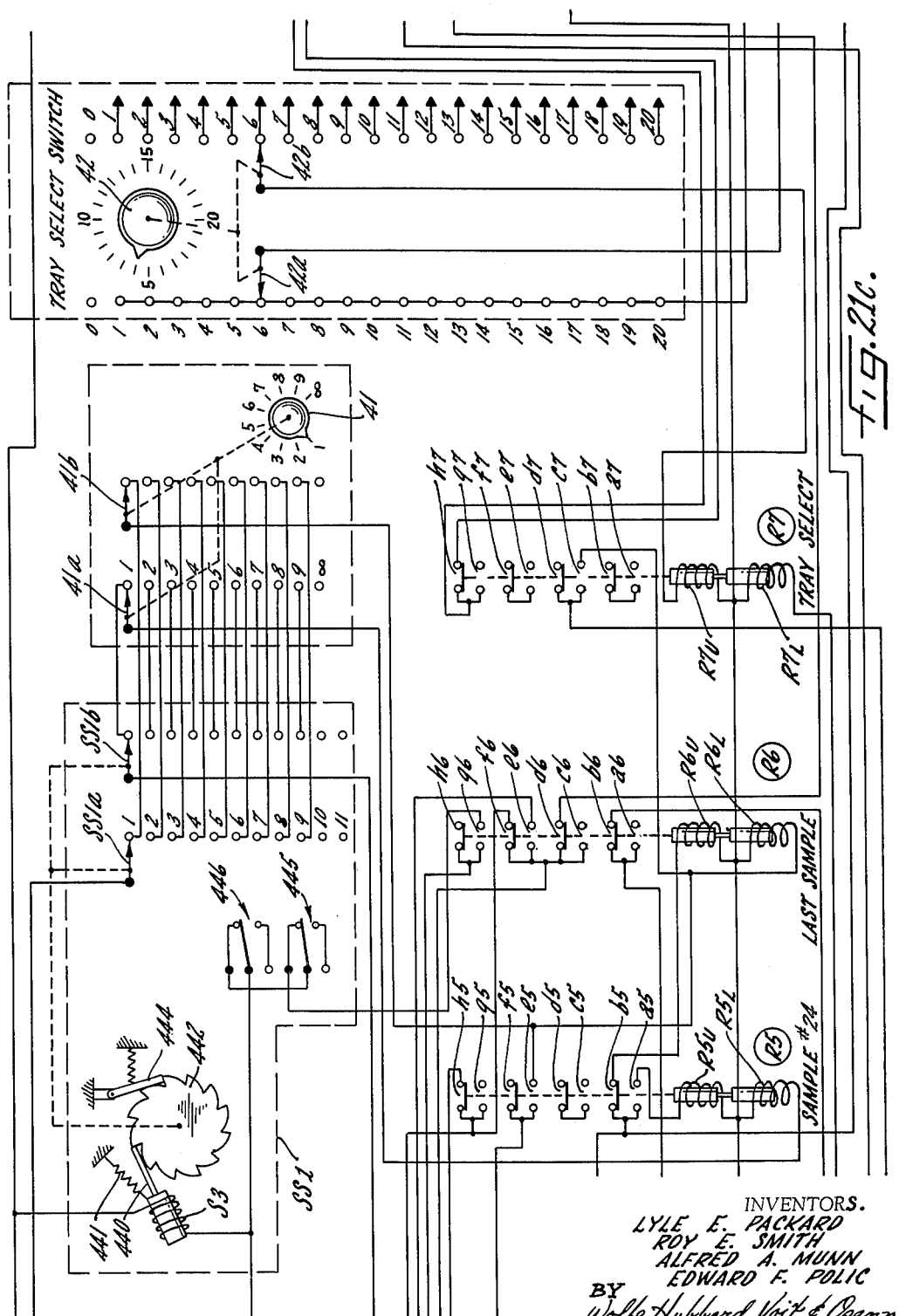

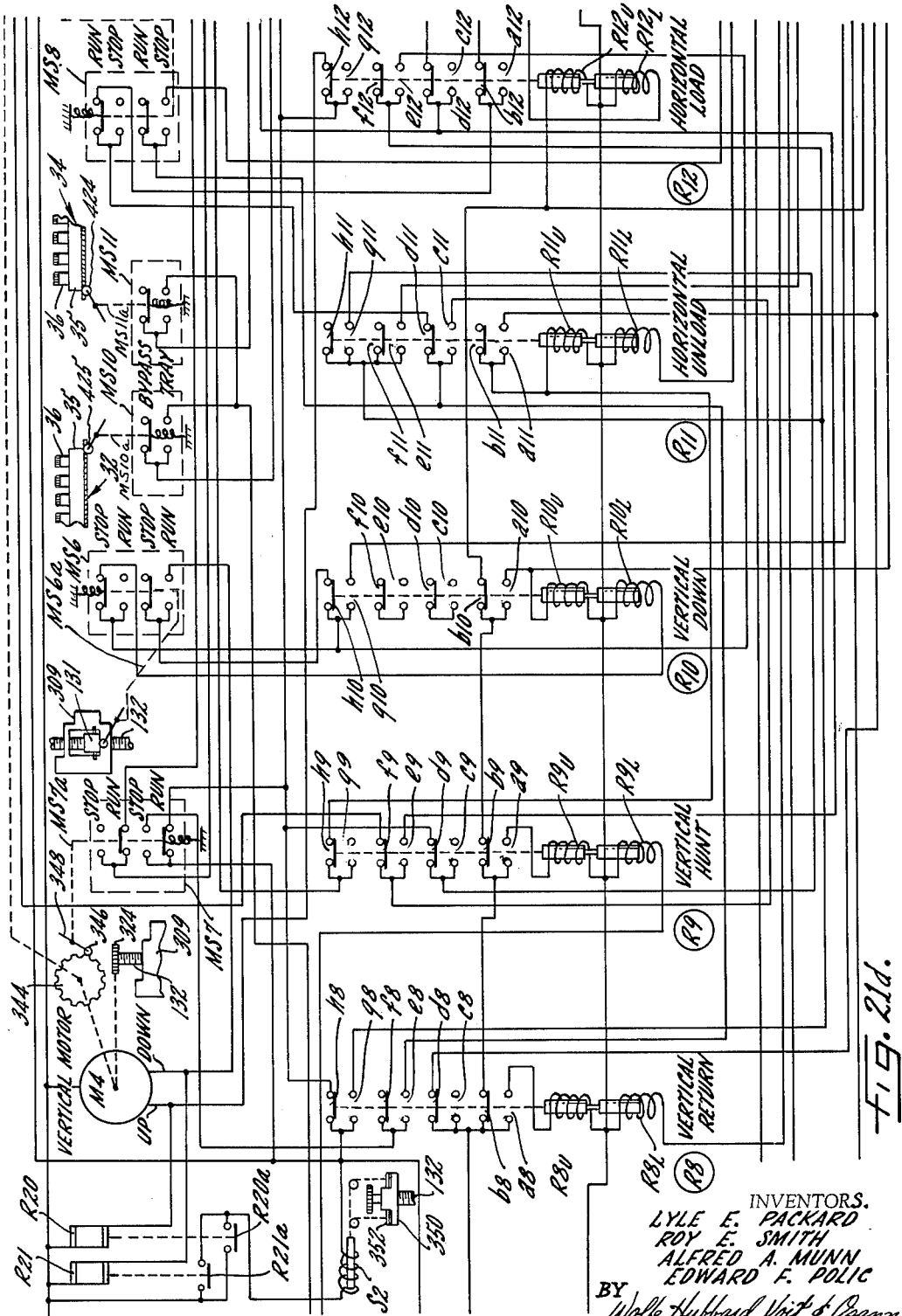

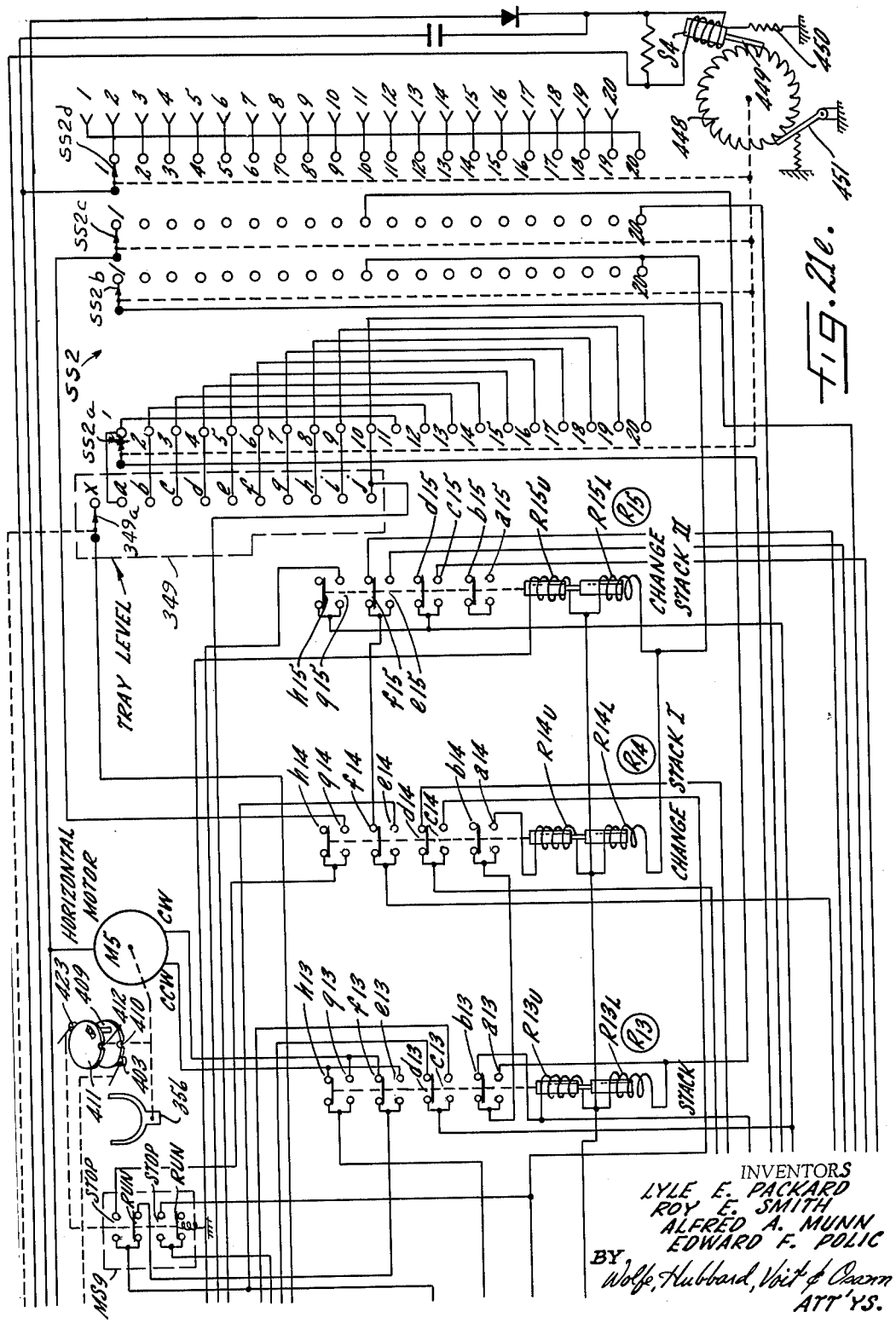

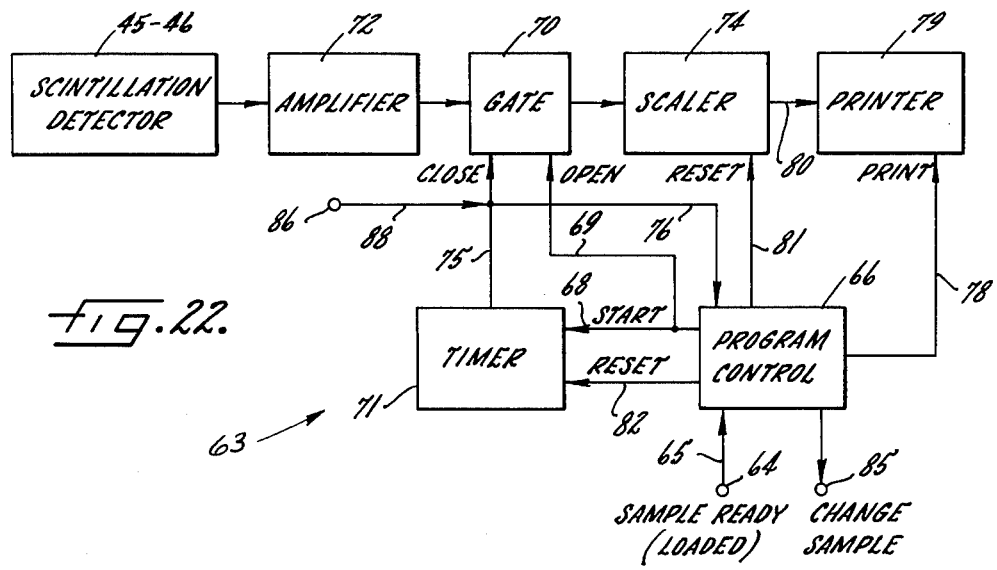

United States Patent Office 3,257,561
Patented June 21, 1966

3,257,561
RADIOACTIVITY LEVEL DETECTING APPARATUS FOR SAMPLES CARRIED BY PORTABLE TRAYS WITH TRANSFER AND INDEXING MEANS FOR THE TRAYS
Lyle E. Packard, Hinsdale, Alfred A. Munn, Chicago, Roy E. Smith, Villa Park, and Edward F. Polic, Lisle, Ill., assignors to Packard Instrument Company, Inc., Brookfield, Ill., a corporation of Illinois
Filed Apr. 15, 1963, Ser. No. 273,189
18 Claims. (Cl. 250—106)

The present invention relates in general to methods and apparatus for detecting and measuring radioactivity emanating from a sample and, more particularly, to improved methods and apparatus for automatically handling and processing a relatively large number of separate samples or specimens each containing one or more radioactive sources. In its principal aspects, the invention is concerned with methods and apparatus suitable for use in handling one or more groups of discrete samples or specimens and for transferring the samples from any given group thereof, one at a time, to and from a radiation detection station wherein the activity levels of the individual samples are measured.

It is a general aim of the present invention to provide improved methods and apparatus for facilitating the handling of relatively large numbers of radioactive samples or specimens and for individually processing such samples one at a time. While not so limited in its application, the invention will find especially advantageous use in handling and processing diverse groups of radioactive specimens wherein each group represents the work product of a different technician, or wherein the different groups must be segregated from one another because they represent samples emanating from different experiments, or because of the characteristics of the radioactive isotopes present in the different groups and the nature of the measurement to be performed on the particular specimens present in any given group.

Another object of the invention is to provide improved methods and apparatus for handling multiple radioactive samples and which will facilitate the processing of such samples, yet wherein the procedures for handling and processing of such samples are entirely automatic in operation and can be performed by relatively unskilled personnel, thus releasing skilled technicians or similar personnel for other activities.

More specifically, it is an object of the present invention to provide an improved and reliable multiple sample handling system for transferring a plurality of radioactive samples seriatim to and from a detection chamber, or similar counting station, wherein the activity levels of the samples are measured.

In another of its important aspects, it is an object of the present invention to provide improved methods and apparatus for successively handling discrete groups of samples in sequential order, yet which permits of deviation from the normal order of handling such samples. As a consequence of attaining this objective, one or more groups of samples may be processed out of turn as, for example, where such samples contain radioactive isotopes having a relatively short "half-life." Upon completion of measuring the activity levels of such samples, the normal sequential analysis of the remaining groups of samples may then be resumed.

A further object of the invention is to provide a multiple sample indexing mechanism for sequentially transferring a plurality of samples seriatim to a detection station, yet which permits of termination of the normal indexing operation to accommodate insertion of any given priority sample into the detection station out of order, and, upon completion of measuring the activity level of such priority sample, resumption of the normal sequential indexing movement.

It is a more detailed object of the invention to provide an improved handling and orienting mechanism for trays containing multiple radioactive samples which automatically compensates for any slight misalignment of the tray relative to the detection station. A related object of the invention is to provide an improved locating mechanism for insuring that each sample is accurately aligned with respect to the detection station so as to facilitate its insertion therein, and wherein the tray is locked in place until such time as the sample is returned to its tray compartment.

In yet another of its important aspects, it is an object of the invention to provide an improved sample tray for storing a plurality of radioactive samples and for transporting such samples in seriatim order to a detection station, yet wherein the component parts of the tray may be moved relative to one another from a position wherein all sample compartments are blocked to a position wherein one of the sample compartments is open to permit gravity discharge of the sample contained therein.

Other objects and advantages of the invention will become apparent as the following description proceeds, taken in conjunction with the accompanying drawings, in which:

FIGURE 1 is a front elevational view of a radioactive sample handling and measuring apparatus embodying the features of the present invention, here illustrating the component subassemblies of the apparatus housed in a suitable cabinet or console shown in phantom;

FIG. 2 is a horizontal sectional view taken substantially along the line 2—2 of FIG. 1;

FIG. 3 is a fragmentary detail view taken in section substantially along the line 3—3 of FIG. 2, and illustrating, in particular, portions of the tray orienting mechanism of the present invention;

FIG. 4 is a fragmentary bottom view of a sample tray taken substantially along the line 4—4 of FIG. 3, such tray here being used for storing discrete radioactive samples and for transporting such samples in seriatim orded to a detection station;

FIG. 5 is a sectional view taken substantially along the line 5—5 of FIG. 4, here illustrating the tray in an upright condition;

FIG. 6 is a plan view of the tray locating and indexing mechanism of the present invention taken substantially along the line 6—6 of FIG. 3, and illustrating also in broken lines the relative position of a sample tray during an indexing cycle of operation;

FIG. 7 is a bottom plan view taken substantially along the line 7—7 of FIG. 3 and illustrating particularly the details of the locating mechanism and the indexing drive arrangement;

FIG. 8 is an enlarged, fragmentary, plan view of the locating and indexing mechanisms, with certain parts removed for purposes of clarity, here illustrating the locating mechanism in the "cocked" position prior to latching engagement with the tray and, in phantom lines, the extent of tray movement required to shift the locating mechanism to the "uncocked" position;

FIG. 10 is an enlarged fragmentary sectional view taken substantially along the lines 10—10 of FIG. 6 and illustrating particularly the details of the indexing drive mechanism;

FIG. 11 is an enlarged, fragmentary, sectional view taken substantially along the line 11—11 of FIG. 6, here illustrating the details of the tray alignment drive mechanism;

FIG. 12 is a sectional view taken substantially along the line 12—12 of FIG. 8 and illustrating details of the locating mechanism;

FIG. 13 is an elevational view, partly in section, taken substantially along the line 13—13 of FIG. 8, here depicting the details of the sample or vial sensing mechanism;

FIG. 14 is a plan view taken substantially along the line 14—14 of FIG. 1, and illustrating portions of the tray storage and transfer mechanism;

FIG. 15 is an enlarged, fragmentary, rear elevation taken substantially along the line 15—15 of FIG. 14 and illustrating particularly details of the vertical and lateral tray transfer mechanisms;

FIG. 16 is an enlarged, fragmentary, vertical sectional view taken substantially along the line 16—16 of FIG. 14 and illustrating the drive arrangement for the vertical tray transfer mechanism;

FIG. 17 is a view similar to view FIG. 16 taken substantially along the line 17—17 of FIG. 14 and illustrating portions of the drive arrangement for the lateral tray transfer mechanism;

FIG. 18 is an enlarged fragmentary sectional view taken substantially along the line 18—18 of FIG. 15, here illustrating the interaction between the vertical tray transfer mechanism and the rotary tray locating mechanism;

FIG. 19 is an enlarged sectional view taken substantially along the line 19—19 of FIG. 15 illustrating a portion of the drive for the lateral tray transfer mechanism;

FIG. 20 is an enlarged, fragmentary, sectional view taken substantially along the line 20—20 of FIG. 14;

FIGS. 21a–21e are fragmentary schematic wiring diagrams of the electrical controls for the apparatus shown in FIG. 1; and, FIG. 22 is a block diagram of a conventional electrical system which accepts, counts, and records the output of a radiation detector.

Figure 9:
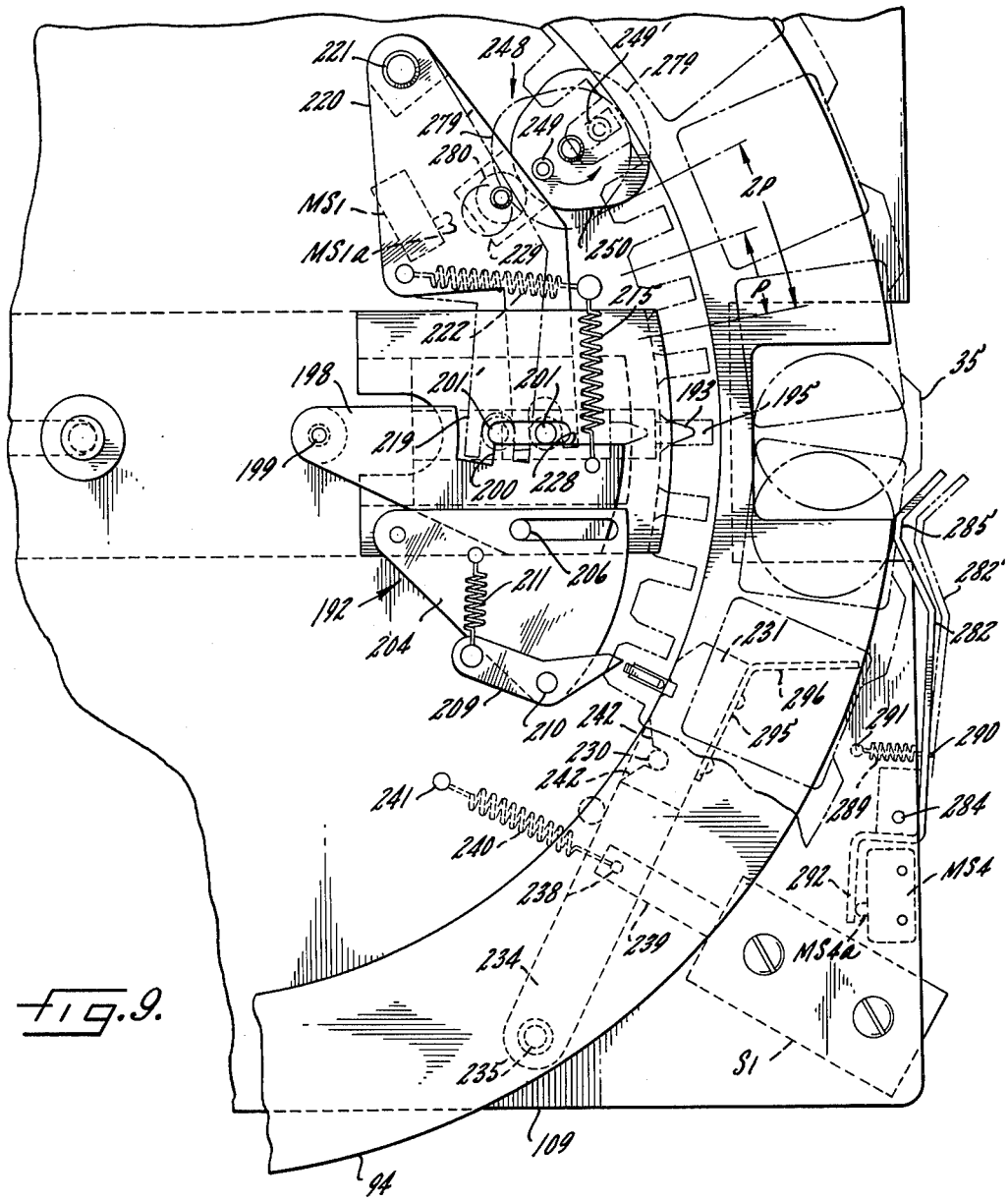
FIG. 9 is a view similar to FIG. 8, here depicting in solid lines the locating mechanism in the "uncocked" position, and, in phantom lines, the relative positions of the tray and indexing mechanism at the end of one quarter of a normal indexing step.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

*General organization of an exemplary sample processing apparatus*

Referring now to FIG. 1, the exemplary embodiment of the invention there illustrated is intended to store a plurality of trays of radioactive samples or specimens and to transfer such trays, one at a time, to a rotary sample indexing mechanism, the latter being adapted to align successive samples in each tray in seriatim order with an elevator mechanism in a radiation detector. To this end, the exemplary apparatus 30 includes an elevator and detector mechanism generally indicated at A, a rotary tray alignment and indexing mechanism generally indicated at B, and a tray storage and transfer mechanism generally indicated at C.

As best illustrated in FIG. 1, the various mechanisms A, B and C of the exemplary apparatus 30 are mounted in a console or cabinet 31, which is preferably refrigerated for the purpose of lowering the temperature of the samples to an equilibrium level so as to reduce thermal noise which otherwise tends to increase the level of spurious background signals. As here shown, the elevator and detector mechanism A is disposed in the lower end of the cabinet 31 with the rotary sample indexing mechanism B being physically mounted on the upper end of the elevator and detector mechanism. For the purpose of storing a plurality of trays of radioactive samples in readiness for transfer to the rotary sample indexing mechanism B the apparatus 30 includes left and right sets of vertically spaced shelves, generally indicated at 32 and 34 respectively. The arrangement is such that when the tray transfer components of the tray storage and transfer mechanism C are activated, trays 35 of samples 36 are shifted one at a time laterally towards the center of the apparatus 30 where the displaced tray 35 is supported on a vertically movable platform 38, the latter being utilized to lower the tray to a single sample select station defined by the rotary sample indexing mechanism B.

The cabinet or console 31 is dimensioned such that it defines a compartment 39 at its upper end which is suitable for receiving and mounting certain of the electrical components of the apparatus 30 such, for example, as printed circuit boards and the like (not shown). To provide for control of a sample changing and counting cycle, a plurality of manually operable switches are mounted on the front of the cabinet 31, there being three such switches 40, 41 and 42 shown diagrammatically in FIG. 1. The functions of the switches 40, 41 and 42 will be described more fully in conjunction with the control circuitry (FIGS. 21a–21a) for the exemplary apparatus. For the moment it should suffice to note that the switch 40 is a Mode Selector Switch, the switch 41 is a Cycles per Tray Switch, and the switch 42 is a Tray Selector Switch.

To facilitate an understanding of the present invention, the general organization and operation of the elevator and detector mechanism A will be briefly described hereinbelow. Those interested in a more complete operational and structural description of the mechanism A are referred to the copending application of Robert E. Olson, Serial No. 273,110, filed April 15, 1963, now Patent No. 3,198,-948, and assigned to the assignee of the present invention.

Referring to FIG. 1, it will be noted that the elevator and detector mechanism A includes a base assembly 44 which houses a pair of light transducers, for example, photomultipliers 45, 46, disposed on opposite sides of a vertical elevator shaft 48. Mounted within the elevator shaft 48 is an elevator 49 having a platform 50 at its upper end for reception of one of the radioactive test samples 36 from the rotary indexing mechanism B and transporting the sample downwardly into the elevator shaft where it is aligned between the photomultipliers 45 and 46. The samples 36 may, merely by way of example, simply comprise a vial or other suitable container within which is placed a liquid scintillator and the radioactive isotope or isotopes to be measured. Thus, as the isotope or isotopes undergo decay events, light scintillations are produced in the liquid scintillator in a manner well known to those skilled in the art, and such scintillations are then detected by the photomultipliers which produce electrical output signals in the form of voltage pulses corresponding to each light scintillation detected. At the completion of the counting cycle, the elevator 49 is returned upwardly to again position the sample 36 in the tray 35 from which it was removed. A shutter mechanism 51 is mounted on the upper end of the base assembly 44 for the purpose of preventing erroneous output signals from the photomultipliers 45, 46 resulting from environmental spectral radiation. At the same time, the base assembly 44 is formed of suitable shielding material such, for example, as lead, which serves to minimize the danger of environmental ionizing radiation causing light flashes in either the scintillation medium or the photomultipliers.

To effect vertical movement of the elevator 49 for the purpose of introducing samples 36 into and ejecting such samples out of the elevator shaft 48, the elevator 49 is drivingly coupled to a conventional reversible motor M1. As here illustrated, this is accomplished by affixing one end of an elevator cable 52 to the elevator 49 at a point 54 intermediate the ends of the latter, the opposite end of the cable 52 being trained about an idler pulley 55 and a pulley 56 which is eccentrically mounted on the shaft 58 of the motor M1. A second elevator cable 59 is affixed to the lower end of the elevator 49 as indicated at 60, the cable 59 also being trained about the idler pulley 55 and about a second pulley 61 which is mounted eccentrically on the shaft 58 of the motor M1. The arrangement is such that when the motor M1 is energized to run in a clockwise direction (as viewed in FIG. 1) the cable 59 will "pay off" its pulley 61 while the cable 52 will simultaneously "pay on" its pulley 56, thus lowering the elevator 49, and any sample contained thereon, into the elevator shaft 48. Of course, it will be appreciated that counterclockwise movement of the motor M1 (as viewed in FIG. 1) will serve to "pay out" the cable 52 and simultaneously "pay in" the cable 59, thus raising the elevator 49.

The energizing circuit for the motor M1 includes a lower limit switch LS1 (FIGS. 1 and 21a) which is mounted on the frame of the elevator and detector mechanism A in a position to have its actuator $LS1_a$ depressed by a laterally projecting flange 62 mounted on the lower end of the elevator when the latter is in a down position with the sample 36 carried thereon aligned between the photomultipliers 45 and 46. Depression of the actuator $LS1_a$ serves to deenergize the motor M1 and the apparatus is then ready for a counting cycle. A second limit switch LS2, included in a second energizing circuit for the motor M1, is mounted on the frame of the elevator and detector mechanism A in position to have its actuator $LS2_a$ depressed by the flange 62 when the elevator arrives at its uppermost limit position with the sample 36 carried thereon having been returned to the tray 35 from which it was removed. Thus, the limit switch LS2 serves to deenergize the motor M1 when the elevator reaches its uppermost limit position. The energizing circuits for initiating clockwise and counterclockwise rotation of the motor M1 will be described more fully in conjunction with the control circuit shown in FIGS. 21a–21e.

*Programming logic*

Since methods and apparatus embodying the features of the present invention will normally be used with an associated programming control circuit, a typical programming system, generally indicated at 63 (FIG. 22), will be briefly described hereinbelow. To this end and referring for the moment to FIG. 22, it will be observed that after a sample 36 has been properly positioned between the detector photomultipliers 45, 46, a signal is received on a terminal 64 (as explained more fully below) and passed over a line 65 to a program control 66. This signal indicates that a sample is "ready" for measurement. In response to such signal, the program control 66 passes a signal over lines 68 and 69 to open a gate 70 and start operation of a timer 71. During the predetermined interval measured off by the timer 71, voltage pulses produced by the photomultipliers 45, 46 are passed through an amplifier 72, and the open gate 70, to a scaler 74. At the end of the timed period, the timer supplies a signal over lines 75 and 76 to respectively close the gate 70 and indicate to the program control 66 that counting has been completed. In response to the signal received over line 76, the program control 66 first supplies an actuating signal over a line 78 to a printer 79. The latter is coupled to the scaler 74 by a channel 80 and thus prints out on a paper tape or the like the reading of the scaler 74. Following such "read out" by the printer 79, the program control 66 supplies signals over lines 81 and 82 to reset the scaler 74 and timer 71. At this time, the program control 66 also supplies a signal to a terminal 85 to signify that the sample in the detector should be changed.

As will be described more fully in conjunction with the control circuit shown in FIGS. 21a–21e, provision is also made for terminating a counting cycle for a given sample prior to completion of the timed period determined by the timer 71 in the event that the operator wishes, for example, to either insert a new sample into the elevator and detector mechanism A, or to position a new tray 35 in the rotary sample indexing mechanism B. Under these conditions, a signal is received on a terminal 86 and passed over a line 88 to the lines 75, 76 to respectively close the gate 70 and indicate to the program control 66 that the counting cycle is to be concluded. Thus, the program control 66 responds to a signal presented on terminal 86 in precisely the same manner as it responds to the signal produced on lines 75 and 76 at the completion of a normal counting cycle determined by the timer 71.

Because the system shown diagrammatically in FIG. 22 may take any of a variety of forms known to those skilled in the art, it need not be illustrated or described in greater detail. It will be understood, however, that the "count" printed out by the printer 79 will include responses to background radiation which produces scintillation flashes in the liquid scintillator and which is received from extraneous sources, such background responses being in addition to the responses to radiation from the sample being measured. However, this "background count" can be first measured with no sample, or a sample of known radioactive strength in the detector. The background count can then be subtracted from each sample reading to arrive at an indication of the samples' radiation strength.

Besides counting the number of responses by the photomultipliers in a predetermined time interval (preset time operation) may be measured and recorded, as is well of a predetermined number of responses (preset count operation) may be measured and recorded, as is well known. Moreover, as is also well known to those skilled in the art, it would be possible to provide a rate meter which permits printing out of counts per unit time, for example, counts per minute. Any of these systems provides an indication of the rate of radioactive emissions, and thus of radioactive strength.

The present invention is concerned with methods for segregating relatively large numbers of sample vials containing a liquid scintillator and a radioactive substance in discrete and totally independent spaced groups; transferring such groups one at a time upon demand to an indexing station; indexing each group to sequentially align all of the samples therein with a detector apparatus; measuring the activity levels of each sample; and for returning each group to its point of origin. The present invention is also concerned with an improved apparatus B (FIGS. 3 and 6) for accepting trays of samples in seriatim order; for properly aligning a reference point on such sample trays with the axis of a radiation detector elevator mechanism; and for successively indexing the tray to sequentially align all of the samples contained therein with the axis of the elevator mechanism. The apparatus B is here disclosed in conjunction with a tray storage and transfer mechanism C (FIGS. 14 and 15) which is disclosed and claimed in the copending application of Edmund Frank and Edward F. Polic, Serial No. 273,120, filed April 15, 1963, and assigned to the assignee of the present invention.

*Rotary tray alignment and indexing mechanism embodying the features of the present invention*

In carrying out the present invention, provision is made for positioning a plurality of sample vials 36 in separate compartments formed in the tray (there being twenty-four such compartments in the exemplary tray, here designated by the reference numerals 89–1 through 89–24, as best illustrated by reference to FIGS. 4 through 6 conjointly). The exemplary tray 35 is annular in configuration having an outer peripheral wall 90, an inner peripheral wall 91, and a plurality of radially disposed interconnecting wall portions 92 which here define the adjacent sample compartments 89–1 through 89–24. The compartments in the tray are "open-ended,"

thus permitting the insertion of sample vials through the upper end of the compartment and removal of the sample vials through the lower end of the compartment. However, the lower open ends of the compartments are normally blocked by means of a gate 94 which is permanently, yet slidably, secured to the lower surface of the tray by means of a plurality of clips 95 and threaded fasteners 96. In order to permit passage of one sample vial 36 at a time through the lower end of its confining compartment, the gate 94 is provided with a rectangular cut-out portion 98 which is dimensioned slightly larger than the size of the compartments.

While the gate 94 is mounted on the tray 35 with freedom for relative sliding movement with respect thereto, provision is made for normally latching the two tray components together in a fixed position with the radial interconnecting wall 92 disposed between compartments 89–1 and 89–24 extending transversely across the cut-out portion 98 in the gate (as best illustrated in FIG. 4). To this end, a latching member 99 is mounted in a vertical slot 100 formed in the inner peripheral wall 91 of the tray 35, the latching member being pivotally mounted on the tray 35 by means of a horizontally disposed pin 101 extending through the median portion of the latching member. The lower and radially outer edge of the latching member 99 has formed therein a slot 102 and a radially outwardly projecting tab 104, the slot 102 being positioned to interact with a corresponding slot 105 formed on the inner peripheral edge of the gate 94. When in the latched position, the outwardly extending tab 104 projects beneath the surface of the gate 94. The upper end of the latching member 99 is provided with an inwardly projecting radially disposed ear 106 which defines a stop member. For the purpose of normally biasing the latching member 99 into latched engagement with the gate 94 (that is, with the two notches 102, 105 respectively interengaged) a leaf spring 108 is positioned in the vertical slot 100, the spring tending to bias the latching member 99 in a counterclockwise direction (as viewed in FIG. 5) about its pivot pin 101. Thus, the spring 108 serves not only to normally bias the gate 94 and tray 95 into latched engagement, but it serves the additional function of urging the stop ear 106 radially inward relative to the inner wall 91 of the tray 35 and into its operative "stop" position.

In accordance with one of the important aspects of the present invention, provision is made for automatically and accurately aligning the rectangular notch 98 in the gate 94 of the tray 35 with the axis of the elevator shaft 48 in the elevator and detector mechanism A with rapidity and as an incident to placement of each tray 35 in the sample indexing station defined by the mechanism B. To this end, and as best illustrated by reference to FIGS. 3 and 6 conjointly, the exemplary mechanism B includes an indexing table 109 which is rigidly secured to the upper surface of the shield and base assembly 44, as for example, by means of a plurality of threaded fasteners, there being one such fastener 110 illustrated in FIG. 3.

A slide 111 depends from and is slidably supported by the indexing table 109 with freedom from reciprocable movement towards and away from the axis of the elevator shaft 48. To this end, the slide 111 includes an integral upwardly extending pin 112 which projects upwardly through an elongate slot 114 formed in the table 109 and terminates in an enlarged cap portion 115 having a substantially larger diameter than the width of the slot (FIG. 6). The arrangement is such that the slide 111 is suspended from the table 109 by the cap portion 115 while the pin 112 is free to ride back and forth in the slot 114. While the slide is shown in its forward position in FIG. 3 (i.e., advanced fully to the right as viewed therein), it is normally biased rearwardly by means of a spring 116 having its opposite ends bottomed on pins 118 and 119 rigidly formed on and projecting downwardly from the lower surface of the table 109 and slide 111 respectively.

To advance the slide 111 towards the axis of the elevator shaft 48 as an incident to bottoming of the vertically movable platform 38 and its associated drive mechanism (i.e., to the position shown in FIG. 3), a cable 120 is rigidly secured to the pin 119 on the slide and extends forwardly (to the right as viewed in FIG. 3) therefrom, the cable being trained about a pulley 121 which is rotatably mounted on bracket members 122 (FIGS. 3 and 7). The bracket members 122 are rigidly secured to the indexing table 109 and project downwardly therefrom through a notch 124 formed in the slide 111. Thus, the bracket 122 is fixed relative to the table 108. The free end of the cable 120 extends rearwardly from the pulley 121 and about an idler pulley 125 (FIGS. 3 and 18) which is journaled on brackets 126 integral with the rear frame of the apparatus (FIG. 15). This latter end of the cable 120 is rigidly secured to a cross bar 128 which projects through elongate vertical slots 129 formed in the brackets 126 and which is capable of moving in a vertical plane defined by the slots 129. A push rod 130 is integral with the bar 128 and extends upwardly therefrom.

The arrangement is such that when the vertically movable platform 38 moves downwardly towards the indexing table 109 (in a manner to be subsequently described in greater detail), it bottoms on the frame of the apparatus 30 with the lower surface of the platform 38 substantially flush with the upper surface of the table 109. However, a feed nut 131 (FIG. 18) in the vertical drive mechanism continues to feed downwardly along its lead screw 132, such additional downward movement of the nut 131 constituting an "overtravel" movement. As the feed nut overtravels, a rearwardly extending bracket 134 which is rigidly secured to the feed nut engages the upper end of the push rod 130 and serves to drive the latter downwardly to the position shown in FIG. 18. As the push bar 130 moves downwardly, it coacts with the cross bar 128 to pull the cable 120 rearwardly against the normal biasing effect of the spring 116, and such rearward movement of the cable tends to drive the slide 111 in a forward direction toward the axis of the elevator shaft.

As an incident to forward movement of the slide 111, provision is made for forming a three-point positioning support for accurately locating the annular tray 35 on the platform 38 irrespective of any slight misalignment that occurred when the tray was initially placed on the platform 38. To accomplish this, the slide 111 has rigidly formed thereon a positioning shoe 135 which is preferably made of a wear resistant material such, for example, as nylon, the shoe being secured to the slide by means of a plurality of threaded fasteners 136 (FIG. 12) passing through slots 138 formed in the indexing table 109. Thus, as the slide 111 moves forwardly toward the axis of the elevator shaft, the nylon shoe 135 moves forwardly therewith and its leading arcuate edge 139 (FIG. 3) engages an inner peripheral bearing surface 140 formed on the inner wall 91 of the tray 35 (FIGS. 3 and 5), thus defining one point of the three-point positioning means.

For the purpose of completing the three-point positioning support for accurately locating the tray 35 on the platform 38, the exemplary sample indexing mechanism B includes a pair of positioning rollers 141, 142 which are operatively associated with the slide 111 in such a manner that the rollers are urged into intimate rolling contact with the annular bearing surface 140 formed on the tray 35. To this end, the rollers 141, 142 are respectively mounted on bell cranks 144, 145, the bell cranks here being pivoted to the lower surface of the indexing table 109 as indicated at 146, 148 respectively (FIGS. 6 and 7). The bell cranks are normally biased about their respective pivot pins by means of springs 149, 150 which are respectively secured adjacent one end to the bell cranks 144, 145 as indicated at 151, 152. The opposite ends of the springs 149, 150 are rigidly secured to pins 154, 155 depending from the indexing table 109. Thus, the springs 149, 150 tend to urge the rollers outwardly and into operative positioning engagement with the bearing surface 140 on the tray 35.

In keeping with this aspect of the invention, means are provided for permitting outward movement of the rollers 141, 142 only as an incident to forward movement of the slide 111. As here illustrated, a pair of restraining pins 156, 158 are rigidly secured to the slide 111 and depend therefrom, the restraining pins being positioned to engage the spring loaded ends of the bell cranks 144, 145 for the purpose of controlling movement of the bell cranks and hence the rollers. Thus, as the feed nut 131 (FIG. 18) overtravels, the slide 111 is driven forwardly in the manner previously described so as to urge the arcuate face 139 of the shoe 135 into engagement with the bearing surface 140 on the tray 35. Simultaneously, the springs 149, 150 tend to bias the bell cranks 144, 145 about their respective pivot points so as to urge the rollers 141, 142 into operative engagement with the bearing surface 140, thus forming the three-point positive positioning required for accurately aligning the tray 35 about a predetermined axis. Referring to FIG. 3, it will be observed that the rollers and the shoe 135 are formed with a chamfered outwardly extending lip 159 positioned to overlie a complementary annular beveled surface 160 formed on the inner wall 91 of the tray 35. In this manner, the three-point positioning mechanism not only serves to accurately position the tray 35 for rotation about a predetermined axis, but it additionally serves to prevent upward movement of the tray. Of course, since the tray 35 is supported directly upon the vertically movable platform 38, the latter must include suitable apertures which permit the various tray alignment and indexing mechanisms to project upwardly through the platform and into operative engagement with the tray. Such apertures are best illustrated in FIG. 14 where it will be observed that the platform 38 is provided with five cut-out portions 161–165 which are formed in the platform so as to accommodate operative movement of the various components of the alignment and indexing mechanism. It will be noted also that the platform is further provided with a generally square opening 166 which is positioned to be registered with a similar opening 168 (FIG. 3) formed in the indexing table 109. Thus, as the platform 38 moves downwardly, the rollers 141, 142 are received within the cut-out portions 161, 162, the nylon shoe 135 is received within the opening 163, and the cap 115 on the slide supporting means is received within the cut-out portion 164. At the same time, the square opening 166 in the platform registers with the opening 168 in the indexing table, the two openings being symmetrically disposed about the axis of the elevator shaft 48 in the elevator and detector mechanism A.

Those skilled in the art will appreciate that before an automatic sample changing apparatus can serve any useful function, it must include some provision for identifying the count "read out" on the printer 79 (FIG. 22) with the corresponding one of the sample vials 36 that was then being counted. One way of doing this is to start counting a certain specified sample in each tray 35, for example, the sample 36 disposed in compartment 89–1, and then proceed to count sequentially each of the remaining samples located in the compartments 89–2 through 89–24 inclusive. However, normally, when a tray 35 is lowered by the platform 38, the notch 98 formed in the gate 94 will not be aligned with the axis of the elevator shaft in the detection mechanism A. That is, the notch 98 in the gate 94 can be displaced from the axis of the elevator shaft by as much as 180° in either direction, dependent upon the particular orientation of the tray 35 as it is originally placed on the platform 38. Therefore, the aligning mechanism B must not only include means for orienting the tray about a designated vertical axis, but it must also include provision for rapidly rotating the tray until such time as the notch 98 in the gate 94 is aligned with the registered notches 166, 168 in the platform 38 and indexing table 109 respectively.

To resolve the foregoing difficulty, the exemplary apparatus includes a friction drive mechanism generally indicated at 169 (FIGS. 6, 7 and 11) for rapidly rotating the tray 35 through the necessary angular increment to bring the gate notch 98 into alignment with the axis of the elevator shaft 48. As here illustrated, this is accomplished as an incident to forward movement of the slide 111, such movement serving to activate a microswitch MS1 (FIGS. 8 and 9) and complete an energizing circuit for a gear motor M2 (in a manner described in greater detail in conjunction with the description of the control circuit shown in FIGS. 21a–21e). The motor M2 serves to rotationally drive a friction drive roller 170 through a suitable gear train 171, 172, 173, 174, 175. For supporting the motor M2, a support bracket 176 is provided, the latter being secured to the lower surface of the indexing table 109 by means of spacers 178 and threaded fasteners 179 (FIG. 11). In this instance, the gear 174 is supported on and journalled for rotation about a stub shaft 180. The gear 174 is further provided with an upwardly projecting hub 181 about which is positioned an annular ring of friction material 182, the latter resting on the upper face of the gear 174. A lever arm 184 is mounted on the hub 181 with freedom for relative rotational movement with respect thereto. However, in order to effect limited rotational movement of the lever arm 184 with the gear 174, a spring 185 is interposed between the lever arm 184 and a washer or similar collar 186 which is prevented from moving axially relative to the hub 181 by a lock pin 188. The arrangement is such that the spring tends to urge the lever arm 184 axially into engagement with the friction material 182 so that rotation of the gear 174 tends to swing the lever arm 184 in the direction of rotational movement.

As best illustrated in FIG. 11, the lever arm 184 serves to rigidly support an upwardly extending tubular sleeve 189 within which is journalled a drive shaft 190 having the friction drive roller 170 mounted at its upper end. The lower end of the drive shaft 190 is received within and keyed to the output gear 175 which tends to act as a planetary gear orbiting about the sun gear 174. The arrangement is such that when the motor M2 is energized, the sun gear 174 is driven in a counterclockwise direction (as viewed in FIG. 6) through the gear train 171, 172, 173. When this occurs, the lever arm 184 is frictionally moved with the gear 174 about the axis of the latter, thus moving the sleeve 189, drive shaft 190 and friction drive roller 170 in a counterclockwise direction about the axis of the sun gear 174. At the same time, since the sun gear and planetary gear 175 have their teeth meshed, the latter gear is driven in a counterclockwise direction, thus serving to drive the friction drive roller 170 in a counterclockwise direction. It will be noted upon reference to FIGS. 6 and 11 conjointly, that the tubular sleeve 189 extends upwardly through a slot 191 formed in the table 109 and through the slot 161 in the platform. Thus, as the lever arm swings in a counterclockwise direction about the axis of the sun gear 174, the friction drive roller 170 (which is rotating in a clockwise direction) swings outwardly into engagement with the annular surface 140 formed on the inner wall of the tray. This causes cessation of further planetary movement of the gear 175 and counterclockwise movement of the lever arm 184. However, the frictional contact between the face of the sun gear 174 and the lever arm 184 provided by friction material 182 and spring 185 serves to positively urge the friction drive roller 170 into intimate driving engagement with the tray 35. Since the roller 170 is being driven in a clockwise direction, the tray will start to move in a clockwise direction so as to rotate the gate 94 in a clockwise direction and bring the notch 98 therein into alignment with the registered openings 166, 168 in the platform 38 and indexing table 109 respectively.

In keeping with one of the principal objectives of the invention, a tray locating mechanism, generally indicated at 192 in FIG. 8, is provided for terminating clockwise rotation of the tray 35 when the notch 98 in the gate is properly aligned with the axis of the elevator shaft 48 in the detector mechanism A. In the illustrative form of the invention, the tray locating mechanism includes a locating pin 193 which is slidably mounted in a slot 194 (FIGS. 8 and 12) formed in the nylon shoe 135 and adapted to be driven forwardly into latching engagement with one of forty-eight notches 195 defined by gear teeth 196 formed in the inner wall 91 of the tray. The locating pin 193 is normally held in its rearmost retracted position by means of a latching link 198 which is pivotally mounted at 199 to the indexing table 109, the latching link 198 having a notch 200 formed therein and adapted to receive a vertically disposed pin 201, integral with the locating pin 193. The pin 201 extends upwardly through an elongated slot 202 formed in the nylon shoe 135, thus permitting sliding movement of the locating pin 193 and vertical pin 201 in the slots 194, 202, respectively.

For the puropse of disengaging the vertical pin 201 from the notch 200, means are provided for pivoting the latching link 198 in a clockwise direction about its pivot point 199 as the tray 35 reaches a predetermined reference position. In this instance, this is accomplished by providing a pie-shaped link 204 which is pivotally mounted to the nylon shoe 135 adjacent its apex 205 and which is operatively associated with the latching link 198 through a connection defined by a pin 206 integral with the latching link 198 and which extends upwardly and is received within an elongate slot 208 formed in the link 204. A stop pawl 209 is pivotally mounted at 210 to the link 204 adjacent its outer perimeter, the pawl being biased into its operative "stop" position by means of a spring 211 bottomed on pins 212, 214 respectively secured to the link 204 and the stop pawl 209. As best illustrated in FIG. 12, it will be observed that the pin 214 projects downwardly beneath the plane of the link 204 and consequently the spring 211 tends to urge the pin 214 into engagement with the edge of the link.

Referring to FIGS. 8 and 12 conjointly, it will be noted that the stop pawl 209 is positioned so that as the tray 35 rotates in a clockwise direction, the pawl will be engaged by the radially inwardly projecting ear 106 formed on the latching lever 99 of the gate. Thus, continued clockwise rotation of the tray under the influence of the friction drive roller 170 will serve to swing the stop pawl 209 and link 204 from the solid line position shown in FIG. 8 to the dotted line positions 209′, 204′. This serves to pivot the latching link 198 in a clockwise direction about its pivot 199 through the interaction of the pin 206 and slot 208, the link 198 being pivoted against the biasing force provided by a spring 215 having its opposite ends bottomed on pins 216, 218 respectively mounted on the indexing table 109 and the link 198. As the links 204, 198 swing, the vertically disposed pin 201 is freed from its latched engagement with the notch 200 formed in the link 198, thus permitting the locating pin 193 to be driven forwardly into a now aligned notch 195 (FIG. 9) formed in the tray.

Pursuant to the present invention, provision is made for affirmatively driving the locating pin 193 into the aligned notch 195 in the tray so as to inhibit further rotation of the latter. To this end, the vertically disposed pin 201 is confined within a bifurcated arm 219 on a link 220, the latter being pivotally mounted at 221 to the indexing table 109. The link 220 is normally biased in a counterclockwise direction (as viewed in FIG. 8) about the pivot pin 221 by means of a spring 222 having its opposite ends respectively bottomed on the pin 216 and a pin 224, the latter pin being integral with the link 220. As best illustrated in FIG. 12, the bifurcated arm 219 of the link 220 is received within a transverse slot 226 formed in the nylon block 135 and is permitted to slide therein under the influence of spring 222 when the pin 201 is freed from the notch 200.

As a consequence of the foregoing arrangement, as the tray 35 is driven in a clockwise direction by the friction drive roller 170, the ear 106 on the latching lever 99 will engage the stop pawl 209 at the relative solid line positions shown in FIG. 8. Continued clockwise rotational movement through a few additional degrees will shift the lever 204 to the dotted line position 204′ shown in FIG. 8, at which time the pin 201 is freed from the notch 200 and the spring 222 will serve to drive the bifurcated arm 219 in a counterclockwise direction about its pivot point 221, thus driving the locating pin 193 forwardly into an aligned notch 195 in the tray (as indicated by the solid line position of the components shown in FIG. 9). In this position the upstanding pin 201 is free for sliding movement along an edge 228 of the latching link 198. As the link 220 pivots, a downwardly projecting lug 229 (FIGS. 8, 9 and 12) formed thereon releases the actuator MS1$_a$ of the microswitch MS1, thus breaking the energizing circuit for the gear motor M2 and terminating rotation of the friction drive roller 170.

In accordance with another of the important aspects of the present invention, provision is made for latching the gate 94 of the tray 35 in a fixed position with the notch 98 formed therein symmetrically disposed about the vertical axis of the elevator shaft 48. To this end, a downwardly projecting latching pin 230 is integrally formed on the bottom surface of the gate 94. A latching block 231, having a pin receiving notch 232 formed therein, is rigidly mounted on a lever arm 234, the latter being pivotally mounted at 235 to the bottom surface of the indexing table 109 so that the block 231 projects upwardly through an opening 236 (FIG. 7) formed in the indexing table 109 and through the aligned opening 165 (FIG. 14) formed in the platform 38. For the purpose of pivoting the latching block 231 to its inoperative position, the lever arm 234 is pinned at 238 to the armature 239 of a solenoid S1 and is held in its inoperative position against the bias provided by a spring 240, having one end bottomed on the pin 238 and its opposite end bottomed on a pin 241 integral with the table 109, when the solenoid is energized. As will be described in greater detail in conjunction with the operation of the control circuit, the foregoing arrangement is such that when the actuator MS1$_a$ of the microswitch MS1 is released to deenergize the gear motor M2 for the friction drive roller 170, the solenoid S1 is also deenergized, thus permitting the spring 240 to urge the lever 234 in a counterclockwise direction (as viewed in FIGS. 8 and 9) from an inoperative position (FIG. 8) to a position where the pin 230 on the gate 94 is operatively received within the notch 232 formed in the latching block (FIG. 9), thus positively inhibiting further rotation of the gate.

In the event of any slight misalignment between the pin 230 and the notch 232, cam surfaces 242 formed in the block 231 at the entrance to the notch 232 will serve to cam the gate 94 through a sufficient angular increment to permit the block 231 to snap into latching engagement with the pin 230. At the same time, the vertical edge 244 of the block 231 engages the radially outwardly extending tab 104 formed on the lower end of the latching lever 99 of the gate (FIGS. 5 and 8), thus serving to pivot the lever 99 in a clockwise direction (as viewed in FIG. 5) about its pivot point 101 against the bias of the leaf spring 108. This serves to disengage the notch 102 formed in the latching lever 99 from the notch 105 formed in the gate, thus freeing the tray 35 for rotational indexing movement relative to the gate. As the tray takes its first indexing step (in a manner to be described below), the tab 104 will be free from engagement with the surface 244 of the latching block 231 and the spring 108 will again urge the latching lever 99 in a counterclockwise direction (as viewed in FIG. 5) with the notch 102 formed therein now riding along the unnotched portion of the inner periphery of gate 94.

The present invention is also concerned with a novel indexing mechanism for first indexing the tray 35 through an angular increment corresponding to the pitch P of the gear teeth 196 formed in the tray 35 (a distance which corresponds to one-half the distance between center lines of adjacent tray compartments) so as to bring the center line of compartment 89–1 into alignment with the axis of the elevator shaft 48 and, thereafter for indexing the tray in stepwise fashion through angular distances corresponding to twice the pitch 2P of the gear teeth, thus permitting the tray to be sequentially indexed to positions permitting gravity discharge of sample vials contained in compartment 89–1 through 89–24. Upon completion of processing the twenty-fourth test sample, and upon its return to compartment 89–24, the tray 35 is again indexed through an angular increment corresponding to the pitch P of the gear teeth 196. Such indexing movement of the tray 35 is effected by an indexing mechanism, generally indicated at 248 in FIGS. 9 and 10. To this end, the indexing mechanism 248 includes a Geneva pin 249 which is mounted on the upper surface of a cam 250, the latter being journalled on a stub shaft 251 rigidly secured to and projecting upwardly from the upper end of the shield and base assembly 44. The cam and Geneva pin pass through an opening 252 formed in the indexing table 109 and through the opening 163 (FIG. 14) formed in the platform 38. For the purpose of driving the Geneva pin 249 through a circular path about the axis defined by shaft 251 so as to permit the pin to enter the forty-eight slots 195 in the tray 35 in sequential order, thus rotationally indexing the tray, the hub 254 of the cam 250 has rigidly secured thereto a sprocket wheel 255, the latter being operatively coupled to a second sprocket wheel 256 keyed to the output shaft 258 of a motor M3 by means of a sprocket drive chain 259. In the exemplary apparatus, the sprocket wheels 255, 256 are respectively dimensioned so that the Geneva pin 249 and cam 250 will make two complete revolutions for every one revolution of the motor drive shaft 258. As best illustrated in FIGS. 7 and 10, the motor M3 is rigidly secured to and depends from a mounting platform 260 which is rigidly secured to the bottom surface of the indexing table 109 by means of a plurality of spacers 261 and threaded fasteners 262.

The energizing circuit for the motor M3 (to be described in greater detail in conjunction with FIGS. 21a–21e) includes the microswitch MS1 and a pair of microswitches MS2, MS3 (FIG. 10) the latter two microswitches being respectively supported on brackets 264 and 265 integral with the mounting platform 260. However, in order to understand the physical relationship of the components, it will be observed upon inspection of FIG. 10 that the microswitch MS2 has its actuator MS2$_a$ depressed once during each revolution of the drive shaft 258 of motor M3 by a cam 266 projecting radially out of the hub 268 of the drive sprocket 256. This serves to break the energizing circuit for the motor M3 after each complete revolution of the drive sprocket 256. It will be understood from the foregoing description, however, that when the twenty-fourth sample has been returned to compartment 89–24, and the tray 35 is ready to be removed from the indexing table 109, provision must be made for terminating rotation of the drive shaft 258 of motor M3 at the end of only one-half revolution (i.e., when the cam 266 is 180° out of phase with the actuator MS2$_a$ of the microswitch MS2), thus insuring that the Geneva pin 249 makes only a single complete revolution to index the tray 35 through an angular increment corresponding to the pitch P of the gear teeth 196 formed on the inner wall 91 of the tray. In this manner, the tray indexing movement stops when the radial wall 92 of the tray that separates compartments 89–1 and 89–24 is aligned with the axis of the elevator shaft 48.

To accomplish this, a pinion gear 269, which is keyed to the motor drive shaft 258, forms the input of a gear train including gears 269, 270, 271 and 272, the gears 270 and 271 being rigidly secured together for rotation about a shaft 274 projecting upwardly from the mounting platform 260. As here illustrated, the output gear 272 of the exemplary apparatus is rigidly secured to a shaft 275 coupled to a rotary wafer switch 276 mounted on and depending from the platform 260. The wafer switch 276 serves (in a manner to be described in conjunction with the control circuitry) as a memory for the control circuitry which provides a continuous indication of the particular sample being counted. The gear train 269, 270, 271, 272 is designed to provide a twenty-four to one gear reduction, thereby insuring that the gear 272 makes only one full revolution for every twenty-four revolutions of the motor drive shaft 258 and, of course, only one complete revolution for every forty-eight revolutions of the Geneva pin 249. Thus, a cam 278 positioned on the gear 272 will engage the actuator MS3$_a$ of the microswitch MS3 once during every revolution of the gear 272, and consequently, once during every twenty-four revolutions of the drive shaft 258 for the motor M3. When this occurs, the motor M3 is deenergized. It will be appreciated from the foregoing description that, by positioning the microswitches MS2, MS3 and their respective actuating cams 266, 278 so that they are activated 180° out of phase once every twenty-four revolutions, provision is made for breaking the energizing circuit for the motor M3 when the compartments 89–1 and 89–24 in the tray 35 are centered over the axis of the elevator shaft 48—that is, the tray is returned to the same relative position with respect to the gate 94 as it occupied before indexing of the tray commenced. Hence, the tray and gate are conditioned to be relatched by the latching member 99 (FIG. 5).

Of course, it will be understood that to permit the above indexing movement, provision must be made for retracting the locating pin 193 from engagement with the notch 195 defined by the gear teeth 196 in the tray 35 as the latter is rotated by the Geneva pin 249. To this end, and as best illustrated in FIG. 9, the cam 250 which supports the Geneva pin is provided with a cam surface 279 which is dimensioned to coact with a member 280 projecting downwardly and secured to the lug 229 on the link 220 (FIGS. 9 and 12) once during each revolution of the Geneva pin. The arrangement is such that as the cam surface 279 on the cam 250 moves from the solid line position shown in FIG. 9 to the dotted line position 279', it engages the member 280 and cams the link 220 in a clockwise direction (as viewed in FIG. 9) about the pivot point 221 and against the bias provided by spring 222, thus serving to retract the locating pin 193 from the notch 195 in the tray through coaction of the bifurcated arm 219 on the link 220 and the vertical pin 201 associated with the locating pin 193. However, the throw of the cam, while sufficient to retract the pin 193 fully from engagement with the tray 35, is not sufficient to return the vertical pin 201 into the notch 200 formed in the link 198. Thus, it will be noted in FIG. 9 that the latching pin 201 moves rearwardly only to the point 201' where it is still riding on the edge 228 of the latching link 198, and consequently the alignment mechanism 192 remains "uncocked". Of course, at the same time that the foregoing camming action takes place to remove the locating pin 193 from engagement with the tray 35, the Geneva pin 249 moves from the solid line position shown in FIG. 9 to the dotted line position 249', thus entering one of the notches 195 so as to initiate rotational indexing of the tray. As the Geneva pin moves through one complete revolution from the solid line position shown in FIG. 9 and back again, the tray 35 will move an angular increment corresponding to the pitch P of the teeth 196 while the locating pin 193 will leave one notch 195 and return to latching engagement with the next adjacent notch. Since the cam 266 (FIG. 10) on the hub 268 of the drive sprocket 256 starts out 180° out of phase with the actuator MS2ₐ of microswitch MS2 and since the motor drive shaft 258 makes only one-half revolution as the Geneva pin 249 moves through a complete revolution, the cam 266 will now engage the microswitch actuator MS2ₐ and the indexing motor M3 will be deenergized.

During the preceding indexing cycle, the sample located in compartment 89–1 slides relative to the latched gate 94 and, when the motor M3 is deenergized (i.e. when the cam 266 engages the microswitch actuator MS2ₐ), the sample is located on the platform 50 of the elevator and detector mechanism A (FIG. 1). Upon deenergization of the motor M3, an energizing circuit is automatically completed for the motor M1 associated with the elevator and drive mechanism A, thus lowering the sample to a "count" position between the light transducers 45, 46. When the count has been completed, the signal produced on the terminal 85 (FIG. 22) serves to again energize the motor M1 and returns the elevator shaft 49 upwardly to return the first sample to the compartment 89–1. As previously described, when the elevator reaches its uppermost limit position, the flange 62 thereon engages the actuator LS2ₐ of the limit switch LS2 to deenergize the motor M1. At the same time, an energizing circuit is again completed for the indexing motor M3 to index the tray in a counterclockwise direction (as viewed in FIG. 9) so as to bring compartment 89–2 into alignment with the elevator shaft 48.

When the index motor M3 is again energized as described above, the cam 266 on the drive sprocket 256 (FIG. 10) will move through one complete revolution before again engaging the microswitch actuator MS2ₐ. Consequently, the Geneva pin 249 will move through two complete revolutions to index the tray 35 an angular increment corresponding to twice the pitch 2P of the teeth 196. During this cycle of operation, the latching pin 193 will be cammed rearwardly two times so that it will be engaged with two successive notches 195 in the tray in stepwise fashion. In this manner, the tray 35 is indexed to bring the compartments 89–2 through 89–24 sequentially into registration with the elevator shaft 48. And, of course, when the last sample is returned to its compartment, the tray 35 will be indexed only through an angular increment corresponding to the pitch P of the teeth to move the tray back to its original position as shown in FIG. 9. During the entire cycle of indexing movement of the tray 35, the solenoid S1 remains deenergized since the link 220 is never cammed rearwardly far enough to again depress the actuator MS1ₐ of the microswitch MS1. Consequently, the gate 94 on the tray remains latched in a fixed position with its notch 98 registered with the axis of the elevator shaft, thus permitting the successive samples to be sequentially lowered into the detector assembly A by the elevator 49 (FIG. 1).

In keeping with the present invention, provision is made for removing the tray 35 from the rotary sample indexing mechanism B when the last sample is returned to its respective compartment and the tray 35 is indexed to the position shown in FIG. 9. To this end, when the tray 35 is returned to a position with the radial wall 92 separating compartments 89–1 and 89–24 aligned with the axis of the elevator shaft 48, the microswitch MS3 functions not only to break the energizing circuit for the indexing motor M3 in the manner described above, but it additionally completes an energizing circuit for the vertical drive mechanism associated with the tray storage and transfer mechanism C (in a manner described in connection with FIGS. 21a–21e). When this occurs, the feed nut 131 (FIG. 18) starts to feed upwardly along the now driven lead screw 132. As the nut 131 moves upwardly, the bracket 134 associated therewith also moves upwardly, thus slackening the cable 120 and permitting the spring 116 (FIG. 3) to urge the slide 111 rearwardly. As the slide is retracted, the nylon shoe 135 is moved away from the annular bearing surface of the tray 35. At the same time, the restraining pins 156, 158 (FIG. 7) on the slide 111 coact with the spring loaded ends of the bell cranks 144, 145 to pivot the latter against the bias provided by springs 149, 150 so as to urge the positioning rollers 141, 142 inwardly out of engagement with the tray 35. A projecting arm 281 integral with the bell crank 144 engages the tubular sleeve 189 on the alignment mechanism 169 (FIGS. 6, 7 and 11), thus pivoting the friction drive roller 170 and lever arm 184 inwardly and out of engagement with the tray 35.

As the slide 111 continues its rearward movement under the influence of spring 116, the vertical pin 201 (FIGS. 8 and 9) is engaged by the wall of the nylon shoe 135 adjacent the end of the elongate slot 202 formed therein, thus carrying the pin 201 rearwardly along the edge 228 of the link 198. At the same time, since the pin 201 is integral with the locating pin 193 and operatively associated with the bifurcated arm 219 of the link 220, the former is retracted from engagement with the tray 35 while the latter is pivoted in a clockwise direction (as viewed in FIGS. 8 and 9) about the pivot pin 221 against the biasing effect of the spring 222. Continued rearward movement of the slide 111 and the nylon shoe 135 serves to again align the upstanding portion of the pin 201 with the notch 200 formed in the link 198. When this occurs, the spring 215 serves to snap the latching link 198 in a counterclockwise direction about its pivot 189, again engaging the pin 201 in the notch 200 and "cocking" the locating mechanism 192. The locating mechanism is now returned to the solid line position shown in FIG. 8. Consequently, the actuator MS1ₐ for the microswitch MS1 is again depressed by the lug 229 on the link 220, thus serving to complete an energizing circuit for the solenoid S1. When this occurs, the armature 239 of the solenoid is retracted, pivoting the lever arm 234 in a clockwise direction (as viewed in FIG. 9) about its pivot point 235 to the position shown in FIG. 8. As the lever arm 234 moves rearwardly, the latching block 231 is disengaged from the pin 230 on the gate and from the tab 104 on the latching lever 99, thereby permitting counterclockwise pivotal movement of the latching lever 99 (as viewed in FIG. 5) about its pivot pin 101 to operatively engage the latching notches 102, 105 respectively formed on the lever 99 and the gate 94. The tray 35 is now free from operative engagement with the various portions of the sample indexing and alignment mechanism B and is free to move upwardly with the platform 38 as the feed nut 131 (FIG. 18) continues to feed upwardly along the lead screw 132.

In keeping with the present invention and in furtherance of the objective to provide a completely automatic sample changing mechanism, provision is made in the exemplary apparatus for detecting the presence or absence of sample vials 36 in the compartments 89–1 through 89–24, and for automatically effecting multiple stepping of the indexing mechanism past any of those compartments which do not contain a sample vial. To accomplish this, a sensing lever 282 (FIGS. 8 and 13) is pivotally mounted to the indexing table 109, as indicated at 284. The lever 282 is provided with an off-set vial sensing portion 285 which is adapted to ride along the outer surface 286 of the outer wall 90 on the tray 35. As best illustrated by reference to FIGS. 5, 9 and 13 conjointly, it will be noted that the outer wall 90 of the tray is provided with a plurality of cut-out notches 288 adjacent the lower edge of the wall, there being one notch associated with each of the compartments 89–1 through 89–24. The notches 288 extend entirely through the outer wall 90 and communicate with the interior of the respective tray compartments. The lever 282 is spring loaded by means of a spring 289 having its opposite ends bottomed on the lever 284 and the indexing table 109, as indicated at 290, 291 respectively. Thus, when the tray 35 is indexing, the vial sensing portion 285 of the lever 282 will ride along the outer surface 286 of the tray wall 90 as represented by the dotted line position 282' shown in FIG. 9. As the tray indexes, the vial sensing portion 285 of the lever 282 will be snapped into the slots 288 by the spring 289 and, if a sample vial 36 is present in the compartment, the sensing portion 285 will engage the outer surface of the vial, thus occupying the solid line position shown in FIG. 9 for the sensing lever 282. On the other hand, if no vial is present in the compartment, the vial sensing lever will continue radially into the compartment, thus effecting greater pivotal movement of the lever about its pivot 284. Such continued pivotal movement representative of an empty compartment is detected by a microswitch MS4 having its actuator MS4$_a$ operatively associated with an actuating tab 292 formed on the lever 282.

Referring to FIG. 9, it will be appreciated that the sensing portion 285 of the lever 282 is centered with respect to one of the notches 288 at the instant that two adjacent compartments in the tray 35 are symmetrically positioned relative to the axis of the elevator shaft— that is, just prior to the time that the particular compartment being sensed is registered with the notch 98 in the gate 94. Accordingly, the present invention contemplates the provision of means for insuring that the vial sensing mechanism is incapacitated at all times other than the instant when the sensing portion 285 of the lever 282 is precisely aligned with the center of a notch 288 formed in the tray, thus insuring that an erroneous "vial present signal" is not generated by the wall 90 of the tray. While the operation of the vial sensing circuit will be described in greater detail in connection with the control circuit shown in FIGS. 21a–21e, reference is here made to FIG. 10 wherein it will be observed that a microswitch MS5 is mounted on a bracket 294, the latter being supported on the mounting platform 260. As here illustrated, the microswitch MS5 is positioned so that its actuator MS5$_a$ will be engaged and depressed by the cam 266 on the hub 268 of the drive sprocket 256. However, the microswitch MS5 is mounted in such a manner that its actuator will be depressed by the cam 266 after the motor shaft 258 of the indexing motor M3 has moved through one-half revolution. The arrangement is such that the microswitch MS5 completes an energizing circuit for the vial sensing mechanism only momentarily at the completion of the first rotation of the Geneva pin 249—that is, at the moment when the sensing portion 285 of the lever 282 is precisely alined with the notch 288. At this poinnt, if the actuator MS4$_a$ of the microswitch MS4 is also depressed, the control circuit will receive a signal informing it of the absence of a vial from the upcoming compartment and this signal will be utilized (in a manner to be described in greater detail in connection with the circuitry shown in FIGS. 21a through 21e) to incapacitate the microswitch MS2 and prevent deenergization of the indexing motor M3 when the cam 266 next engages the actuator MS2$_a$ of the microswitch MS2. Consequently, the indexing motor M3 will move into another cycle of indexing movement.

Provision is made in the illustrative sensing mechanism for pivoting the lever 282 completely out of the path of the tray 35 prior to removal of the tray from the sample indexing mechanism. To this end, a generally L-shaped bracket 295 is rigidly secured to the latching block 231 in such a manner that a laterally projecting arm 296 formed thereon engages the sensing lever 282 as an incident to energization of the solenoid S1. Thus, at the same time the gate 94 is unlatched from the block 231, the lever is shifted to the position indicated at 282" in FIG. 8.

Those skilled in the art will appreciate that while the exemplary apparatus B has been described in connection with an alignment drive mechanism 169 (FIG. 11) which serves to rapidly rotate the tray 35 in a clockwise direction (as viewed in FIG. 6) and an indexing drive mechanism generally indicated at 248 (FIG. 10) for indexing the tray in a counterclockwise direction, other drive arrangements could be utilized and still fall within the spirit and scope of the present invention. Merely by way of example, it would be entirely feasible to utilize an alignment mechanism 169 which runs in a counterclockwise direction. Alternatively, by the use of suitable overrunning clutches or the like (not shown), both mechanisms could be run in the same direction. Such modifications would simply require minor revisions to the relative positions of the stop pawl 209 (FIG. 8) and the latching lever 99 on the gate 35.

In order to facilitate a complete understanding of the present invention, an exemplary tray storage and transfer mechanism C that can be used with the present invention is illustrated in FIGS. 14–20 and will be described in detail below.

*Storage and transfer mechanism*

In order to provide facilities for storing a plurality of trays 35 of samples 36, the left and right stacks of vertically spaced shelves, generally indicated at 32 and 34 respectively in FIG. 1, each include ten shelves, here designated by the reference numerals 32a–32j and 34a–34j, respectively. Of course, as the ensuing description proceeds, those skilled in the art will appreciate that any other number $n$ of shelves could be located in either of the stacks 32, 34, with the maximum number of shelves being limited only by the height of the trays 35 of sample vials 36 and the practical limits within which the technicians can be expected to work. Moreover, the mechanism C could also include a number $m$ of stacks of shelves than the two stacks illustrated at 32, 34 in the exemplary apparatus 30.

Referring to FIGS. 1 and 15, it will be observed that the shelves 32a–32j and 34a–34j in the exemplary apparatus are held in rigid, spaced apart relation by means of a plurality of tie bolts 300 and concentric spacers 301, the tie bolts passing through a lower frame 302, all of the shelves in the stacks 32, 34, and through an upper frame 304. Thus, the spacer sleeves 301 which surround the tie bolts 300 are interposed between adjacent shelves. The entire assemblage is clamped together by means of nuts 305 which are threaded on the opposite ends of the tie bolts 300. In the present instance, two such tie bolts 300 are employed with each of the stacks of shelves 32, 34. To facilitate placing trays 35 of samples 36 on the shelves and removing them therefrom, the front edge of each shelf is cut away, as indicated at 306 in FIGS. 2 and 14. In this manner, the technician is able to readily grasp the tray for the purpose of removing it from the shelf. An additional positioning guide 308, integral with the rearmost and outermost edge of each of the shelves is provided, the guide projecting slightly above the level of the shelf and serving to accurately locate the sample trays 35 thereon.

Provision is made in the present apparatus for returning each tray 35 from the sample indexing mechanism B of the present invention to the particular level and to the particular shelf from which that tray was removed and, during a tray loading operation, for lowering the tray from its respective level to the rotary sample mechanism B. To accomplish this, the vertically movable platform 38 is supported on a carriage 309 (FIGS. 15 and 18) adapted to be raised and lowered along a pair of parallel, vertical guide bars 310, 311 which are rigidly secured adjacent their upper and lower ends on the frame of the apparatus. To effect such vertical movement of the carriage 39, the latter includes a centrally disposed, rectangular cut-out portion 312 which serves to house the feed nut 131. To accommodate the vertically disposed lead screw 132, the upper and lower portions of the carriage 309 are provided with enlarged vertical bores 314 (FIG. 18). The arrangement is such that as the feed screw 132 is rotationally driven, the nut 131 traverses the screw in a vertical direction. Thus, as the nut moves upwardly from its overtravel position (FIG. 18), the upper surface 315 of the nut engages the upper surface 316 of the rectangular cut-out portion 312. Continued upward movement of the nut 131 will serve to raise the carriage 309 upwardly on the guide bars 310, 311. Of course, as the nut 131 is threaded downwardly, the carriage 309 also moves downwardly since the carriage is supported by abutment of the cooperating faces 315, 316 on the feed nut 131 and carriage 309 respectively. Indeed, as best illustrated in FIGS. 15 and 18, the upper face 315 of the nut 131 and the upper face 316 of the cut-out portion 312 on the carriage 309, are biased towards one another by means of a pair of springs 318, 319, which are respectively bottomed adjacent their upper ends to the carriage 309, and adjacent their lower ends to the bracket 134 used to drive the push rod 130 downwardly. Referring to FIGS. 3 and 18, it will be observed that the vertically movable platform 38 is carried by and rigidly supported on a pair of forwardly projecting support frames (one of which is shown at 320), the frames 320 extending forwardly from a transverse T-shaped carriage member 321 integral with the carriage 309.

In order to drive the lead screw 132 to effect vertical movement of the feed nut 131, and hence of the carriage 309, the upper end of the screw projects upwardly through bearings 322 (FIG. 16) rigidly secured in the upper frame 304, the projecting end of the screw 132 having keyed thereto a sprocket wheel 324 which is held in place axially by means of a nut 325. A vertical drive motor M4 depends from and is rigidly supported on the upper frame 304 by means of a plurality of threaded fasteners 326 and spacer elements 328. The drive shaft 329 of the motor M4 projects upwardly through an opening 330 formed in the frame 304 and has a drive sprocket 331 rigidly keyed thereto. To transmit rotational drive from the vertical drive motor M4 to the lead screw 132, a continuous sprocket chain 332 is trained about the sprockets 324, 331.

To deenergize the motor M4 when the carriage 309 has bottomed on the frame of the apparatus and the feed nut 131 has completed its overtravel movement, the energizing circuit for the motor M4 includes a microswitch MS6 (FIG. 15) having an actuator $MS6_a$, the microswitch here being shown mounted on a mounting bracket 334 integral with the frame of the apparatus. As the feed nut 131 overtravels (to the position shown in FIGS. 15 and 18), the rearwardly extending bracket 134 integral with the nut 131 engages a roller 335 carried on a resilient actuating lever 336, thus serving to cam the lever 336 into the actuator $MS6_a$ of the microswitch MS6 and breaking the energizing circuit for the motor M4 (the circuit being described in greater detail in connection with FIGS. 21a–21e).

To insure that the motor M4 is deenergized during vertical upward movement of the carriage 309 when the platform 38 is properly aligned with the shelf from which the sample tray 35 was removed, provision must be made in the exemplary apparatus for creating a stop signal which is effective to turn the motor M4 off as the platform 38 is aligned with each of the vertical levels of shelves. To accomplish this, the drive shaft 329 of the motor M4 has coupled to its uppermost projecting end, a bevel gear 338 which is meshed with a second bevel gear 339 mounted on the input shaft 340 of a suitable speed reducing gear box 341 (FIGS. 14 and 16). Suitable gearing (not shown) is provided in the gear box 341 for providing a gear reduction to the output shaft 342 thereof. A disc-like cam 344 (FIGS. 14, 15) is keyed to the shaft 342 for simultaneous rotation therewith. The arrangement is such that as the carriage 309 moves upwardly from its lowermost position (wherein the vertically movable platform 38 rests on the index table 109 of the sample indexing mechanism B as shown in FIG. 3) to its uppermost position adjacent the shelves 32j, 34j, the cam 344 makes slightly less than one complete revolution. As best illustrated in FIG. 15, the disc-like cam 344 has formed therein a plurality of notches 345 which are equally spaced about the periphery thereof and which correspond to different vertical increments of movement of the carriage 309. Thus, the notch designated at 345x corresponds to the "count" position of the carriage 309 (i.e., the position shown in FIGS. 1 and 3) wherein the platform 38 is resting on the rotary sample indexing mechanism B, while the notches designated 345a–345j respectively correspond to the vertical positions of the carriage 309 as the latter aligns the platform 38 with the corresponding shelves 32a, 34a–32j, 34j.

Thus, as the carriage moves upwardly from the "count" position the platform 38 is successively positioned in substantial alignment with, and adjacent to, the respective shelves 32a, 34a–32j, 34j. As the platform 38 reaches a level corresponding to the shelves 32a, 34a, a roller 346 carried on a resilient actuating lever 348 snaps into the notch 345a, thus releasing the actuator $MS7_a$ of a microswitch MS7 mounted on the gear box 371. As will be described with greater particularity in connection with the control circuit shown in FIGS. 21a–21e, release of the actuator $MS7_a$ will be effective to break the energizing circuit for the vertical motor M4 only in the event that the tray 35 being returned belongs on either the shelf 32a or the shelf 34a. However, if the tray belongs on shelf 32b, for example, the energizing circuit for the motor M4 will not be broken until the roller 346 on the microswitch actuating lever drops into the notch 345b on the cam disc 344. In order to provide a signal for the control circuitry representative of the vertical position of the platform 38 at all times, a rotary wafer switch 349 (FIG. 14), hereinafter referred to as a tray level switch 349, is rigidly mounted on the gear box 341 and positioned so that the wipers associated therewith (FIG. 21e) will sequentially wipe across terminals x and a–j, respectively corresponding to the eleven possible vertical positions of the platform 38.

Provision is also made in the exemplary apparatus for positively and affirmatively braking the lead screw 132 when the motor M4 is deenergized. To this end, and as best illustrated by reference to FIG. 16, the upper end of the lead screw 132 passes axially through, and is keyed to, a brake drum 350, the upper surface of which is spaced downwardly from the top frame 304. A layer of friction material 351 is positioned on the upper planar face of the brake drum 350. A brake shoe 352 is interposed between the top frame 304 and the layer of friction material 351, and is spring loaded by means of a plurality of springs 354 into positive braking engagement with the brake drum 350. To deenergize the brake, a solenoid S2 mounted on the top frame 304 has its armature 355 coupled directly to the brake shoe 352. The arrangement is such that when the motor M4 is deenergized, the solenoid S2 is also deenergized and the springs 354 tend to urge the shoe into braking relationship with the drum 350. However, when the motor M4 is energized to start vertical movement of the feed nut 131, the solenoid S2 is simultaneously energized (in a manner to be described below) so as to urge the brake shoe 352 against the bias provided by the springs 354, thus releasing the frictional braking force on the face of the drum 350 and permitting free rotation of the latter.

Referring next to FIGS. 2 and 15, it will be observed that provision is made in the exemplary storage and transfer mechanism C for shifting or sliding trays 35 laterally either from the platform 38 to one of the adjacent shelves (during a tray "unloading" operation), or to the platform 38 from one of the shelves (a tray "loading" operation). To accomplish this, the transfer mechanism includes a yoke 356 (FIG. 2) which is mounted for vertical movement with the carriage 309 and lateral movement along a track 358 defined by the upper portion of the T-shaped carriage member 321 (FIG. 18). Thus, the yoke 356 is mounted on the carriage member 321 (which is rigidly secured to, and forms part of, the vertically movable carriage 309) by means of a plurality of grooved rollers (FIGS. 3 and 18), there being four such rollers 359 shown in FIG. 2. When the movable platform 38 is positioned adjacent any given shelf during an "unloading" operation, the yoke 356 will occupy substantially the position shown in FIG. 2—that is, the yoke will partially surround a tray 35 carried by the platform. Consequently, lateral rolling movement of the yoke 356 along the track 358 will serve to slide the tray 35 laterally onto the adjacent shelf.

Upon completion of such lateral movement, it is merely necessary to again energize the vertical motor M4 to shift the carriage 309 vertically towards the next level. When this is done, the yoke will move vertically about the particular set of shelves 32, 34, with which it is then aligned until it partially surrounds the tray 35 on the next level. The yoke is then ready for lateral movement in the opposite direction to slide the next tray 15 onto the vertically movable platform 38 (which, of course, moved vertically with the yoke since both are carried on the carriage 309). In this manner, a tray "loading" operation is completed.

To effect the foregoing lateral yoke movement, the rearmost edge of the yoke 356 is provided with a downwardly projecting tang 360 (FIG. 18) having a vertical slot 361 formed therein. A continuous drive chain 362, best illustrated in FIG. 15, is trained about idler sprockets 364, 365 and 366, all of which are secured to the carriage 321 with freedom for rotational movement. In order to properly tension the drive chain 362, a suitable take-up idler sprocket 368 is rotatably mounted on a lever arm 369, the latter being pivoted to the carriage member 321, as shown at 370. The drive chain 362 is provided with a special link 371 (FIG. 18) having a pair of rollers 372, 374 projecting rearwardly and forwardly respectively. The roller 372 is retained captive within the vertical slot 361 formed in the yoke tang 360 while the roller 374 is retained active within a slot 361' formed in a "cut-off" tang 360'. The arrangement is such that as the drive chain 362 (FIG. 15) is driven, the special link 371 will partially traverse the upper flight defined by the continuous drive chain 362 and will, through co-action of the rollers 372, 374 with the slots 361, 361' in the tangs 360, 360', serve to drive the yoke 356 laterally along the track 358 defined by the carriage member 321.

For the purpose of driving the yoke 356, the sprocket chain 362 is operatively engaged with the teeth of a driving sprocket 375 (FIGS. 15 and 19), the latter being keyed to a stub shaft 376 journaled for rotation in a sleeve 378 integral with the carriage member 321. The opposite end of the shaft 376 is journaled in a housing 379 and serves to support a bevel gear 380 within the housing. A square drive shaft 381 extends vertically through a tubular sleeve 382 with freedom for relative sliding movement therein. The sleeve 382 is rotatably journaled in the housing 379 and has keyed thereto a bevel gear 384 having its teeth meshed with the teeth of the bevel gear 380. The upper end of the square drive shaft 381 is received within a square opening 385 formed in a stub shaft 386 and is rigidly secured therein by means of a set screw 388 (FIG. 17). In the exemplary apparatus, the stub shaft 386 extends upwardly through, and is journaled for rotation in, the upper or top frame 304, the shaft having a drive sprocket 389 keyed on the upper projecting portion thereof. A drive chain 390 is trained about the sprocket 389 and about a drive sprocket 391 keyed to the output shaft 392 of a horizontal drive motor M5. Thus, when the motor M5 is energized, a rotational drive is transmitted from the shaft 392 through the chain 390 and sprocket 389, to the square drive shaft 381, and thence through the meshed bevel gears 380, 384 and the stub shaft 376 to the drive sprocket 375 which is operatively engaged with the continuous drive chain 362. Consequently, energization of the motor M5 will serve to shift the yoke 356 laterally, the direction of lateral movement being dependent upon the direction of movement of the motor drive shaft 392. Of course, as the carriage member 321 moves upwardly and downwardly in response to energization of the vertical drive motor M4, the tubular sleeve 382 and housing 379 (FIG. 19) are free to slide upwardly and downwardly relative to the square drive shaft 381 while remaining drivingly engaged therewith in all vertical positions.

Referring to FIG. 2, it will be appreciated that the horseshoe shaped yoke 356 is dimensioned so that it is slightly larger than the outer diameter of the tray 35. Consequently, assuming that the yoke 356 (as viewed in FIG. 3) is about to start shifting laterally to move the tray 35 into one of the shelves in the right hand stack 34, it will be appreciated that the yoke will move slightly towards the right hand set of shelves before its left hand arm 394 engages the outer surface of the tray. Therefore, as the tray progresses laterally, the right hand yoke arm 395 will lead the right hand edge of the tray slightly. Referring now to FIG. 15 (and assuming, of course, that the carriage 321 has been raised to position the platform 38 adjacent one of the shelves in the stack 34), it will be appreciated that the special link 371 on the chain 362 will move laterally towards the idler sprocket 365. As the link 371 (FIG. 18) reaches the vertical center line through the idler sprocket 365, it will start to move downwardly as well as laterally about the periphery of the sprocket. Such downward movement is permitted since the rollers 372, 374 are capable of vertical movement in the slots 361, 361' (FIG. 18). As the special link 371 arrives at the point H1 (i.e. the maximum permissible lateral movement), the left hand arm 394 of the yoke 356 will then be urging the sample tray 35 into snug engagement with the upstanding guide 308 formed on the outer perimeter of the particular shelf onto which the tray has been loaded. At this time, the right hand arm 395 on the yoke will clear the right hand side of the vertical stack of shelves 34 sufficiently to permit vertical movement of the yoke. However, the left hand arm 394 is now positioned so that vertical movement of the yoke might cause interference between the shelves and the arm 394. Consequently, the horizontal drive motor M5 is permitted to run until the special link 371 arrives at the point H2 (FIG. 15) before the motor is deenergized. As the link 371 moves from the point H1 to the point H2, the yoke 356 is moved laterally in the opposite direction a small increment approximately corresponding to the radius of the sprocket 365, thus centering the yoke 356 relative to the stack of shelves 34 and providing sufficient clearance of both arms 394, 395 to perimt unimpeded vertical movement of the yoke past the next shelf.

To insure that the horizontal drive motor M5 is deenergized when the yoke is symmetrically disposed with respect to the stack of shelves 34, provision is made for breaking the energizing circuit for the motor M5 when the link 371 is aligned with the point H2. To this end, the energizing circuit (to be described below) is provided with a cam actuated microswitch MS8 (FIG. 14) which is activated when the link 371 arrives at the point H2. Referring again to FIG. 17, it will be observed that the output shaft 392 of the horizontal drive motor M5 has a second drive sprocket 396 keyed thereto which is operatively coupled to an idler sprocket 398 by means of a continuous drive chain 399. As here illustrated, the idler sprocket 398 is keyed to a stub shaft 400 which is journaled for rotation in the top plate 304 of the apparatus 30. A pinion gear 401, which is keyed to the shaft 400, has its teeth meshed with a gear 402, the latter gear being rotatably journalled on a stub shaft 404 which is rigidly secured on a switch bracket 405. A plurality of spacers 406 and fasteners 408 are utilized for securing the bracket 405 to the top plate 304 of the mechanism C. A disc-shaped cam 409, having a notch 410 (FIG. 21e) formed in its outer peripheral edge, is keyed to the gear 402 for simultaneous rotation therewith about the shaft 404. The arrangement is such that as the horizontal drive motor M5 drives the special link 371 laterally from a position disposed at the center of the apparatus towards the point H1 (FIG. 15), the cam 409 will be rotationally driven through the sprocket 396, chain 399, sprocket 398 and gears 401, 402 so that the notch 410 formed in the cam approaches the actuator MS8$_a$ of a microswitch MS8, the latter being rigidly mounted on the bracket 405. When the special link 371 is aligned with the point H2, a cam follower 403 will snap into the notch 410 so as to release the actuator MS8$_a$ of the microswitch MS8, thus breaking the energizing circuit for the motor M5.

During a tray loading cycle, when the yoke 356 is moving in the opposite lateral direction, provision must be made for deenergizing the horizontal drive motor M5 when the tray is centered on the vertically movable platform 38. To accomplish this, a second disc-shaped cam 411 is rotatably mounted on the stub shaft 404, the cam 411 also having a notch 412 (FIG. 21e) formed in its outer peripheral edge. A fixed clutch disc 414 is keyed to the stationary shaft 404 immediately above the lower cam 409 and below the upper cam 411. A layer of friction material 415 is interposed between the cam 411 and the clutch disc 414. For the purpose of normally urging the cam 411 into engagement with the friction material 415, thus inhibiting rotation of the cam, a spring 416 is interposed between the upper surface of the cam 411 and a nut 418. As best illustrated by reference to FIGS. 14 and 17 conjointly, it will be noted that the two cams 409, 411 are operatively connected together by means of a pin 419 which is integral with the lower cam 409 and projects upwardly through an elongate slot 420 formed in the cam 411.

As a consequence of the foregoing construction, when the horizontal drive motor M5 is energized during a tray loading cycle, the lower cam 409 will immediately start to rotate at the same time that the drive chain 362 (FIG. 15) starts its movement. However, the upper cam 411 will lag slightly behind the cam 409 until such time that the upstanding pin 419 traverses the elongate slot 420 formed in the upper cam. Because of this slight delay, the center line of the yoke 356 will move slightly past the center line of the vertically movable platform 38 before a cam follower 423 (FIG. 21e) snaps into the notch 412 on the edge of the upper cam 411, thrus releasing the actuator MS9$_a$ of a microswitch MS9 (FIGS. 14 and 21e). This slight overtravel of the yoke 356 insures that the sample tray is generally centered on the vertically movable platform 38, such overtravel being provided because of the differential diameters existing between the tray 35 and the yoke 356.

While the foregoing description has been made in conjunction with the tray unloading and a tray load cycle for shifting trays 35 onto and off of shelves in the right hand stack 34, those skilled in the art will appreciate that the operation is substantially identical for loading and unloading trays 35 from the left hand stack 32. To this end, the sprocket and gear connection between the motor M5 and the cams 409, 411 is selected such that the cam 409 will make one complete revolution as the special link 371 moves from the point H2 (FIG. 15) associated with the idler sprocket 365 to the corresponding point H2' associated with the opposite idler sprocket 264. Therefore, the notch 410 in the cam 409 will serve to activate the microswitch MS8 to break the energizing circuit for the motor M5 when the link 371 is aligned with the point H2' in the same manner as that previously described with respect to the point H2. And, of course, the microswitch MS9 and cam 411 will function to deenergize the motor M5 when the yoke 356 is moving from the left hand stack of shelves 32 towards the vertically movable tray 38 in precisely the same manner as that described above with respect to movement of the yoke from the right hand stack of shelves 34.

In order to facilitate an understanding of the control circuitry for controlling the vertical and lateral feed mechanisms described above, reference is here made to FIGS. 14 and 15 wherein it will be noted that a pair of additional microswitches MS10, MS11 are mounted in brackets 421 rigidly secured to the opposite extremities of the carriage member 321, the microswitches MS10 and MS11 being associated with the stacks of shelves 32, 34 respectively. In the exemplary apparatus, the microswitches MS10 and MS11 serve to provide a control signal for the energizing circuit associated with the vertical drive motor M4, thus insuring that the latter is not deenergized in the event that no sample tray 35 is positioned on the next shelf. To this end, the shelves in stacks 32, 34 are provided along their rearmost edges with cut-out portions 422, 424 adapted to receive tray sensing rollers 425, 426 respectively associated with the microswitches MS10, MS11. Thus, when the apparatus is conditioned to hunt for trays 35 in, for example, the left hand stack 32, the roller 425 will rise upwardly through the stack of shelves 32 passing through the notches 422 formed in each shelf. If a sample tray 35 is located on the shelf, the roller 425 will engage the wall of the tray, thus depressing the actuator MS10$_a$ (FIG. 21d) of the microswitch MS10 to inform the logic circuit that a tray is present. On the other hand, if no tray 35 is present on the shelf, the roller 425 will pass freely through the notch 422 and the actuator MS10$_a$ of the microswitch MS10 will not be depressed. As a consequence of this arrangement, the vertical drive motor M4 will not be deenergized during a tray hunting cycle unless a tray 35 is present on the next shelf.

In order to insure that the sample trays 35 are properly positioned on the shelves so that they will not interfere with vertical movement of the platform 38, provision is made for camming those trays that are misoriented into engagement with the vertical guides 308 on the associated shelves. To this end, a flexible belt 428 is rigidly secured adjacent one end to a bracket 429 (FIG. 20) mounted on the bottom lateral edge of the vertically movable platform 38. As best illustrated in FIG. 15, the belt 428 is trained about a pair of idler pulleys 430, 431 supported on the frame of the apparatus beneath the lowermost shelf 34a in the vertical stack of shelves 34. The pulleys 430, 431 are respectively positioned beneath the innermost and outermost lateral edges of the tray 34a. The belt 428 extends upwardly about the pulley 431 and around a second pair of idler pulleys 432, 434 supported on brackets on the top plate 304 of the apparatus (FIG. 14). The belt 428 extends downwardly from the innermost top pulley 434 to a bracket 435 (FIG. 20), the latter being rigidly secured to the carriage 309 adjacent its rearmost end and having a downturned flange 436 adjacent its forward end which is secured to the front edge of the vertically movable platform 38. Thus, the belt 428 defines a substantially continuous guide which completely girdles all of the shelves in the vertical stack 34 with the exception of that particular shelf with which the movable platform 38 is then aligned. This arrangement is best illustrated in FIG. 20 wherein it will be noted that the bracket portions 435, 436 define with the platform 38 and the carriage 309, a generally rectangular clear path which permits of lateral movement of the tray 35 when the yoke 356 is shifted. Thus, in the event that a technician is not careful when placing a tray of samples on any given shelf, the belt 428 will serve to prevent the sample tray 35 from projecting laterally towards the axis of the apparatus where it might otherwise interfere with vertical movement of the platform 38. To insure that the belt 428 is not urged outwardly by a misaligned tray, each of the shelves in the vertical stack 34 is provided with a belt positioning clip 438 (FIG. 2) which is secured to the bottom surface of the shelf and projects inwardly beyond the innermost edge of the shelf to receive the belt 428. In like manner, a belt 428' is secured to the bottom surface of the platform 38 and is trained about pulleys 430′, 431′, 432′ and 434′, with the free end of the belt 428′ secured to a bracket 435′ carried on the opposite side of the carriage 309. Thus, the belt 428′ substantially girdles the lefthand stack 32 of shelves.

Tray transfer and sample changing programming logic circuits

The overall operation of the apparatus 30 and the electrical programming circuits associated therewith will here be described in detail in connection with FIGS. 21a–21e. For the purpose of the ensuing operational description, it shall be assumed that sample trays 35 are disposed on all of the twenty shelves in the two stacks 32, 34 and that the trays on shelves 32a–32j are respectively designated as Tray No. 1 through Tray No. 10, while the trays present on shelves 34a–34j are respectively designated as Tray No. 11 through Tray No. 20. It shall further be assumed that Tray No. 1 (i.e., the tray associated with shelf 32a) is located on the rotary sample indexing mechanism B (FIG. 1) and that Sample No. 1 (i.e., the sample located in compartment 89–1) is located in the detector mechanism A with the counting cycle (as determined by the timer 71 shown in FIG. 22) for Sample No. 1 complete. Finally, it must be assumed that the mode selector switch 40 (FIGS. 1 and 21a) is in the "operate" position. The apparatus is now ready to eject Sample No. 1 from the detector mechanism A and to select Sample No. 2 from Tray No. 1 in preparation for the next counting cycle.

To accomplish the above objective, when the timer 71 (FIG. 22) reaches the end of its preset time period for the counting cycle for Sample No. 1, it produces a signal to close the gate 70, so as to prevent any further recording of counts by the scaler which might emanate from decay events occurring in Sample No. 1 after the preset time period terminates, but before Sample No. 1 is removed from the elevator shaft 48. At the same time, a signal is routed over the line 76 to the program control 66, advising the latter that the counting cycle for Sample No. 1 is complete. When this occurs, the printer 79 "reads out" the count on the scaler 74 and when the "read out" is complete, a signal is produced on the terminal 85 (FIGS. 21a and 22) to initiate a "sample change" cycle. The "sample change" signal appearing on terminal 85 is routed through the wiper $40_a$ of the mode selector switch 40, and the operate terminal thereof, to complete an energizing circuit for the latching coil $R1_L$ of a "Load-Unload" relay R1, the latter controlling the elevator motor M1.

For the purpose of the ensuing description, it should be understood that the control circuit illustrated in FIGS. 21a–21e includes fifteen relays which are respectively designated by the symbols R1–R15. With the exception of relay R1, all of the relays are identical. The relays are of the type commonly referred to as magnetic latching relays, all having a latch coil, generally designated by the subscript L, and an unlatch coil generally designated by the subscript U. All of the coils, with the exception of the latch coil $R1_L$ are energized by coupling their opposite terminals across the terminals L1, L2 (FIG. 21a) of a suitable A.C. source (not shown). The latch coil $R1_L$ for the relay R1 is here coupled to a D.C. source, diagrammatically represented at E1 (FIG. 21a), and a D.C. current path is completed through the coil $R1_L$ when a signal appears on the terminal 85 in the manner described above. In order to simplify the ensuing description, all of the relays have been shown as controlling eight sets of contacts which are here represented by the identifying reference characters a through h and the identifying numeral corresponding to the relay number. Thus, the contacts associated with the relay R1 are contacts a1–h1, the contacts associated with the relay R2 are a2–h2, etc. The relays are of the type which require only a momentary pulse to switch them from one state to the other, for example, from the "latched" state to the "unlatched" state. Under the exemplary set of assumptions made hereinabove, all of the relays are initially in the "unlatched" condition, with the exception of the Rotate Latch relay R4, the latter relay being in the "latched" condition.

Thus, when the "sample change" signal appears on the terminal 85 of the counting logic 63 and passes through the mode selector switch 40, it provides a momentary energizing pulse for the latch coil $R1_L$ of the Load-Unload relay R1 (FIG. 21a), thereby switching that relay from the unlatched condition to the latched condition. As the relay R1 switches to the latched condition, an energizing circuit is completed for the elevator motor M1 through the now closed contacts g1 and the "run" contacts of the limit switch LS2. At the same time, an energizing circuit for the latch coil $R2_L$ is completed through the "run" contacts of the limit switch LS2 and the wiper $40_b$ of the mode selector switch 40, thus switching the "Stop" relay R2 to the latched condition. It will be understood that the elevator motor M1 is a conventional reversible motor which will run in either direction dependent upon which of its input terminals is energized. Thus, as the motor M1 is energized on its "unload" terminal, the elevator 49 starts to move upwardly and, as it reaches its uppermost limit position, the laterally projecting flange 62 engages the actuator $LS2_a$ of the limit switch LS2, thus opening the "run" contacts of the limit switch and closing the "stop" contacts thereof. This serves to deenergize the motor M1, while at the same time completing an energizing circuit for controlling indexing movement of the sample tray 35. To this end, closure of the "stop" contacts of the limit switch LS2 completes an energizing circuit for the indexing motor M3 (FIG. 21b) through the contacts e2 of the latched relay R2, the contacts f6 of the unlatched relay R6, the contacts h5 of the unlatched relay R5, the contacts h3 of the unlatched relay R3, and thence through the contacts g4 of the latched relay R4 to the index motor M3.

The motor M3 now moves through one complete revolution to index the Geneva pin 249 (FIG. 9) through two complete revolutions, thus rotationally indexing the sample tray 35 to align Sample No. 2 with the elevator 49. During this indexing movement, Sample No. 1 slides laterally in its compartment 89–1 off of the elevator 49 and onto the gate 94. As the shaft 258 of the motor M3 starts to rotate, the cam 266 on the sprocket 256 moves away from the actuator $MS2_a$ of the microswitch MS2, thus closing the "run" contacts of the latter. Thereafter, as the shaft 258 of the motor M3 moves through 180°, the cam 266 engages the actuator $MS5_a$ of the normally open microswitch MS5, closing the contacts of the latter and momentarily activating the vial sensing microswitch MS4. If a sample is present in compartment 89–2, the contacts of the microswitch MS4 will remain closed, thus completing an energizing circuit for the latch coil $R3_L$ of the "Rotate Relay" R3 through the now closed contacts of the microswitches MS4 and MS5, the contact a4 of latched relay R4, the contacts b6 of unlatched relay R6, to the latch coil $R3_L$ for the Rotate Relay R3, thus switching the latter to the latched state. When this occurs, the contacts h3 break and the contacts g3 make, thus breaking the energizing circuit and permitting the motor M3 to be energized through the "run" contacts of the microswitch MS2. As the shaft 258 of the index motor M3 completes a full revolution, the cam 266 again engages the actuator $MS2_a$ of the microswitch MS2, breaking the "run" contacts of the latter and deenergizing the motor M3. At the same time, an energizing circuit is completed for the unlatch coil $R1_U$ of the Load-Unload relay R1 through the now made contacts e3 of the Rotate Relay R3.

As the Load-Unload relay R1 shifts to the unlatched state, an energizing circuit is completed for the "load"

terminal of the motor M1 through the contacts *h*1 of the unlatched relay and the normally closed "run" contacts of the limit switch LS1 (FIG. 21*a*). The elevator 49 now starts to bring Sample No. 2 down to the "count position" between the light transducers 45, 46 (FIG. 1). At the same time, closure of the *h*1 contacts completes an energizing circuit for the unlatch coils R2$_U$ and R3$_U$ of the relays R2, R3 through the relay contacts *a*2 and *a*3, respectively, thereby causing the relays R2 and R3 to switch to the unlatched state and returning the circuit to its original condition.

When Sample No. 2 is properly positioned between the light transducers 45, 46, the bracket 62 on the elevator 49 engages the actuator LS1$_a$ of the limit switch LS1, shifting the latter from the "run" condition to the "stop" condition and deenergizing the motor M1. At the same time, a capacitor C1, which had been charged through the "run" contacts of limit switch LS1 by a D.C. source diagrammatically shown at E2 in FIG. 21*a*, discharges through the "stop" contacts thereof and through an asymmetrically conducting device, here shown as a diode 439, to produce a momentary pulse at the input terminal 64 to the counting logic 63 indicating that the "sample change" cycle has been completed. After completion of the counting cycle on Sample No. 2, the above sample changing cycle will be repeated to return Sample No. 2 to Tray No. 1 and index the latter to permit loading of Sample No. 3. This action will be repetitive until such time as Sample No. 23 is unloaded and Sample No. 24 is ready for loading.

During the time that Tray No. 1 has been indexing, the rotary wafer switch 276 which is geared directly to the output shaft 258 of the motor M3 (FIGS. 10 and 21*b*) has had its wipers 276$_a$, 276$_b$ stepped sequentially through the contact terminals 1–23 corresponding to Samples Nos. 1–23. As the tray indexes to a position in readiness for loading Sample No. 24, the wiper 276$_a$ steps to the terminal 24, thus completing an energizing circuit for the latch coil R5$_L$ of the "Sample No. 24" relay R5 (FIGS. 21*b*, 21*c*) through terminal No. 24 of the switch 276, terminal No. 1 of a stepping switch SS1, terminal No. 1 of the Cycles per Tray Switch 41, and thence to the latch coil R5. This serves to shift the Sample No. 24 relay R5 to the latched state. When the sample tray 35 steps to the Sample No. 24 position, the index motor M3 is deenergized in the manner previously described and the relay R1 is again unlatched. At the same time, an energizing circuit is completed through the contacts *c*3 of relay R3 and *a*5 of relay R5, which serves to unlatch the relay R5. It should here be noted that the Sample No. 24 relay R5 serves to provide an indication that the sample tray is at the No. 24 position in the event that there is no sample present in compartment 89–24.

Since (under the set of assumptions hereinbefore made) there is a Sample No. 24 present in the tray, that sample will be loaded into the detector mechanism A in the manner previously described. However, during the load cycle, as Sample No. 24 is being delivered to the counting chamber, provision is made for energizing the "Last Sample Relay" R6 (FIG. 21*c*). To this end, an energizing circuit for the latch coil R6$_L$ of the relay R6 is completed through wiper 276*b* of the rotary wafer switch 276 (hereinafter referred to as the "Sample Number" switch) and its terminal No. 24, wiper SS1$_a$ and its terminal No. 1 of stepping switch SS1, and wiper 41$_b$ and its terminal No. 1 of the Cycle per Tray switch 41, thence back to the latch coil R6$_L$, to energize the latter. It will be appreciated from the foregoing description that while only the Rotate Latch Relay R4 is latched during the time that Sample No. 1 through Sample No. 23 are being counted, while Sample No. 24 or the "last sample" is being counted, two relays are latched—that is, both the Rotate Latch Relay R4 and the Last Sample Relay R6. Upon completion of the counting cycle for Sample No. 24, the sample vial 36 is unloaded in the normal fashion. However, in this instance a current path is completed through the contacts *e*6 rather than the contacts *f*6 as previously described. Therefore, the energizing circuit for the index motor M3 includes the "run" contacts of the microswitch MS3 and the contacts *g*4 of the Rotate Latch Relay R4. As the tray 35 indexes an angular increment corresponding to the pitch P of the gear teeth formed therein (i.e., one rotation of the geneva pin 249 and one half rotation of the index motor drive shaft 258) the cam 278 on the gear 272 (FIG. 10 and 21*b*) engages the actuator MS3$_a$ of the microswitch MS3 and shifts the contacts of the latter to the "stop" condition, thus completing an energizing circuit for the tray transfer mechanism C.

Before describing the operation of the logic circuit to remove Tray No. 1 and replace it with Tray No. 2, it should be pointed out that various alternative operational modes are provided with respect to any given tray. For example, if the technician desires to count all of the samples in Tray No. 1 more than one time, this can be readily accomplished by the simple expedient of shifting the Cycles per Tray switch 41 to the terminal corresponding to the desired number of times that each sample is to be counted. For example, if the technician wishes to count each sample three times, he will turn the operating knob 41 (FIGS. 1 and 21*c*) to the "3" position, thus shifting the wipers 41$_a$, 41$_b$ to their respective No. 3 terminals.

The circuit arrangement previously described is such that when the apparatus is set to count each of the samples in the tray only one time, twin energizing circuits are completed through the No. 24 terminals of the Sample Number switch 276 and the No. 1 terminals of both the stepping switch SS1 and the Cycles per Tray switch 41, thus completing energizing circuits for the latch coils R5$_L$ and R6$_L$ of the relays R5 and R6. However, when the operator shifts the Cycles per Tray switch 41 to the "3" position, the foregoing circuits cannot be completed. Therefore, the index motor M3 will continue to rotate through one complete revolution, thus indexing the tray back to the Sample No. 1 position. Under these circumstances, as the cam 278 on the gear 272 (FIGS. 10 and 21*b*) engages the actuator MS3$_a$ it momentarily makes the "stop" contacts of the microswitch MS3, thus completing an energizing circuit for the actuating solenoid S3 of the stepping switch SS1 through the contacts *f*6 of the unlatched relay R6, and when the cam 278 moves off the actuator MS3$_a$, the energizing circuit for the solenoid S3 is broken. As diagrammatically illustrated in FIG. 21*c*, the stepping switch SS1 is of the conventional ratchet type wherein the armature 440 of the solenoid is retracted upon energization of the latter against the bias of a spring 441, thus engaging the armature with the next ratchet tooth on a ratchet wheel 442. When the solenoid S3 is deenergized (i.e., when the cam 278 moves off of the actuator MS$_a$), the spring 441 will drive the armature 440 back to its extended position, thus indexing the ratchet wheel 442 one step and simultaneously stepping the wipers SS1$_a$, SS1$_b$ to their associated No. 2 terminals. As is conventional with this type of stepping switch, a spring loaded pivoted keeper 444 is provided for preventing retrograde movement of the ratchet wheel 442 when the solenoid S3 is energized. This stepwise movement of the stepping switch SS1 will continue (one step per cycle) until such time as the wipers SS1$_a$, SS1$_b$ step to terminals corresponding to the terminals of the Cycles per Tray switch which have been selected by the technician—in this instance, terminals No. 3. When the wipers SS1$_a$, SS1$_b$ and the wipers 41*a*, 41*b* are in coincidence, an energizing circuit can be completed for the relays R5, R6 in the manner previously described. Therefore, when Sample No. 24 is counted for the third time, the relay R6 will be latched, thus preventing energization of the solenoid S3 and therefore inhibiting further stepping of the stepping switch SS1. The sample tray 35 will then move into the "tray transfer" cycle.

In the event that there is no Sample No. 24 located in the tray 35—that is, the "last sample" is some sample other than Sample No. 24, the circuit operates in the following manner. After the last sample is reloaded into the sample tray 35, the tray starts to index and the vial sensing mechanism starts to hunt for the next sample. However, since there are no more vials in the tray, the normally open microswitch MS4 will remain open, thus insuring that the Rotate Relay R3 remains unlatched. Consequently, the indexing motor M3 continues to rotate until such time as the wipers $276_a$, $276_b$ of the Sample Number switch 276 move to their respective No. 24 terminals. When this occurs (i.e., as the tray 35 is indexing from the No. 23 sample position to the No. 24 sample position), the relay R5 is latched in the manner previously described, thus breaking the energizing circuit for the motor M3 and permitting the latter to run through the "run" contacts of the microswitch MS2. When the cam 266 on the drive sprocket 256 engages the actuator $MS2_a$ of the microswitch MS2 (FIG. 21b), the "run" contacts thereof are broken and the "stop" contacts are made, thus simultaneously deenergizing the motor M3 and completing an energizing circuit for the latch coil $R6_L$ of the Last Sample Relay R6 through the "stop" contacts of the microswitch MS2, the contacts $f3$ of unlatched relay R3, the contacts $e5$ of latched relay R5, and through the latch coil $R6_L$, thus latching the Last Sample Relay R6. Consequently, the index motor M3 will again be energized through the contacts $e6$ of the latched relay R6 and the "run" contacts of the microswitch MS3. When the cam 278 on the gear 272 again engages the actuator $MS3_a$ of the microswitch MS3 to shift the latter to the "stop" position, the index motor M3 is deenergized and a signal is generated for the tray transfer mechanism in the manner previously described.

The present invention also contemplates provision for enabling the operator to repetitively count any given and selected sample in the tray. Thus, if it is assumed that operator has set the Cycles per Tray switch 41 to the No. 1 terminals so that all of the samples will be counted only one time and, if the operator desires to count, for example, Sample No. 6 two times, he need only shift the mode selector switch 40 (FIGS. 1 and 21a) to the "repeat" terminal when Sample No. 6 is either loading or loaded. This serves to direct the "sample change" signal appearing at terminal 85 of the counting logic 63 directly back to the "sample ready" or sample change complete terminal 64. Thus, even though no actual sample change took place, a "sample ready" signal is generated and the counting operation for Sample No. 6 starts all over again. As soon as the counting cycle starts the second time, the operator can then shift the mode selector switch 40 back to the "operate" terminal—indeed, this can be done any time during the second counting cycle. Upon completion of the second counting cycle, the apparatus will step through the Sample No. 7 position in the manner previously described. Those skilled in the art will appreciate that the "repeat" capability of the present apparatus is particularly advantageous where the operator is working with samples having a very short half life on the order of a few minutes to a few hours. Under such conditions, it may be highly desirable that he count that sample several times on a repetitive basis while such repetitive counting is not desired for other samples in the tray 35. The provision of a repeat cycle enables this to be done so that the "counts" can be recorded and plotted. Alternatively, if the operator wishes to count all of the samples located in the tray 35 on a repetitive basis, he need simply turn the Cycles per Tray switch 41 to the "infinite" count terminal. With the switch in this position, the latch coils $R5_L$ and $R6_L$ cannot be energized and consequently, the tray transfer mechanism cannot be actuated.

Occasionally, a technician will find it necessary to count a sample on a "priority" basis where that sample is not located in a tray then positioned on the Sample Indexing Mechanism B. When this occurs, the technician simply shifts the mode select switch 40 to the "stop" terminal. When this is done, a signal is impressed upon the reset terminal 86 for the counting logic 63 (FIG. 22), and, under these circumstances, the program control 66 will cause the printer 79 to immediately "read out" the counts recorded on the scaler 74 irrespective of the preset time period established by the timer 71. As soon as the count is "read out," a signal will appear on the output terminal 85 and the sample then in the detector assembly A will be ejected. When the sample is fully up, the technician simply removes it from the tray and places the "priority" sample in its place. The mode select switch 40 is then returned to the "operate" terminal, thus completing a circuit through the "stop" contacts of the limit switch LS2, the wiper $40_c$ of the mode select switch 40, the contacts $h2$ of the unlatched relay R2, and back to the unlatch coil $R1_U$ of the Load-Unload Relay R1. This completes an energizing circuit from the A.C. terminal L1 (FIG. 21a) through the contacts $h1$, the "run" contacts of the limit switch LS1 and back to the "load" terminal of the elevator motor M1, thus energizing the latter. The capacitor C1 again discharges in the manner previously described to provide a signal that the sample change has been completed.

In carrying out the present invention, provision is made for removing Tray No. 1 from the sample indexing mechanism B when all of the samples contained therein have been completed. To this end, when Sample No. 24 is returned to its compartment 89–24 in Tray No. 1 and the latter is indexed an angular increment corresponding to the pitch P of the teeth 196 in the tray, the cam 278 on the gear 272 (FIGS. 10 and 21b) engages the actuator $MS3_a$ of the microswitch MS3 in the manner previously described to shift the latter to the "stop" position, thus completing an energizing circuit for the tray transfer mechanism. When this occurs, an energizing circuit for the "up" terminal of the vertical drive motor M4 is completed through the latched contacts $e6$ of the Last Sample Relay R6, the "stop" contacts of the microswitch MS3, and the unlatched contacts $h8$ and $h12$ of the "Vertical Return Relay" R8 and the "Horizontal Load Relay" R12, respectively.

At the same time that "up" terminal of the vertical drive motor M4 is energized, the brake solenoid S2 is energized through the contacts $R20_a$ of a relay R20, the latter being energized by the same signal as the motor M4. This serves to release the brake drum 350 (FIGS. 16 and 21d) and permit rotation of the lead screw 132. Consequently, the feed nut 131 starts to move upwardly through its extended overtravel position. As the feed nut moves upwardly towards engagement with the surface 316 on the carriage 309 (FIG. 18), the spring 116 (FIG. 3) urges the slide 111 rearwardly, thus "cocking" the tray locating mechanism 192 (as shown in solid lines in FIG. 8) and shifting the microswitch MS1 (FIGS. 8, 9 and 21b) from the "latch" condition to the "unlatch" condition. This serves to complete an energizing circuit for the solenoid S1, thus causing the armature 239 of the latter to be retracted and shifting the latching block 231 rearwardly so as to free the gate 94 from latched engagement with the sample indexing mechanism B. At the same time, an energizing circuit is completed for the unlatch coil $R4_U$ of the Rotate Latch Relay R4 through the contacts $c4$ of the latter, thus unlatching the relay R4. An energizing circuit is also completed through the contacts $g6$ of the latched relay R6, the interrupter contacts 445 (FIG. 21c) and the "off normal" contacts 446 of the stepping switch SS1, to the solenoid S3, thus serving to energize the latter and insuring that the wipers $SS1_a$, $SS1_b$ step completely through the stepping switch terminals, through and including terminal No. 10 thereof. When the wipers step to the No. 10 terminals, the "off normal" contacts 446 are switched by a cam (not shown) to the open position, thus deenergizing the coil of the solenoid S3 and stepping the switch SS1 to the No. 11 terminals. The stepping switch SS1 stops at this position.

Since the vertical drive motor M4 (FIGS. 16 and 21d) is still energized, the feed nut 131 continues to move upwardly until it engages the carriage 309 and starts to move the platform 38 and Tray No. 1 upwardly. At the same time that the vertical drive motor M4 is energized, the energizing current is also presented to the wiper $349_a$ of the rotary wafer switch 349 (shown in FIGS. 14 and 21e, and hereinafter referred to as a "tray level" switch), the switch 349 serving to provide a continuous indication of the tray level as the tray is moved upwardly on the platform 38. That is, since the wiper $349_a$ is geared directly to the vertical drive motor M4, the wiper progressively steps from its X terminal (corresponding to the "count" position) through a–j terminals which respectively correspond to the shelves 32a, 34a—32j, 34j. Just prior to the time that Tray No. 1 is properly aligned with the shelf from which it was selected (in this case, shelf 32a) a circuit is completed through the wiper $349_a$ and its a terminal (representative of the Tray No. 1 level), to the wiper $SS2_a$ of a stepping switch SS2 (FIG. 21e). The exemplary stepping switch SS2 is of the conventional ratchet driven type having an energizing solenoid S4 positioned to operatively engage the ratchet teeth of a ratchet wheel 448. To this end, the armature 449 of the solenoid S4 is spring loaded by means of a spring 450 so that each time that the solenoid S4 is deenergized, the spring 450 will drive the armature 449 to its extended position to advance the ratchet wheel 448 one step. Retrograde movement of the ratchet wheel is here prevented by means of a spring loaded pivoted keeper 451. In this instance, the stepping switch includes four decks of terminals which are sequentially wiped by wipers $SS2_a$, $SS2_b$, $SS2_c$ and $SS2_d$, there being twenty terminals 1–20 associated with each of the decks and respectively corresponding to the twenty shelves for supporting Tray No. 1 through Tray No. 20.

Under the exemplary set of assumptions that have been made, the wipers of the stepping switch SS2 will all be engaged with their respective No. 1 terminals since the tray that has just been counted is Tray No. 1. Consequently, when the tray level wiper 349a steps to its a terminal, an energizing circuit is completed for the latch coil $R8_L$ of the "Vertical Return Relay" R8, thus latching the latter. Of course, if the tray being returned was, for example, Tray No. 4, the wipers SS2a–SS2d would all be engaged with their corresponding No. 4 terminals and, consequently, an energizing circuit would not be completed for the latch coil $R8_L$ of the Vertical Return Relay R8 until such time as the wiper 349a of the Tray Level Switch 349 stepped to its terminal d. It will be undertsood that when the relay R8 shifts to the latched state, the energizing circuit for the vertical drive motor M4 which included the contacts h8 is broken. However, at this precise instant, the vertical platform 38 and the tray (Tray No. 1) are still not properly positioned and are located slightly below the level of shelf 32a. Therefore, it is essential that the vertical drive motor 225 continue to run until such time as Tray No. 1 is properly positioned.

To accomplish this, when the vertical drive motor M4 is energized by the circuit described above, an energizing circuit is simultaneously completed for the motor M4 through the "run" contacts of the microswitch MS7 FIGS. 15 and 21d). Consequently, when the relay R8 is latched and the contacts h8 break, the vertical drive motor M4 continues to run through the energizing circuit completed by the microswitch MS7. Thus, the microswitch MS7 provides the fine vertical positioning control needed to insure that the tray is properly positioned adjacent its shelf. When Tray No. 1 arrives at the proper level, the roller 346 on the cam follower snaps into the notch 345a corresponding to the position for Tray No. 1. This breaks the energizing circuit for the motor M4 and turns the latter off.

Provision is also made in the illustrative tray transfer mechanism C for transferring Tray No. 1 laterally from the platform 38 to the now aligned shelf 32a. To accomplish this, an energizing circuit is completed for effecting rotation of the horizontal drive motor M5 (FIGS. 17 and 21e) in a counterclockwise direction, the circuit here including the "stop" contacts of the microswitch MS7, the contacts e8 of the now latched relay R8, contacts d11 of the unlatched "Horizontal Unload Relay" R11, the "run" contacts of the microswitch MS8, the contacts e12 of the Horizontal Load Relay R12, and the contacts h13 of the "Stack Relay" R13, thence to the counterclockwise terminal of the horizontal drive motor M5. In this manner, the yoke 356 is shifted laterally to return Tray No. 1 to its storage position on shelf $32_a$.

When Tray No. 1 is fully positioned on the shelf, the cam follower 403 associated with the microswitch MS8 (FIGS. 14 and 21e) drops into notch 410 formed in the disc shaped cam 409, thus breaking the "run" contacts and making the "stop" contacts of the microswitch MS8, and deenergizing the horizontal drive motor M5. At the same time, an energizing circuit is completed for the latch coil $R11_L$ of the horizontal unload relay R11 through the "stop" contacts of the microswitch MS8, the contacts d14 of the unlatch relay R14, and back to the latch coil, thus latching the Horizontal Unload Relay R11. Tray No. 1 is now completely returned to its shelf $32_a$ and the transfer mechanism C is conditioned to hunt in a vertical direction for the next tray to be shifted to the rotary sample indexing mechanism B. In this case, the next tray is Tray No. 2. In order to again energize the vertical drive motor M4 to move the vertical tray selector mechanism upwardly until it is properly aligned with Tray No. 2, an energizing circuit is completed for the "up" terminal of the vertical drive motor M5 through the contacts g8 of the latched relay R8, the contacts g11 of the latched relay R11, the contacts d9 of the now unlatched relay R9, and the contacts h12 of the horizontal load relay R12, thus energizing the motor M4 and starting rotation of the vertical lead screw 132. When the vertical motor is energized, the brake solenoid S2 (FIG. 21d) is simultaneously energized in the manner previously described. The yoke 356 is now moving upwardly towards the shelf 32b in the left-hand stack 32.

At the same time that the motor M4 is energized, a current path is completed to the left stack "tray sensing" microswitch MS10 through the contacts e11 of the relay R11, the contacts d13 of the relay R13, and to the normally open contacts of the left stack "tray sensing" microswitch MS10. At the same instant that the vertical drive motor M4 is energized, a circuit is completed through the contacts c11 of the latched relay R11, the contacts f9 of the unlatched relay R9, and to the coil of the solenoid S4 for stepping the ratchet 448 of the stepping switch SS2, thus energizing the solenoid and retracting the armature 449 against the bias of spring 450. As soon as the motor M4 is energized, the feed screw 132 starts to rotate, thus switching the microswitch MS7 to the "run" state and breaking the energizing circuit through the contacts c11. This serves to deenergize the stepping switch solenoid S4. When this occurs, the spring 450 urges the armature 449 of the solenoid forwardly to step the ratchet 448 an increment defined by one of the ratchet teeth. Thus, the wipers $SS2_a$ through $SS2_d$ all step to the No. 2 terminal corresponding to the shelf 32b which supports Tray No. 2.

As the vertical "tray hunt cycle" continues with the carriage member 321 moving upwardly, the tray sensing roller 425 on the microswitch MS10 (FIGS. 14 and 21d) passes through the notch 422 in the shelf 32b shortly before the platform 38 reaches the level of the shelf 32b. Since under the exemplary set of assumptions, there are trays present on all of the shelves, the roller 425 will engage Tray No. 2 to shift the actuator MS10$_a$ of the microswitch MS10 and switch the latter from the "bypass" contacts to the "tray present" contacts, thus completing an energizing circuit for the latch coil R9$_L$ of the "Vertical Hunt Relay" R9 through the contacts h7 of the "Tray Select Relay" R7 and shifting the relay R9 to the latched condition. Latching of the relay R9 breaks the contacts d9 which were included in the energizing circuit for the motor M4. However, the motor M4 was also energized through the "run" contacts of the microswitch MS7 and, consequently, the motor M4 continues to run until the roller 346 associated with the cam 344 drops into the notch 345b corresponding to the Tray No. 2 position. When this occurs, the microswitch MS7 switches to the "stop" condition and the vertical drive motor M4 is denergized. At the same time, the brake solenoid S2 is also deenergized, thus positively stopping the feed screw 132.

Provision must now be made to initiate a horizontal load cycle of operation for the purpose of shifting Tray No. 2 laterally from the shelf 32b onto the platform 38. To accomplish this, an energizing circuit for the horizontal drive motor M5 is completed through the "stop" contacts of the microswitch MS7, the contacts e8 of the latched relay R8, the contacts c11 of the latched relay R11, the contacts e9 of the latched relay R9, the contacts d12 of the unlatched relay R12, the "run" contacts of the microswitch MS9, the contact f13 of the unlatched relay R13 and back to the "clockwise" terminal of the horizontal drive motor M5. The horizontal drive motor M5 is now running and the yoke 356 moves laterally to move Tray No. 2 towards the central position wherein it is positioned on the vertically movable platform 38. As the yoke 356 shifts Tray No. 2 towards the platform, the cam follower 423 on the microswitch MS9 rides about the periphery of the cam disc 411. When Tray No. 2 is properly positioned on the vertically movable platform 38, the cam follower 423 snaps into the notch 412 formed in the cam 411, thus shifting the microswitch MS9 from the "run" condition to the "stop" condition and completing an energizing circuit for the latch coil R12$_L$ of the Horizontal Load Relay R12 through the "stop" contacts of the microswitch MS9.

The vertical transport mechanism C is now ready for downward movement to position the platform 38 in operative relationship with the sample indexing mechanism B. To accomplish this, an energizing circuit is completed for the vertical drive motor M4 through the contacts g8 of the latched relay R8, the contacts e12 of the latched relay R12, the contacts h10 of the unlatched relay R10, and the "run" contacts of the microswitch MS6, back to the "down" terminal of the vertical drive motor M4. As the motor M4 is energized, the relay R21 is also energized, thus closing its contacts R21$_a$ and completing an energizing circuit for the brake solenoid S2, thus releasing the brake and permitting rotation of the lead screw 132 of effect downward movement of the platform 38.

The platform 38 and Tray No. 2 supported thereon continues to move downwardly until such time as the vertically movable carriage 309 and platform 38 bottom on the frame of the apparatus 30. At this point, the platform 38 stops its downward movement and is resting substantially flush against the upper surface of the indexing table 109. However, the vertical drive motor M4 remains energized and the feed nut 131 continues downwardly to its extended overtravel position (FIGS. 15 and 18). During such overtravel the bracket 134 on the feed nut 131 engages the push rod 130 to drive the cross bar 128 downwardly and pull the cable 120 rearwardly about the pulley 121 (FIG. 3), thus driving the slide 111 forwardly. As the feed nut 131 reaches the limit of its overtravel movement, the actuator MS6$_a$ of the microswitch MS6 is depressed through coaction with the bracket 134, thus shifting the microswitch from the "run" to the "stop" condition and breaking the energizing circuits for both the vertical drive motor M4 and the brake solenoid S2. Thus, the motor is turned off and the lead screw 132 is positively braked. When this occurs, an energizing circuit is completed for the latch coil R10$_L$ of the Vertical Down Relay R10 through the "stop" contacts of the microswitch MS6, thus shifting the relay R10 to the latch condition.

In order to start a sample indexing cycle for Tray No. 2, provision is made for producing a signal which serves to reset the relays R5, R6 and R8 through R12, inclusive. To this end, an energizing circuit is completed through the contacts g10 (FIG. 21d) of the latched relay R10, the contacts f14 of the unlatched "Change Stack I Relay" R14 (FIG. 21e), the contacts f15 of the unlatched "Change Stack II Relay" R15, and back to the unlatch coil R5$_U$ for the Sample No. 24 Relay R5 (FIG. 21c), thus energizing the coil and switching the relay R5 to the unlatch condition. As an incident to unlatching of the relay R5, an energizing circuit is completed for the unlatch coil R6$_U$ of the Last Sample Relay R6 through the contacts b5 of the relay R5. As the relay R6 unlatches, an energizing reset circuit is completed through the contacts d6 of the relay R6 to unlatch the relays R8 through R12 (FIG. 21d) inclusive. Thus, the circuit is completed through the contacts a8 to the unlatch coil R8$_U$ of the relay R8, thereby unlatching that relay. As the relay R8 shifts to the unlatched condition, the reset signal is routed through contacts d8 and a9 to the unlatch coil R9$_U$ of the relay R9, thus unlatching the latter relay. This serves to complete an unlatching circuit for the relay R10 through the contacts d9 of the relay R9 and the contacts a10 of the relay R10, energizing the unlatch coil R10$_U$ and unlatching the relay R10. As the relay R10 shifts to its unlatch condition, an unlatching circuit is completed for the relay R12 through the contacts d10 of the relay R10 and back to the unlatch coil R12$_U$ of the relay R12. Provision is here made for unlatching the relay R11 at the same time that the relay R9 is unlatched. To this end, when the relay R8 shifts to the unlatch condition, an energizing circuit is completed for the unlatch coil R11$_U$ of the relay R11 through the contacts d8 of the relay R8 and the contacts a11 of the relay R11. The slightly different unlatching circuit for the relay R11 is provided with the exemplary apparatus simply to insure that only the relay R11 is unlatched as an incident to changing stacks from the left-hand stack 32 to the right-hand stack 34 (FIG. 1). Thus, at such time as the apparatus is prepared to switch to the stack 34, provision must be made for insuring that the latching coils R8–R10 and R12 remain energized.

In keeping with the invention, provision is now made for energizing the friction drive alignment motor M2 (FIGS. 11 and 21b) so as to properly orient Tray No. 2 in position relative to the rotary indexing table 109. To this end, at the same time that the relay R6 is unlatched, an energizing circuit is completed for the alignment motor M2 through the contacts f6, the contacts h5, the contacts h3, the contacts h4, and back to the input terminal of the alignment motor, thus energizing the latter and starting rapid clockwise rotational movement of Tray No. 2 (as viewed in FIG. 6) to bring the slot 98 in the gate 94 into alignment with the slots 166, 168 in the platform 38 and indexing table 109 respectively. As Tray No. 2 is indexed in a clockwise direction, the inwardly projecting ear 106 on the latching lever 99 engages the stop pawl 209, permitting "uncocking" of the locating mechanism 192 and releasing the actuator MS1$_a$ of the microswitch MS1 (FIGS. 9 and 21b). This shifts the microswitch MS1 from the "unlatch" to the "latch" position, thus completing an energizing circuit for the latch coil R4$_L$ of the Rotate Latch Relay R4.

As the Rotate Latch Relay R4 shifts from the unlatch to the latch condition, the contacts h4 break and the contacts g4 make, thus deenergizing the alignment motor M2 and completing an energizing circuit for the sample indexing motor M3. As the microswitch MS1 shifts to the "latch" condition, the solenoid S1 is deenergized, thus permitting the spring 240 to snap the latching block 231 into engagement with the downwardly projecting pin 230 on the bottom of the gate 94 of Tray No. 2. At this point, Tray No. 2 and the locating mechanism 192 are in the solid line positions shown in FIG. 9. That is, the radial wall 92 which separates compartments 89–1 and 89–24 is aligned with the vertical axis through the elevator shaft 48. The tray is now ready to be indexed in a counterclockwise direction (as viewed in FIG. 9) and, since the cam 266 on the sprocket 256 (FIGS. 10 and 21b) is engaged with the actuator MS5$_a$ of the microswitch MS5, the "vial sensing" microswitch MS4 is momentarily rendered operative to detect the presence or absence of a sample vial in compartment 89–1. The operation for rotationally indexing Tray No. 2 is identical to that previously described for Tray No. 1. When Tray No. 2 starts to index towards the Sample No. 1 position (i.e., compartment 89–1), the microswitch MS3 shifts from the "run" to the "stop" condition, thus breaking the energizing circuit for the solenoid S3 associated with the ratchet 442 in the stepping switch SS1. As the solenoid S3 is deenergized, its armature 440 is urged by the spring 441 to index the ratchet 442 one step, thus stepping the wipers SS1$_a$, SS1$_b$ back to their respective No. 1 terminals.

It will be appreciated from the foregoing description that the samples in Tray No. 2 will be successively lowered into the detection apparatus A and counted in the same manner as that previously described for Tray No. 1. The second tray will be returned to its respective shelf in the same manner as Tray No. 1 was returned, and the tray select mechanism will then step sequentially through the remainder of the first ten shelves 32a–32j in the left-hand stack 32 to successively position all of the trays stored on these ten shelves on the rotary sample indexing mechanism B of the present invention. In the event that any one or more of the first ten trays are not present on their respective shelves, such condition will be detected by the sensing roller 425 associated with the microswitch MS10, thus insuring that the vertical hunt relay R9 (FIG. 21d) will not be shifted to the latched condition for those particular shelves. Consequently, the vertical drive motor M4 will continue to run upwardly until the presence of the next tray is sensed.

Provision is also made in the exemplary apparatus C for switching the tray select mechanism from the left-hand stack of trays 32 to the right hand stack of trays 34 upon completion of the hunt cycle in the left-hand stack—that is, after Tray No. 10 has been returned to its shelf 32j. When this occurs, the tray transfer mechanism again goes in to the "vertical hunt cycle" previously described, thus routing a start signal to the "up" terminal for the vertical drive motor M4. The start signal is simultaneously presented to the wiper 349$_a$ of the tray level switch 349, the wiper now being in electrical contact with its terminal j corresponding to the Tray No. 10 level. This serves to complete an energizing circuit for the latch coils R14$_L$, R15$_L$ of the relays R14, R15, respectively, through the contacts h9 of the unlatched relay R9, the contacts a11 of the latched relay R11, the wiper SS2$_b$ of the stepping switch SS2 (the wiper now being electrically coupled with its terminal No. 10), and back to the latch coil R14$_L$ of the relay R14 and the latch coil R15$_L$ of the relay R15, thus latching both of the relays. At the same time, an energizing circuit is completed for the unlatch coil R11 of the Horizontal Unload Relay R11, thus switching the latter relay to its unlatched condition. Finally, an energizing circuit is completed for the latch coil R12$_L$ of the Horizontal Load Relay R12 through the contacts e8, the "stop" contacts of the microswitch MS8, the contacts c14 of the latch relay R14, and back to the latch coil R12$_L$ of the Horizontal Load Relay R12, thus switching the latter relay to a latched condition. When this occurs, the contacts h12 break, thus deenergizing the vertical drive motor M4. Consequently, the motor stops momentarily after it starts to hunt upwardly from the shelf 32j corresponding to the Tray No. 10 position. At this time, relays R8, R12, R14 and R15 are all latched, while the relays R9, R10, R11, R13, are all unlatched.

It will be appreciated from the foregoing description that at this point of the "tray select" cycle, the yoke 356 which effects lateral movement of the trays is positioned at the top of the left-hand stack 32 after having completed a hunt cycle through all of the trays in that stack. Provision is now made for lowering the yoke 356 downwardly about all of the trays in the left-hand stack 32 to its lowermost position, and then shifting it laterally until it is aligned with the right-hand stack 34 of trays. To accomplish this, an energizing circuit is completed for the "down" terminal of the vertical drive motor M4 through the contacts g8, the contacts e12, the contacts h10 and the "run" contacts of the microswitch MS6. At the same time, an energizing circuit is completed for the relay R21 which acts to close its contacts R21$_a$ and complete an energizing circuit for the brake solenoid S2, thus releasing the brake and permitting downward movement of the carriage 309. When the platform 38 reaches its down position (FIGS. 1 and 18), the feed nut 131 shifts the microswitch MS6 from the "run" to the "stop" condition, thus deenergizing the motor M4 and simultaneously deenergizing the relay R21 to reapply the brake. At the same time, an energizing circuit is completed through the "stop" contacts of the microswitch MS6 for the latch coil R10$_L$ of the "Vertical Down Relay" R10, thus shifting the latter to a latched condition.

In order to shift the yoke 356 laterally from the left-hand stack 32 towards the right-hand stack 34 through the center index position, an energizing circuit is completed to the "clockwise" terminal of the horizontal drive motor M5 (FIG. 21e) through the contacts e10 of the now latched relay R10, the contacts e14 of the relay R14, the "run" contacts of the microswitch MS9, the contacts f13 of the unlatched relay R13, and thence to the clockwise terminal of the motor. Thus, the horizontal drive motor M5 is energized and the yoke 356 starts to move laterally from the left hand stack 32 towards the platform 38. As the motor M5 shifts the yoke laterally to the center position, the microswitch MS9 (FIG. 21e) switches from the "run" to the "stop" condition, thus momentarily deenergizing the horizontal drive motor M5. As the motor M5 is deenergized, an energizing circuit is completed for the latch coil R13$_L$ of the Stack Relay R13 through the "stop" contacts of the microswitch MS9, the contacts g14 of the latched relay R14, the wiper SS2$_c$ of the stepping switch SS2 (and its associated terminal No. 10), and then to the latch coil R13$_L$, shifting the relay R13 to the latched condition. This completes a current path through the contacts a13 of the now latched relay R13, and the contacts a14 of the latched relay R14, to the unlatch coil R14$_U$ of the latter relay, thus serving to shift the relay R14 from the latched to the unlatched condition. When this occurs, a current path is completed through the contacts g10 of the latched relay R10, the contacts f14 of the relay R14 and the contacts e15 of latched relay R15 to the unlatch coil R12$_U$ of the relay R12, thus shifting the latter relay from the latched to the unlatched state.

At this point in the cycle of operation, relays R8, R10, R13 and R15 are all latched, while relays R9, R11, R12 and R14 are all unlatched. The yoke 356 is now in the center down position.

To effect continued lateral movement of the yoke 356 towards the right-hand stack 34, a current path is now completed to the "clockwise" terminal of the horizontal drive motor M5 through the "stop" contacts of the microswitch MS6, the contacts $e8$ of the latched relay R8, the contacts $d11$ of the unlatched relay R11, the "run" contacts of the microswitch MS8, the contacts $b12$ of the unlatched relay R12, the contacts $g13$ of the latched relay R13, and then to the "clockwise" terminal of the horizontal drive motor M5. Thus, the motor is again energized and the yoke 356 continues to move laterally from left to right towards the right-hand stack 34 from the center position. When the yoke 356 gets to its extreme right-hand limit position where it is aligned with the right-hand stack 34 of shelves, the microswitch MS8 shifts from the "run" to the "stop" condition, thus breaking the energizing circuit for the horizontal drive motor M5 and stopping the latter. When this occurs, a current path is completed through the "stop" contacts of the microswitch MS8, the contacts $e14$ of the relay R14 and back to the latch coil $R11_L$ of the Horizontal Unload Relay R11, causing the latter relay to shift from the unlatched state to the latched state.

The apparatus is now conditioned to start a vertical hunt cycle in the right-hand stack 34, with the tray select yoke 356 moving progressively through the shelves corresponding to the Tray No. 11 through the Tray No. 20 position. To initiate this vertical hunt cycle, an energizing circuit is completed for the vertical drive motor M4 through the contacts $g8$ of the relay R8, the contacts $g11$ of the relay R11, the contacts $d9$ of the relay R9, the contacts $h12$ of the relay R12, and then to the "up" terminal of the vertical drive motor M4, thus energizing the latter. At the same time, the relay R20 is energized to close its normally open contacts $R20_a$ and complete an energizing circuit for the brake solenoid S2, thus releasing the brake and permitting rotation of the lead screw 132. A current path is also completed through the contacts $g8$, the contacts $e11$, the contacts $e15$ and then to the unlatch coil $R10_U$ of relay R10, causing the latter to switch from the latched state to the unlatched state. Simultaneously, the relay R15 is unlatched by completing an energizing circuit for its unlatch coil $R15_U$ from the contacts $g15$ of the latched relay R15, the "run" contacts of the microswitch MS7 and then to the unlatch coil $R15_U$.

The programming circuit is now conditioned to initiate a "vertical hunt cycle" through the right-hand stack 34. This cycle will be identical to that previously described for the left-hand stack 32. During this cycle, the yoke 356 will progressively move upwardly past the various shelves $34a$–$34j$, sequentially selecting those trays that are present and transferring them to the rotary sample indexing mechanism B. After the counting cycle for the samples contained in those trays is completed, the trays will be returned to the shelves from which they were removed.

After transferring Tray No. 20 to and from the rotary sample indexing mechanism B, provision must be made for again changing stacks, this time from the right-hand stack 34 to the left-hand stack 32. To accomplish this, the operation is substantially identical to that previously described except that in this operation the Stack Relay R13 is initially in the latched state rather than the unlatched state. Consequently, when the yoke 356 moves to its lowermost position and the vertical drive motor M4 is deenergized, the yoke will start to move laterally towards the center of the apparatus. When it arrives at the center position, the relay R13 switches from the latched to the unlatched state, and the horizontal drive motor M5 then continues to move the yoke laterally to a position where it is aligned with the left-hand stack 32 and the cycle of operation is complete.

It should be noted at this point that during a vertical hunt cycle, the stepping switch SS2 (which serves as a memory for the shelf position of the tray being counted) steps progressively through the terminals 1 through 10 as Tray No. 1 through Tray No. 10 are selected. When each respective tray is returned, the stepping switch moves to the next terminal position in the manner previously described. After Tray No. 10 is returned to its shelf $32j$, the stepping switch SS2 moves to the No. 11 terminal corresponding to the Tray No. 11 position. However, at this point the relay R11 shifts to the unlatched condition, thus preventing completion of an energizing circuit through the contact $c11$ and preventing further stepping of the stepping switch SS2. As long as the relay R11 remains unlatched, the stepping switch SS2 does not again step. When the yoke 356 is aligned with the right-hand stack of trays 34, the relay R11 again shifts to the latched state and thereafter stepping operation is normal.

During the vertical hunt cycles in either the left or the right-hand stacks 32, 34, respectively, the Vertical Hunt Relay R9 shifts to the latched state whenever a tray is selected and moved laterally from its corresponding shelf. Consequently, the solenoid S4 for the stepping switch SS2 cannot be energized incident to vertical movement since the energizing circuit for the solenoid includes the contacts $f9$ and when the relay R9 shifts to the latched state, the contacts $f9$ break. Thus, the stepping switch SS2 will not step until the Vertical Hunt Relay R9 is again unlatched.

In accordance with another of the important aspects of the present invention, provision is made for automatically removing a tray of samples from the sample indexing mechanism B in the event the operator needs to count a new tray of samples on a "priority" basis. To accomplish this, provision is made for terminating the count cycle of the tray in the indexing mechanism B and for returning that tray to its shelf, at which time the tray select mechanism steps automatically through all of the shelves irrespective of whether or not a sample tray is positioned thereon until it reaches the shelf containing the "priority" tray. To accomplish this, the apparatus includes a tray select switch 42 (FIGS. 1 and 21c), thus permitting the operator to place the "priority" tray on any open shelf, for example, the shelf corresponding to Tray No. 20, and then manually shifting the tray select switch 42 to its terminal No. 20 corresponding to Tray No. 20. Let it also be assumed that the tray presently being counted is Tray No. 17 and that Tray No. 18 and Tray No. 19 are properly located on their respective shelves $34h$, $34i$, respectively. Under these conditions, after positioning the tray select switch 42, the operator simply turns the mode select switch 40 to the "select" terminal. When this occurs, a signal is generated on the reset terminal 86 of the counting logic 63 (FIG. 22), which is effective to cause the associated scaling and "read out" equipment to immediately "read out" the counts recorded up until that point. At the same time, a signal is transmitted from the line L1 through the wiper $40e$ of the mode selector switch to the latch coil $R7_L$ of a Tray Select Relay R7, causing the latter relay to shift from the unlatched to the latched state. When the tray select relay R7 switches to the latched state, an energizing circuit is completed for the latch coil R6 of the Last Sample Relay R6 through the contacts $c7$ of the now latched relay R7, thus shifting the Last Sample Relay R6 to the latched state. The sample now in the detection well is ejected therefrom and, since the relay R6 is latched, an energizing signal is transmitted to the tray select mechanism in the manner previously described. After Tray No. 17 is returned to its shelf $34g$, the apparatus will enter into a vertical hunt cycle for the particular tray selected, in this instance Tray No. 20.

Under normal conditions, the next tray to be selected after Tray No. 17 is returned to its shelf would be Tray No. 18. However, before either Tray No. 18 or Tray No. 19 can be selected, they must be detected by the sensing element 424 associated with the tray sensing switch MS11 which normally passes a "tray present"

signal through the contacts h7 of the unlatched relay R7. Since the relay R7 is now latched, the contacts h7 are broken and consequently no output signal generated by the microswitch MS11 will reach the vertical drive motor MS4 to terminate a vertical hunt cycle. Therefore, the vertical motor will continue to operate even though trays are located at levels 34h and 34i. The only way that the vertical motor can now terminate its vertical hunt cycle is by unlatching the relay R7.

Therefore, provision must be made for unlatching the relay R7 after having sensed for the nineteenth tray. To accomplish this, the tray select switch 42 includes twenty terminals which respectively correspond to the twenty tray positions. However, the terminals in the tray select switch are not coincident with the corresponding twenty terminals for the stepping switch SS2. Rather, the tray select terminals 0 through 20 are offset by one tray position with respect to the terminals 0 through 20 of the stepping switch, as best shown in FIG. 21e where the output terminals from the tray select switch 42 (FIG. 21c) are represented by arrows 1–20. Thus, as the vertical hunt mechanism moves from the Tray No. 18 position towards the Tray No. 19 position, the sensing mechanism acts to determine whether or not a tray is present at level 19. Since a tray is present and since the relay R7 is still latched, the vertical hunt cycle continues past the tray 19 level. However, immediately after sensing the presence of the tray at level 19, a current path is completed through the wiper $SS2_d$ of the stepping switch SS2, through the terminal 19 associated therewith and through the terminal 20 of the tray select switch 42. Since the wiper 42b of the latter switch is coupled to the terminal 20 (because the operator has manually shifted it to this position), an energizing circuit is completed for the unlatch coil $R7_U$ of the tray select relay R7, causing the relay to shift from the latched state to the unlatched state. When this occurs, the contact h7 is again made, thus rendering the right stack bypass microswitch MS11 again operative and enabling the microswitch to pass an output signal indicating that a tray is present at shelf 34j. Of course, it will be appreciated that the function of the tray select switch 42 is simply to incapacitate the microswitches MS10 and MS11 so that the vertical hunt is confined to the particular tray selected. If the operator had erred and no tray was positioned on the shelf 34j, the apparatus would continue to hunt through the next position which, in this instance, is the Tray No. 1 level. Operation thereafter will be normal.

It should be noted, however, that when the "priority" tray is selected, no counting can be performed until such time as the operator again shifts the mode select switch 40 from the "select" terminal to the "operate" terminal. This can be done at any time after the tray select relay R7 is latched. In other words, the operator need only switch to the "select" position momentarily to enable the tray select relay R7 to be pulled in.

The exemplary apparatus also includes provision for selecting a stop position when all of the trays have been selected, thus enabling termination of an operating cycle with the yoke 356 disposed at its lowermost central position where it will not interfere with any of the trays and where the operator is permitted to remove any or all of the trays. To accomplish this, the tray select switch 42 is provided with an extra terminal corresponding to the tray select "zero" position. If the operator selects the "zero" position by switching the tray select switch 42 to the zero terminal "0," any tray that is then being counted will be immediately returned to its shelf in the manner previously described, and vertical hunt will then again commence through the respective stacks. However, since the tray select switch 42 has been shifted to the zero position, the relay R7 is latched and the microswitches MS10 and MS11 are rendered inoperative for the purpose of generating a tray present signal. Consequently, the apparatus will continue to hunt until it has moved upwardly through the right hand stack 34 and has then returned to its lowermost position and shifted laterally into alignment with the elevator shaft 48. Normally, when the platform 38 gets to the center position, a signal would be generated to shift the Stack Relay R13 from the latched to the unlatched state, thus permitting the tray select mechanism to continue its leftward lateral movement towards the left stack 32. However, the energizing circuit that permits such continued leftward movement includes the wiper 42a on the tray select switch 42. It will be noted, upon inspection of FIG. 21c that the terminals 1 through 20 associated with the wiper 42a are all shorted together. However, when the operator selects the zero position, the wiper 42a moves to the zero terminal, thus breaking the energizing circuit for the unlatch coil $R13_U$ of the stack relay R13 and the latter relay remains in the latched condition. This insures that an energizing circuit is not completed for the horizontal drive motor M5 and, consequently, the platform 38 stops in its lowermost central position.

With the tray select mechanism stopped in the central position, the operator is able to replace any or all trays, as he desires. When the trays are replaced and the apparatus is ready for its next operating cycle, the operator simply shifts the tray select switch 42 from the zero position to any other terminal, and the vertical hunt cycle will commence, so as to move the yoke 356 progressively from the Tray No. 1 to the Tray No. 20 position. It is immaterial where the operator shifts the tray select switch, since the relay R7 will not be latched again until such time as the operator shifts the mode select switch 40 from the "operate" to the "select" terminal. Thus, when the tray select switch 42 is shifted, for example, to the Tray No. 1 position, the wiper 42a will be shifted to one of the shorted contacts, thus completing an energizing circuit for the unlatch coil $R13_U$ of the relay R13 and permitting the horizontal drive motor M5 to again be energized so as to move the vertical tray select mechanism from its center position to the left until it is aligned with the left-hand stack 32. Vertical hunt now begins and the operation thereafter is normal.

We claim as our invention:

1. In apparatus for measuring the radioactivity levels of test samples, the combination comprising a stationary radiation detector, a plurality of portable annular trays each defining an annular array of open ended, vertically extending compartments for containing a plurality of test samples, an annular gate member slidably mounted on the lower surface of each tray to control the discharge of samples through the lower ends of said compartments, said gate member defining a discharge opening having a width as measured in a circumferential direction substantially more than the circumferential width of one tray compartment and substantially less than the circumferential width of two tray compartments, and a latching mechanism for positively latching said gate member and said tray together in a position where the gate discharge opening is centered with respect to two adjacent compartments for normally blocking the discharge of samples from all of the compartments in that tray, and cooperating guide elements on said tray and said gate member to permit relative indexing movement of said tray and said gate member upon release of said latching mechanism whereby the compartments are sequentially unblocked to permit discharge of said samples therefrom to said radiation detector.

2. For use with an automatic sample changer of the type used for transferring radioactive samples to a radiation detection apparatus in seriatim order, a portable annular tray defining an annular array of open ended, vertically extending compartments for containing a plurality of test samples, an annular gate member slidably mounted on the lower surface of said tray to control the discharge of samples through the lower ends of said compartments, said gate member defining a discharge open-ing having a width as measured in a circumferential direction substantially more than the circumferential width of one tray compartment and substantially less than the circumferential width of two tray compartments, and a latching mechanism for positively latching said gate member and said tray together in a position where the gate discharge opening is centered with respect to two adjacent compartments for normally blocking the discharge of samples from all of the compartments in that tray, and cooperating guide elements on said tray and said gate member to permit relative indexing movement of said tray and said gate member upon release of said latching mechanism whereby the compartments are sequentially unblocked to permit discharge of said samples therefrom to said radiation detector.

3. The apparatus of claim 2 which includes means defining a notch communicating with each of said compartments to permit detection of the presence or absence of a sample in each compartment.

4. An indexing mechanism for use with a compartmented tray suitable for holding a plurality of radioactive test samples and of the type employing a gate member having a discharge opening centered with respect to two adjacent compartments for normally inhibiting discharge of the samples, said indexing mechanism comprising, in combination, a table for supporting the tray, means for indexing the tray relative to the gate member through an increment corresponding to one-half the distance between center-lines of adjacent tray compartments so as to register one of the compartments with the discharge opening in the gate for permitting discharge of the test sample contained therein, means for sequentially indexing the tray relative to the gate member through increments corresponding to the distance between center-lines of adjacent compartments for successively alining each of the remaining compartments with the discharge opening in the gate member, and means for again indexing the tray relative to the gate member through an increment corresponding to one-half the distance between center-lines of adjacent compartments to return the tray to its starting position relative to the gate wherein all compartments are blocked.

5. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, means for indexing the tray relative to the gate member through an annular increment P so as to register one of the compartments with the discharge opening in the gate for permitting discharge of the test sample contained therein, means for sequentially indexing the tray relative to the gate member through angular increments 2P so as to successively aline each of the remaining compartments with the discharge opening in the gate member, and means for again indexing the tray relative to the gate member through an angular increment P to return the tray to its starting position relative to the gate wherein all compartments are blocked.

6. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, a drive element positioned to be operatively engaged with one of the teeth, drive means for successively engaging said element with each of the teeth for indexing the tray in stepwise fashion through successive angular increments P, and control means for rendering said drive means operative to step the tray through a first angular increment P to aline the gate opening with one of the tray compartments, and through a plurality of second angular increments 2P to aline the gate opening with each of the remaining tray compartments, and through a third angular increment P to return the tray to its starting position with all of the compartments blocked by the gate member.

7. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, a Geneva pin mounted for rotation in a circular path about a fixed axis, said pin positioned to be received successively in each of the notches in the tray during portions of successive circular revolutions so as to advance the tray through angular increments P, and control means for driving said pin through one revolution to advance the tray a first increment P so as to aline one compartment with the discharge opening, said control means operative to drive said pin through successive steps of two revolutions to advance the tray a plurality of successive second increments 2P so as to aline each of the remaining compartments with the discharge opening, said control means operative to drive said pin through a final complete revolution to advance the tray a third increment P whereby the tray is returned to its starting position relative to the gate member.

8. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, a Geneva pin mounted for rotation in a circular path about a fixed axis, said pin positioned to be received successively in each of the notches in the tray during portions of successive circular revolutions so as to advance the tray through angular increments P, control means for driving said pin through one revolution to advance the tray a first increment P so as to aline one compartment with the discharge opening, said control means operative to drive said pin through successive steps of two revolutions to advance the tray a plurality of successive second increments 2P so as to aline each of the remaining compartments with the discharge opening, said control means operative to drive said pin through a final complete revolution to advance the tray a third increment P whereby the tray is returned to its starting position relative to the gate member, and means for latching the tray in position during the periods when said pin is disengaged from the tray.

9. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, a cam, a Geneva pin mounted on said cam for simultaneous rotation therewith about a fixed axis, said pin positioned to be received successively in each of the notches in the tray during portions of successive circular revolutions so as to advance the tray through angular increments P, control means for driving said cam and said pin through one revolution to advance the tray a first increment P so as to aline one compartment with the discharge opening, said control means operative to drive said pin through successive steps of two revolutions to advance the tray a plurality of successive second increments 2P so as to aline each of the remaining compartments with the discharge opening, said control means operative to drive said pin through a final complete revolution to advance the tray a third increment P whereby the tray is returned to its starting position relative to the gate member, a locating pin mounted on said mechanism with freedom for reciprocable movement into and out of one of the notches in the tray for accurately positioning the latter, and means normally biasing said locating pin into engagement with the tray, said cam being operable to effect retraction of said locating pin against the force of said biasing means during said portions of the circular revolutions of said Geneva pin when the latter is engaged with the tray.

10. An indexing mechanism for use with an annular compartmented tray suitable for holding a plurality of radioactive test samples and of the type employing an annular gate member having a discharge opening centered with respect to two adjacent compartments for normally inhibiting discharge of the samples, the tray having a continuous series of gear teeth and notches wherein the distance between center-lines of adjacent compartments is equal to twice the pitch P of the teeth; said indexing mechanism comprising, in combination, a table for supporting the tray, a drive element positioned to be operatively engaged with one of the teeth, drive means for successively engaging said element with each of the teeth for indexing the tray in stepwise fashion through successive angular increments P, control means for rendering said drive means operative to step the tray through a first angular increment P to aline the gate opening with one of the tray compartments, and through a plurality of second angular increments 2P to aline the gate opening with each of the remaining tray compartments, and through a third angular increment P to return the tray to its starting position with all of the compartments blocked by the gate member, and sensing means for detecting the absence of a test sample in the particular compartment being indexed towards alignment with the opening in the gate member, said sensing means being operable to cause said drive means to multiple-step the tray through an additional angular increment corresponding to 2P times the number of successive empty compartments detected.

11. For use with an automatic sample changer including a plurality of portable compartmented trays suitable for holding a plurality of radioactive test samples, each tray having an annular gate member having a discharge opening normally centered with respect to two adjacent compartments for inhibiting discharge of the samples and means for latching the tray and the gate member together in said normal position, the combination of a table for receiving and supporting said trays one at a time in seriatim order, said table defining an aperture corresponding to the discharge opening in said gate member, a centering mechanism mounted on said table, said mechanism including a plurality of centering elements and means responsive to placement of a tray on said table for urging said centering elements into engagement with said tray for centering the tray about a predetermined axis, said centering mechanism also being responsive to removal of said tray from said table for retracting said centering elements to facilitate placement of the next tray on the table, an aligning mechanism responsive to placement of said tray on said table for rapidly rotating the tray and its associated gate member until the gate discharge opening is aligned with said corresponding aperture in said table and including a locating mechanism responsive to alignment of said discharge opening and said corresponding aperture for terminating rotation of said tray and gate member and positively locking the gate member in the aligned position, and means responsive to the alignment of said gate discharge opening and said corresponding aperture in said table for releasing the latching means between said tray and said gate member to permit indexing movement of said tray relative to said gate member for sequentially aligning the compartments in said tray with said gate discharge opening and said aperture.

12. The apparatus of claim 11 in which said centering mechanism is responsive to placement of a tray on said table for urging first, second, and third centering elements into engagement with a wall of said tray so as to define a three-point centering mechanism for aligning the axis of the tray with a predetermined point on said table.

13. The apparatus of claim 11 in which a plurality of notches are formed in one wall of the tray, and said aligning mechanism includes a locating pin mounted on said table, means for biasing said pin toward one of the notches in the tray, means for holding said pin in a cocked position out of engagement with said tray, and means for uncocking said pin to terminate rapid rotation of the tray when the gate discharge opening is aligned with said aperture.

14. The apparatus of claim 13 which includes means for positively locking the gate member to the table upon uncocking of said locating pin to inhibit further rotational movement thereof.

15. In apparatus for measuring the radioactivity levels of test samples and including an indexing station and a sample transfer station, the combination comprising a stationary radiation detector, a plurality of portable trays each of which is compartmented to contain a plurality of test samples, storage means for receiving and holding a plurality of said portable trays, a tray transfer mechanism for automatically transferring each of said portable trays in said storage means to the indexing station, an indexing mechanism at said indexing station responsive to the transfer of each of said trays to said indexing station for automatically indexing that tray to sequentially align all the compartments in that tray with the sample transfer station, and a sample transfer mechanism at said sample transfer station responsive to the alignment of each tray compartment with said sample transfer station for withdrawing the sample from the aligned tray compartment, transferring the withdrawn sample to said stationary radiation detector for analysis, and then returning the analyzed sample to its original tray compartment.

16. In apparatus for measuring the radioactivity levels of test samples and including an indexing station and a sample transfer station, the combination comprising a stationary radiation detector, a plurality of portable trays each of which is compartmented to contain a plurality of test samples, storage means for receiving and holding a plurality of said portable trays, a tray transfer mechanism for automatically transferring each of said portable trays in said storage means to the indexing station, an indexing mechanism at said indexing station responsive to the transfer of each of said trays to said indexing station for automatically indexing that tray to sequentially align all the compartments in that tray with the sample transfer station, said indexing mechanism including sensing means for detecting the absence of a test sample in the particular compartment being indexed toward alignment with said sample transfer station, said sensing means being responsive to empty tray compartments for automatically effecting multiple stepping of the indexing mechanism past any such empty compartments, and a sample transfer mechanism at said sample transfer station responsive to the alignment of each tray compartment with said sample transfer station for withdrawing the sample from the aligned tray compartment, transferring the withdrawn sample to said stationary radiation detector for analysis, and then returning the analyzed sample to its original tray compartment.

17. In apparatus for measuring the radioactivity levels of a plurality of test samples and including an indexing station, the combination comprising a stationary radiation detector, a plurality of portable trays each of which is compartmented to contain a plurality of test samples and each including gate means for controlling the discharge of samples from said compartments and latching means for normally latching said tray and gate means together in a position where all the samples are retained within said tray compartments, storage means for receiving and holding a plurality of said portable trays, a transfer mechanism for automatically removing said trays from said storage means one at a time and transferring each selected tray to the indexing station, a centering mechanism responsive to the transfer of a selected tray to said indexing station for centering said tray about a predetermined axis, an aligning mechanism responsive to the transfer of a selected tray to said indexing station for aligning the discharge opening in said gate means with a predetermined point at said indexing station, unlatching means responsive to the alignment of said gate means with said predetermined point for unlatching said tray and said gate means to permit indexing movement of said tray relative to said gate means, means responsive to said unlatching means for sequentially indexing said tray to permit withdrawal of the samples contained therein for analysis by said radiation detector, means for latching said tray and gate means after all the samples therein have been analyzed, and means for automatically returning the latched tray and gate means to their original location in said storage means.

18. In apparatus for measuring the radioactivity levels of test samples, the combination comprising a stationary radiation detector, a plurality of portable trays each of which is compartmented to contain a plurality of test samples, gate means mounted on each of said portable trays and being normally latched to said trays to inhibit the discharge of samples from all the compartments in the respective trays, storage means for receiving and holding a plurality of said portable trays, an indexing mechanism for automatically indexing selected ones of said portable trays to register all the compartments in each selected tray with said detector, a transfer mechanism for automatically transferring said portable trays in said storage means to said indexing mechanism, and control means responsive to the transfer of a selected tray to said indexing mechanism for controlling said gate means to sequentially open said tray compartments as they are registered with said detector to permit withdrawal of the samples from the compartments for analysis and to sequentially close the tray compartments as the analyzed samples are returned thereto, and a sample transfer mechanism responsive to the opening of each tray compartment for transferring the sample from the opened compartment to said detector and then returning each sample to its respective compartment after analysis of the same.

References Cited by the Examiner
UNITED STATES PATENTS

| | | | |
|---|---|---|---|
| 2,386,520 | 10/1945 | Watson et al. | 214—11 X |
| 2,423,557 | 7/1947 | Gray | 214—16.4 X |
| 2,500,243 | 3/1950 | Dixon | 198—209 X |
| 2,500,492 | 3/1950 | Henriques | 250—106 |
| 2,843,753 | 7/1958 | Meeder | 250—106 |
| 2,893,542 | 7/1959 | Watkins | 198—209 |
| 2,924,718 | 2/1960 | Packard et al. | 250—106 |
| 3,047,124 | 7/1962 | Wexler | 198—209 X |

RALPH G. NILSON, *Primary Examiner.*

W. F. LINDQUIST, *Assistant Examiner.*